(12) United States Patent
Frazier et al.

(10) Patent No.: US 11,998,080 B2
(45) Date of Patent: Jun. 4, 2024

(54) TEXTILES AND ARTICLES AND PROCESSES FOR MAKING THE SAME

(71) Applicant: NIKE, Inc., Beaverton, OR (US)

(72) Inventors: Devon Frazier, Beaverton, OR (US);
Walter M. Hancock, Taichung (TW);
Dave Klinger, Beaverton, OR (US);
Robert Mervar, Beaverton, OR (US);
Brian G. Prevo, Portland, OR (US);
Hilary Walker, Hillsboro, OR (US)

(73) Assignee: Nike, Inc., Beaverton, OR (US)

( * ) Notice: Subject to any disclaimer, the term of this patent is extended or adjusted under 35 U.S.C. 154(b) by 600 days.

(21) Appl. No.: 16/945,441

(22) Filed: Jul. 31, 2020

(65) Prior Publication Data

US 2021/0030109 A1    Feb. 4, 2021
US 2022/0007782 A2    Jan. 13, 2022

Related U.S. Application Data

(60) Provisional application No. 62/882,008, filed on Aug. 2, 2019.

(51) Int. Cl.
*A43B 13/12*      (2006.01)
*A43B 13/02*      (2022.01)
(Continued)

(52) U.S. Cl.
CPC ........ *A43B 13/026* (2013.01); *A43B 23/0215* (2013.01); *A43B 23/0225* (2013.01);
(Continued)

(58) Field of Classification Search
CPC .............. A43B 13/026; A43B 23/0215; A43B 23/0225; A43B 23/0235; A43B 23/0255;
(Continued)

(56) References Cited

U.S. PATENT DOCUMENTS 2,440,393 A    4/1948   Clark
3,100,926 A    8/1963   Richmond
(Continued)

FOREIGN PATENT DOCUMENTS

CA    2489217 A1    12/2003
CA    2483333 A1    4/2005
(Continued)

OTHER PUBLICATIONS

U.S. Appl. No. 16/945,503.
(Continued)

*Primary Examiner* — Vincent Tatesure
(74) *Attorney, Agent, or Firm* — Shook, Hardy & Bacon L.L.P.

(57) ABSTRACT

Films, fibers, filaments, yarns and textiles including thermoplastic elastomeric compositions are described, as are methods of making the films, fibers, filaments, yarns and textiles. These films, fibers, filaments, yarns and textiles can be used to make articles of apparel, footwear, and sporting equipment. When thermoformed, the thermoplastic elastomeric compositions can impart abrasion resistance, traction, and other advantageous properties to the articles. This abstract is intended as a scanning tool for purposes of searching in the particular art and is not intended to be limiting of the present disclosure.

18 Claims, 18 Drawing Sheets

(51) Int. Cl.

| | | |
|---|---|---|
| *A43B 23/02* | (2006.01) | |
| *B29C 51/12* | (2006.01) | |
| *B29C 51/14* | (2006.01) | |
| *B32B 5/02* | (2006.01) | |
| *B32B 5/24* | (2006.01) | |
| *B32B 27/12* | (2006.01) | |
| *B32B 27/40* | (2006.01) | |
| *D02G 3/36* | (2006.01) | |
| *D04B 1/16* | (2006.01) | |
| *D06M 15/233* | (2006.01) | |
| *D06M 15/70* | (2006.01) | |
| *B29K 9/06* | (2006.01) | |
| *B29L 31/50* | (2006.01) | |
| *D06M 101/32* | (2006.01) | |
| *D06M 101/34* | (2006.01) | |

(52) U.S. Cl.
CPC ...... *A43B 23/0235* (2013.01); *A43B 23/0255* (2013.01); *A43B 23/026* (2013.01); *B29C 51/12* (2013.01); *B29C 51/145* (2013.01); *B32B 5/026* (2013.01); *B32B 5/245* (2013.01); *B32B 27/12* (2013.01); *B32B 27/40* (2013.01); *D02G 3/36* (2013.01); *D04B 1/16* (2013.01); *D06M 15/233* (2013.01); *D06M 15/70* (2013.01); *B29K 2009/06* (2013.01); *B29L 2031/504* (2013.01); *B29L 2031/505* (2013.01); *B32B 2307/536* (2013.01); *B32B 2437/02* (2013.01); *D06M 2101/32* (2013.01); *D06M 2101/34* (2013.01); *D06M 2200/35* (2013.01); *D06M 2200/40* (2013.01); *D10B 2331/02* (2013.01); *D10B 2331/04* (2013.01); *D10B 2331/10* (2013.01); *D10B 2401/041* (2013.01); *D10B 2401/06* (2013.01); *D10B 2401/061* (2013.01); *D10B 2401/063* (2013.01); *D10B 2501/043* (2013.01)

(58) Field of Classification Search
CPC ..... A43B 23/026; B29C 51/12; B29C 51/145; B29C 51/026; B29C 51/245; B32B 5/026; B32B 5/245; B32B 27/12; B32B 27/40; D02G 3/36; D04B 1/16; D06M 15/233; D06M 15/70
USPC .......................................................... 442/304
See application file for complete search history.

(56) References Cited

U.S. PATENT DOCUMENTS

| | | |
|---|---|---|
| 3,249,129 A | 5/1966 | Renfroe |
| 3,389,446 A | 6/1968 | Robert |
| 3,694,873 A | 10/1972 | Crowley |
| 4,144,371 A | 3/1979 | Okie et al. |
| 4,197,345 A | 4/1980 | Worrall |
| 4,265,972 A | 5/1981 | Rudner |
| 4,561,128 A | 12/1985 | Zimmerman |
| 4,777,080 A | 10/1988 | Harris, Jr. et al. |
| 4,803,109 A | 2/1989 | Saniscalchi |
| 5,445,693 A | 8/1995 | Vane |
| 5,568,779 A | 10/1996 | Wong |
| 5,572,804 A | 11/1996 | Skaja et al. |
| 5,950,554 A | 9/1999 | Wong |
| 6,007,911 A | 12/1999 | Bowen, Jr. |
| 6,054,078 A | 4/2000 | Lauer et al. |
| 6,225,243 B1 | 5/2001 | Austin |
| 6,261,679 B1 | 7/2001 | Chen et al. |
| 6,430,844 B1 | 8/2002 | Otis |
| 6,541,403 B2 | 4/2003 | Billarant et al. |
| 6,548,166 B2 | 4/2003 | Figuly et al. |
| 6,896,843 B2 | 5/2005 | Topolkaraev et al. |
| 6,911,502 B2 | 6/2005 | Vedula |
| 7,081,221 B2 | 7/2006 | Paratore et al. |
| 7,357,889 B2 | 4/2008 | Vedula et al. |
| 7,462,573 B2 | 12/2008 | Tsujiyama et al. |
| 7,718,259 B2 | 5/2010 | Pollet et al. |
| 7,785,509 B2 | 8/2010 | Perera et al. |
| 8,034,873 B2 | 10/2011 | Siddhamalli |
| 8,148,475 B2 | 4/2012 | Vedula et al. |
| 8,641,944 B2 | 2/2014 | Wang et al. |
| 8,800,172 B2 | 8/2014 | Dua et al. |
| 8,865,052 B2 | 10/2014 | Makal et al. |
| 9,060,562 B2 | 6/2015 | Meir et al. |
| 9,320,312 B2 | 4/2016 | Lyttle et al. |
| 9,545,773 B2 | 1/2017 | Hansen |
| 9,688,805 B2 | 6/2017 | Vedula et al. |
| 9,723,890 B2 | 8/2017 | Long et al. |
| 9,856,599 B2 | 1/2018 | Park |
| 9,915,026 B2 | 3/2018 | Park |
| 9,963,806 B2 | 5/2018 | Vedula et al. |
| 10,138,575 B2 | 11/2018 | Van Der Gaag et al. |
| 10,455,885 B2 | 10/2019 | Tamm |
| 10,590,569 B2 | 3/2020 | Hansen et al. |
| 10,590,571 B2 | 3/2020 | Hansen et al. |
| 2002/0172792 A1 | 11/2002 | Jarvis et al. |
| 2002/0175433 A1 | 11/2002 | Day |
| 2004/0118018 A1 | 6/2004 | Dua |
| 2007/0082165 A1 | 4/2007 | Barrett |
| 2007/0141335 A1 | 6/2007 | Perera et al. |
| 2008/0081854 A1 | 4/2008 | Wang et al. |
| 2008/0114093 A1 | 5/2008 | Lagneaux et al. |
| 2008/0254253 A1 | 10/2008 | Gallager |
| 2009/0151397 A1 | 6/2009 | Sturman et al. |
| 2009/0313856 A1 | 12/2009 | Arizumi |
| 2010/0062231 A1 | 3/2010 | Abed et al. |
| 2010/0199406 A1 | 8/2010 | Dua et al. |
| 2010/0203328 A1 | 8/2010 | Hochstetter et al. |
| 2010/0287679 A1 | 11/2010 | Fujita et al. |
| 2011/0232002 A1 | 9/2011 | Wiessner |
| 2012/0157904 A1 | 6/2012 | Stein |
| 2013/0059116 A1 | 3/2013 | Peikert et al. |
| 2013/0139294 A1 | 6/2013 | Zetune et al. |
| 2013/0192086 A1 | 8/2013 | Tawney et al. |
| 2013/0276333 A1 | 10/2013 | Wawrousek et al. |
| 2014/0245643 A1 | 9/2014 | Huffa et al. |
| 2015/0013188 A1 | 1/2015 | Seamarks et al. |
| 2015/0059209 A1 | 3/2015 | Dekovic et al. |
| 2015/0201707 A1 | 7/2015 | Bruce |
| 2016/0083540 A1 | 3/2016 | Makal et al. |
| 2016/0271904 A1 | 9/2016 | Maia et al. |
| 2016/0286898 A1 | 10/2016 | Manz et al. |
| 2016/0295971 A1 | 10/2016 | Arnese et al. |
| 2017/0029982 A1 | 2/2017 | Bryson, Jr. et al. |
| 2017/0042264 A1 | 2/2017 | Dua et al. |
| 2017/0129200 A1 | 5/2017 | Giovanni et al. |
| 2017/0245581 A1 | 8/2017 | McFarland, II et al. |
| 2017/0348935 A1 | 12/2017 | Leimer et al. |
| 2017/0362570 A1 | 12/2017 | Revel et al. |
| 2018/0125165 A1 | 5/2018 | Adami et al. |
| 2018/0255875 A1 | 9/2018 | McGinnity et al. |
| 2018/0319925 A1 | 11/2018 | Lu et al. |
| 2019/0037967 A1 | 2/2019 | McFarland, II et al. |
| 2019/0069636 A1 | 3/2019 | Lang et al. |
| 2019/0082774 A1 | 3/2019 | Tamm et al. |
| 2019/0116927 A1* | 4/2019 | Constantinou ....... A43B 13/223 |

FOREIGN PATENT DOCUMENTS

| | | |
|---|---|---|
| CA | 2905879 C | 9/2014 |
| CN | 1125385 A | 6/1996 |
| CN | 102162164 A | 8/2011 |
| EP | 0629721 A2 | 12/1994 |
| EP | 1571938 B3 | 9/2005 |
| EP | 1573107 B1 | 9/2005 |
| EP | 1591572 A1 | 11/2005 |
| EP | 2488685 B1 | 8/2012 |
| EP | 2530195 A1 | 12/2012 |
| EP | 2978332 B1 | 2/2016 |
| EP | 3078290 A1 | 10/2016 |
| EP | 3107411 B1 | 12/2016 |

(56) References Cited

FOREIGN PATENT DOCUMENTS

| | | | |
|---|---|---|---|
| EP | 3128865 | B1 | 2/2017 |
| EP | 3594287 | A1 | 1/2020 |
| FR | 2742637 | A1 | 6/1997 |
| GB | 2346624 | A | 8/2000 |
| JP | H10130991 | A | 5/1998 |
| JP | 2009-534499 | A2 | 9/2009 |
| KR | 20180060539 | A | 6/2018 |
| WO | 94/24896 | A1 | 11/1994 |
| WO | 0051458 | A1 | 9/2000 |
| WO | 2002064656 | A2 | 8/2002 |
| WO | 02068534 | A1 | 9/2002 |
| WO | 2005052235 | A1 | 6/2005 |
| WO | 2010141319 | A1 | 12/2010 |
| WO | 2011124228 | A1 | 10/2011 |
| WO | 2011127259 | | 10/2011 |
| WO | 2012/022967 | A1 | 2/2012 |
| WO | 2012073095 | A1 | 6/2012 |
| WO | 2014085206 | A1 | 6/2014 |
| WO | 2015183348 | A1 | 12/2015 |
| WO | 2015190920 | A1 | 12/2015 |
| WO | 2016014230 | A1 | 1/2016 |
| WO | 2017115806 | A1 | 7/2017 |
| WO | 2017151496 | A1 | 9/2017 |
| WO | 2018124385 | A1 | 7/2018 |

OTHER PUBLICATIONS

U.S. Appl. No. 16/945,530.
U.S. Appl. No. 16/945,554.
International Preliminary Report on Patentability for PCT/US2020/060247, dated Feb. 9, 2022.
International Preliminary Report on Patentability for PCT/US2020/044626, dated Feb. 17, 2022.
International Preliminary Report on Patentability for PCT/US2020/044624, dated Feb. 17, 2022.
International Preliminary Report on Patentability for PCT/US2020/044629, dated Feb. 17, 2022.
International Preliminary Report on Patentability for PCT/US2020/044628, dated Feb. 17, 2022.
International Search Report and Written Opinion for PCT/US2020/044626 dated Oct. 30, 2020.
International Search Report and Written Opinion for PCT/US2020/044624 dated Oct. 30, 2020.
International Search Report and Written Opinion for PCT/US2020/044628 dated Oct. 30, 2020.
International Search Report and Written Opinion for PCT/US2020/044629 dated Nov. 5, 2020.
International Preliminary Report on Patentability for PCT/US2020/060236, dated Apr. 7, 2022.
International Preliminary Report on Patentability for PCT/US2020/060247, dated Apr. 14, 2022.
International Search Report and Written Opinion for PCT/US2020/060236, dated Mar. 5, 2021.
Written Opinion for PCT/US2020/060236, dated Nov. 23, 2021.
International Search Report and Written Opinion for PCT/US2020/060247, dated Mar. 23, 2021.
Written Opinion for PCT/US2020/060247, dated Oct. 28, 2021.
Estane® 2355-75A Technical Data Sheet, <https://plastics.ulprospector.com/datasheet/e7702/estane-2355-75a-tpu>, 3 pp, accessed Jun. 29, 2020.
Estane® 58238 Technical Data Sheet, <https://plastics.ulprospector.com/datasheet/e24205/estane-58238-tpu>, 3 pp, accessed Jun. 29, 2020.
Estane® T470A Technical Data Sheet, <http://www.matweb.com/search/datasheet_print.aspx?matguid=5539b9ce32af46358433a5a5e035570c>, 1 pp, accessed Jun. 29, 2020.

* cited by examiner

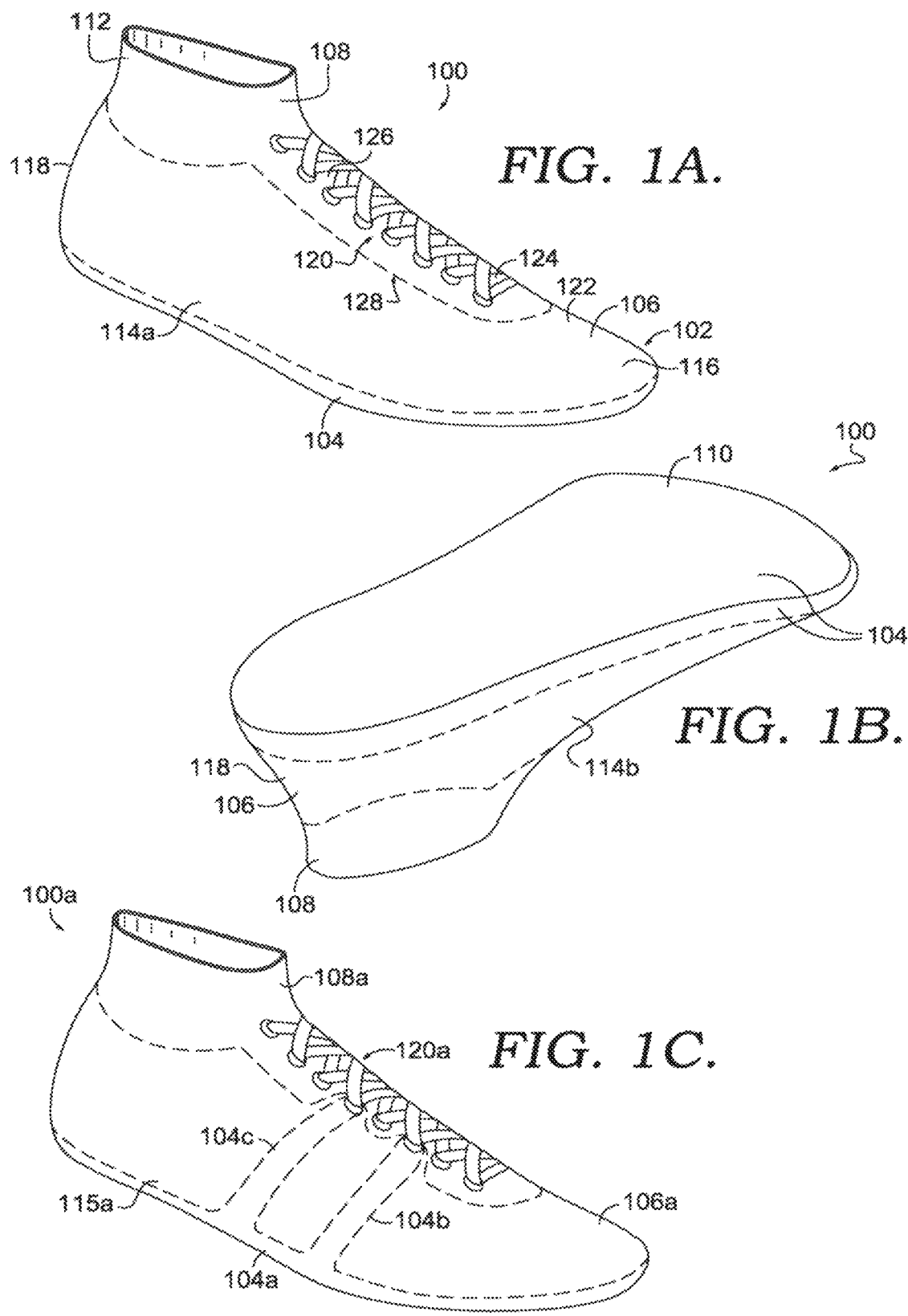

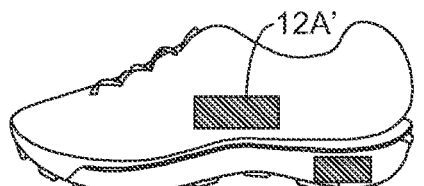
FIG. 8A
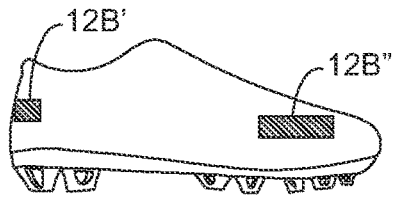
FIG. 8B
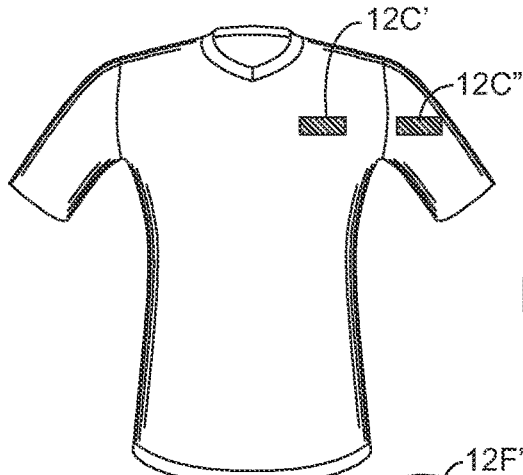
FIG. 8C
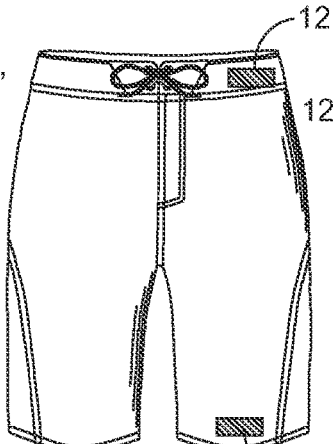
FIG. 8D
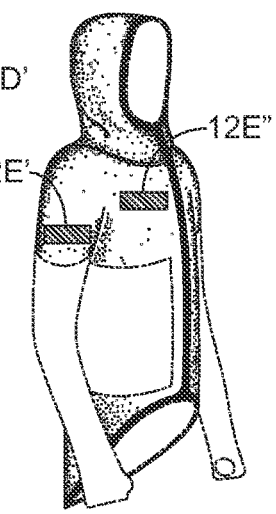
FIG. 8E
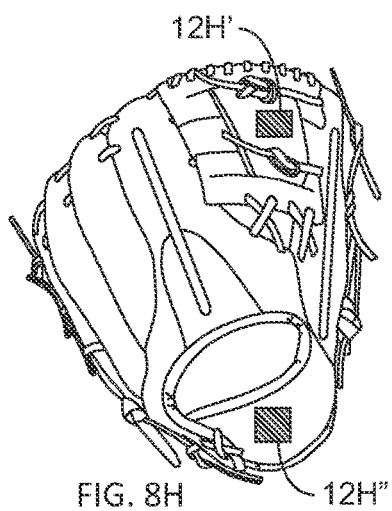
FIG. 8H
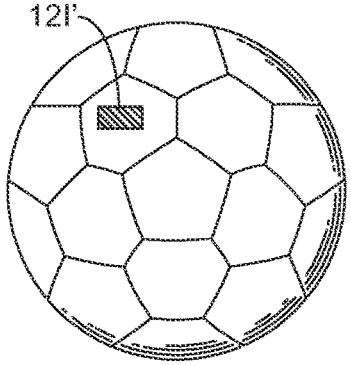
FIG. 8F
FIG. 8G
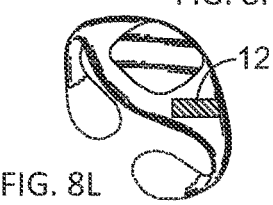
FIG. 8I
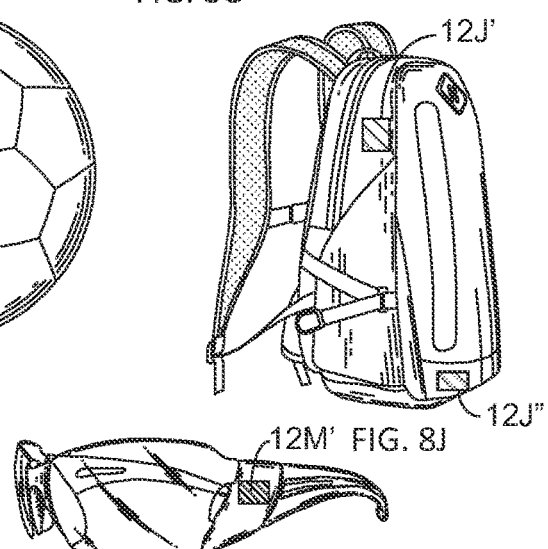
FIG. 8J
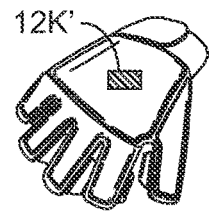
FIG. 8K
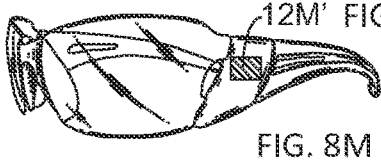
FIG. 8L
FIG. 8M

TEXTILES AND ARTICLES AND PROCESSES FOR MAKING THE SAME

CROSS-REFERENCE TO RELATED APPLICATIONS

This application claims priority to, and the benefit of, U.S. provisional application entitled "TEXTILES AND ARTICLES AND PROCESSES FOR MAKING THE SAME" having Ser. No. 62/882,008, filed Aug. 2, 2019, the contents of which are incorporated by reference in its entirety.

TECHNICAL FIELD

The present disclosure is directed to textiles, components of articles, and articles, such as articles of apparel, articles of footwear, and articles of sporting equipment. More specifically, the present disclosure is directed to textiles which include a coated yarn, and components of articles, and articles which comprise the textiles. The present disclosure is also directed to methods of making the textiles, components and articles described herein.

BACKGROUND

Traditionally, vulcanized rubber has been used to provide traction and abrasion resistance to articles such as apparel, footwear and sporting equipment. The need to vulcanize the rubber at high temperatures and/or pressures typically makes it necessary to form a separate vulcanized rubber component which is then affixed to the article using adhesives or stitching or both, as other components of the article may not be able to withstand the temperatures and/or pressures required by the vulcanization process. Alternatively, in footwear uppers, crosslinked polyurethanes can be used as durable covering layers, synthetic leather textiles, or laminate film layers. A need remains for new materials that can provide the same types of protection as vulcanized rubber or crosslinked polyurethane in addition to traction or abrasion resistance or both, and for new ways of incorporating these materials into articles.

BRIEF DESCRIPTION OF THE DRAWINGS

Further aspects of the present disclosure will be readily appreciated upon review of the detailed description, described below, when taken in conjunction with the accompanying drawings.

FIG. 1A is a top and side perspective view of an article of footwear in accordance with aspects of the present invention.

FIG. 1B is a bottom and side perspective view of the article of footwear of FIG. 1A, in accordance with aspects of the present invention.

FIG. 1C is a top and side perspective view of an alternative aspect of the article of footwear of FIG. 1A in accordance with aspects of the present invention.

FIG. 7A shows a textile comprising coated yarns according to the present disclosure prior to thermoforming, while FIG. 7C shows a textile comprising coated yarns and an additional yarn according to the present disclosure prior to thermoforming, while

FIG. 7E shows a textile comprising coated yarns on both a top and bottom face of the textile and incorporating coated yarns in the core of the textile prior to thermoforming, while

DETAILED DESCRIPTION

Figure 2A:
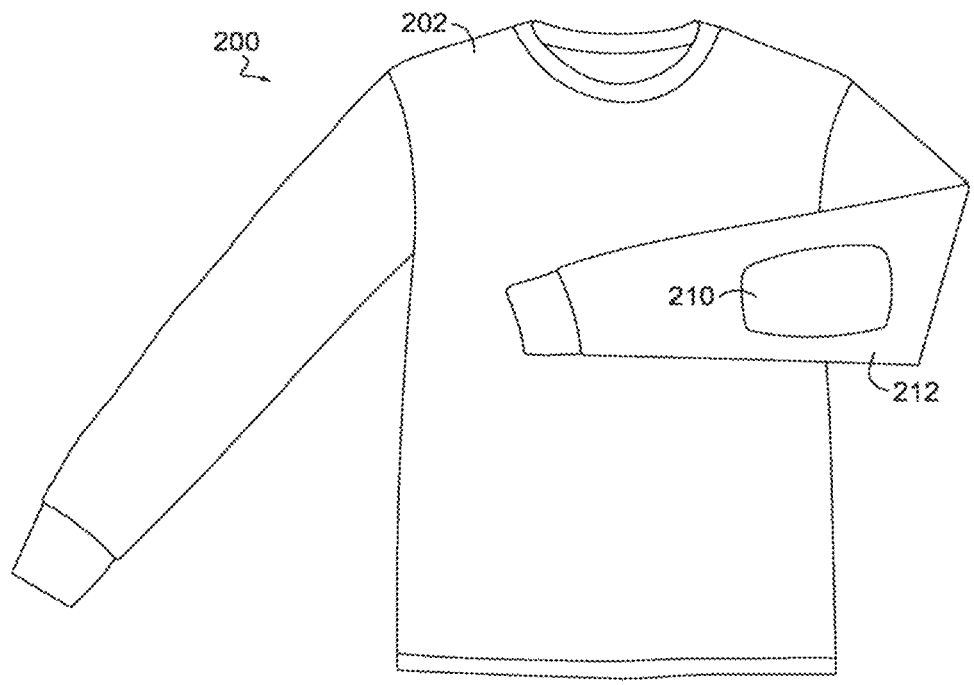
FIG. 2A is a side view of an article of apparel, primarily illustrating an elbow patch, in accordance with aspects of the present invention.

Thermoplastic elastomers have been identified which can be incorporated into polymeric compositions that provide levels of abrasion resistance, traction, or both, making them suitable for use in articles where abrasion resistance or traction are desirable, such as articles of apparel, footwear and sporting equipment. In many cases, the level of abrasion resistance, traction, or both provided by these polymeric compositions are equivalent to or better than standard vulcanized rubber compositions used in the manufacture of footwear, apparel and sporting equipment. Unlike vulcanized rubber, due to the thermoplastic nature of these polymeric compositions, and their properties in the solid and molten state, it is possible to readily form them into coated yarns which have suitable properties for use in industrial scale knitting or weaving equipment. These properties result in yarns that can readily be incorporated into various articles including textiles using conventional manufacturing processes such as knitting and weaving, as well as industrial scale processes for making non-woven textiles. Also unlike vulcanized rubber, these textiles and articles into which these textiles are incorporated can then, in turn, be thermoformed in a manner which reflows the polymeric composition of the coated yarns and creates an abrasion resistant or high traction surface on the textile or article under conditions which do not damage other components of the textile or article, such as, for example, other yarns, other textiles, foams, molded resin components, etc. The polymeric compositions disclosed herein retain their favorable properties after repeated cycles of melting and re-solidifying, making it possible to first use them to coat yarns, and then thermoform the yarns to create re-flowed structures which retain their abrasion resistance, traction properties, or both. Additionally, due to the compatibility of these polymeric compositions with other materials commonly used to make articles of footwear, apparel as sporting equipment such as polyurethanes, polyesters and polyamides, the thermoforming process may securely bond the polymeric composition to the other components, making it unnecessary to use adhesives or stitching to attach the textiles to the other component, thereby reducing the number of manufacturing steps and avoiding the use of toxic primers and adhesives.

Additionally, polymeric compositions have been found which are capable of being extruded as coatings onto core yarns in amounts and at rates needed for commercial yarn production, and which produce yarns having the balance of elongation, strength, and shrinkage necessary for use in commercial high-speed knitting equipment, either as a knitting yarn or an inlay yarn.

The coated yarns disclosed herein include a core yarn and a first coating. The core yarn can comprise a conventional monofilament or multifilament yarn such as a commercially available polyester or polyamide yarn having properties (such as denier and tenacity) sufficient for it to be manipulated by industrial-scale knitting equipment. The first coating of the coated yarn comprises a polymeric composition which is a thermoplastic elastomeric composition. While it is possible to extrude a polymeric composition which is a thermoplastic elastomeric composition and form fibers, filaments, yarns or films directly from the polymeric composition, due to its elastomeric properties, these forms of the polymeric composition will have high levels of stretch and heat shrinkage. This means the fibers, filaments, yarns or films may tend to stretch around machine guides rather than slide past them, and may tend to shrink at the temperatures commonly encountered in industrial-scale knitting and weaving equipment. However, by applying the polymeric composition as a coating onto a core yarn which is suitable to be mechanically manipulated, the resulting coated yarn retains the tenacity and stretch resistance of the core yarn, while also providing an outer surface having superior traction and abrasion resistance provided by the polymeric composition due to its elastomeric properties. For example, it has been found that a 150 denier core yarn having a tensile strength of at least 1 kilogramforce at break and less than 20 percent strain to break, and heat shrink of less than 20 percent can be coated with the polymeric composition to a nominal average outer diameter of up to about 1.0 millimeter, and retain its ability to be knit or inlaid using commercial flat-knitting equipment. Due to the ability to use this yarn on industrial-scale equipment, this coated yarn also opens up possibilities for new methods of manufacturing which allow placement of the polymeric composition within textiles and articles comprising the textiles at greater levels of specificity in terms of both location and amount as compared to conventional manufacturing processes.

Additionally, the thermoplastic nature of the polymeric composition makes it possible to melt the composition and use it to coat the core yarn when the melting temperature of the polymeric composition is sufficiently lower than the deformation temperature of the core yarn, as well as to subsequently thermoform the textile to create a thermoformed network comprising both the core yarn and the re-flowed and re-solidified polymeric composition consolidating the core yarn. When the textile includes one or more second yarn in addition of the coated yarn, the thermoformed network of yarns (i.e., the core yarn and the one or more second yarn) are consolidated by the re-flowed and re-solidified polymeric composition. The presence of the re-flowed and re-solidified polymeric composition can serve one or more functions within the thermoformed textile, such as controlling the level of stretch within the entire textile or just within a region of the textile, forming a skin having high abrasion-resistance and/or traction across an entire surface of the textile or just within a region of the textile, improving water resistance of an entire surface of the textile or just within a region of the textile, or bonding all of the textile or just a region of the textile to a substrate. Use of the coated yarn in these textiles can also reduce the number of different materials required to form an article. The coating of the coating yarn, when thermoformed, can form a skin on a surface of the textile. Alternatively or additionally, the coating of the coating yarn, when thermoformed, can act as a bonding agent, either to bond yarns together within the textile, or to bond other elements to a surface of the textile. Conventionally, a separate film layer is required to form a skin on a textile, or a separate adhesive layer is required to bond yarns within a textile or to bond other elements to the surface of a textile. For example, in a conventional article of footwear, the upper may incorporate elements such as multiple layers of textiles, films and/or cables to limit stretch of regions of the upper, separate elements or layers of textiles, films or rubber to increase abrasion resistance of the upper, separate elements or layers of rubber to form areas of high traction on an outsole, and separate layers of adhesives or cements to bond the various elements or layer to each other. The use of the thermoformed textiles described herein can replace one or more of the separate elements, reducing waste and simplifying manufacturing processes while improving recyclability of the articles.

As will be discussed below, in one aspect, the thermoformed textiles comprising coated yarns as described herein can be used to form uppers for articles of footwear. In a particular aspect, the thermoformed network of the thermoformed textile can form an externally-facing surface of an upper, such as an upper for a global football boot. Unexpectedly, the thermoformed network formed by thermoforming the textiles has superior properties for ball contact, in that the properties of the thermoformed network can be equal to or superior to those of kangaroo skin leather in terms of the spin rate imparted to the ball by the upper when kicking the ball. For example, it has been found that using polymeric compositions having a Durometer hardness of about 65 to about 85 results in uppers with improved ball spin rates. Uppers comprising the textiles described herein have also been found to be equivalent to or superior to those of synthetic leather or knit uppers coated with a DURAGON skin in terms of traction under wet and dry conditions. Additionally, as uppers formed from the thermoformed textiles use fewer components in the manufacturing process and do not rely on animal-based materials, their manufacture produces less waste while using more sustainable materials which can be recycled.

In another aspect, the thermoformed textiles comprising coated yarns as described herein can be used to form outsoles for articles of footwear. In a particular aspect, the thermoformed network of the thermoformed textile can form an externally-facing surface of an outsole, including a ground-facing surface or a ground-contacting surface of an outsole. Conventionally, cross-linked polymeric compositions such as vulcanized rubber or cross-linked polyurethanes have been used for outsoles due to their high levels of abrasion resistance and traction. Unexpectedly, it has been found that the use of the textiles including coated yarns comprising polymeric coatings disclosed herein can be used to replace cross-linked polymeric compositions as outsole materials, while retaining the high levels of traction and abrasion resistance required for outsoles. Specifically, by using the coated yarns described herein which can be used in commercial knitting machines, it is possible to create thermoformed networks which provide levels of abrasion resistance and traction equivalent to, and in come cases superior to, conventional outsole materials. As these thermoformed networks can be formed at lower temperatures and pressures as compared to conventional vulcanization processes, it is possible to thermoform the textiles while they are in contact with other components such as other textiles or molded resin components, thereby reducing energy consumption and reducing manufacturing steps.

The present disclosure is directed to a textile comprising a first network of yarns including a first coated yarn, wherein the first coated yarn comprises a core yarn and a first coating, wherein the first coating comprises a first polymeric composition. The first polymeric composition is a thermoplastic elastomeric composition, and comprises at least one thermoplastic elastomer. In some aspects, the first network of yarns further comprises one or more second yarns. The one or more second yarns can be coated yarns, or can be uncoated yarns. The textile can be a knit textile, and the first network of yarns can include interconnected loops of the first coated yarn, or can include the first coated yarn inlaid in a knit structure formed of interconnecting loops of one or more second yarns.

The present disclosure is directed to a textile, comprising: a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition.

The present disclosure is directed to a textile, comprising: a thermoformed network of yarns, the thermoformed network comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition.

The present disclosure is directed to an upper for an article of footwear, comprising: a textile, wherein the textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition.

The present disclosure is directed to an upper for an article of footwear, comprising: a first textile comprising a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition.

The present disclosure is directed to an outsole for an article of footwear, comprising: a textile comprising a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition.

The present disclosure is directed to a method of making a textile, the method comprising: forming a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition.

The present disclosure is directed to a method of making a textile, the method comprising: thermoforming a first textile comprising a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition; thereby forming a thermoformed network of yarns comprising the first core yarn and the first polymeric composition, wherein the first polymeric composition consolidates the thermoformed network of yarns by surrounding at least a portion of the first core yarn and occupying at least a portion of spaces between yarns in the thermoformed network of yarns.

The present disclosure is directed to a method of making an upper for an article of footwear, the method comprising: affixing a first textile to a second component, wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition.

The present disclosure is directed to a method of making an upper for an article of footwear, the method comprising: thermoforming an upper comprising a first textile, wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition; and wherein the thermoforming comprises melting, reflowing, and re-solidifying the first polymeric composition within the first textile, forming a thermoformed textile comprising a thermoformed network of yarns comprising the first core yarn and the first polymeric composition, wherein the first polymeric composition consolidates the thermoformed network of yarns by surrounding at least a portion of the first core yarn and occupying at least a portion of spaces between yarns in the thermoformed network of yarns.

The present disclosure is directed to a method of making an upper for an article of footwear, the method comprising: affixing a first textile to a second component, wherein the first textile comprises a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition.

The present disclosure is directed to a method for making an outsole for an article of footwear, the method comprising thermoforming a first textile; wherein the thermoforming comprises thermoforming the textile on a sole component, or on a molding surface, optionally wherein the molding surface is a molding surface having the dimensions of the outsole; wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition; and wherein the thermoforming comprises melting, reflowing, and re-solidifying the first polymeric composition within the first textile, forming a thermoformed textile comprising a thermoformed network of yarns comprising the first core yarn and the first polymeric composition, wherein the first polymeric composition consolidates the thermoformed network of yarns by surrounding at least a portion of the first core yarn and occupying at least a portion of spaces between yarns in the thermoformed network of yarns.

The present disclosure is directed to a method of making an article, comprising: affixing a first textile to a second component, wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition.

The present disclosure is directed to a method of making an article, the method comprising: thermoforming a first textile, wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition; and wherein the thermoforming comprises melting, reflowing, and re-solidifying the first polymeric composition within the first textile, forming a thermoformed textile comprising a thermoformed network of yarns comprising the first core yarn and the first polymeric composition, wherein the first polymeric composition consolidates the thermoformed network of yarns by surrounding at least a portion of the first core yarn and occupying at least a portion of spaces between yarns in the thermoformed network of yarns.

The present disclosure is directed to a method of making an article, the method comprising: affixing a first textile to a second component, wherein the first textile comprises a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition; optionally wherein the article is a component of an article of footwear, apparel or sporting equipment, or is an article of footwear, apparel or sporting equipment.

The present disclosure is directed to an outsole for an article of footwear, comprising:
a textile comprising a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition comprises a thermoplastic elastomeric polyurethane, wherein the first polymeric composition has a Durometer Hardness of from about 70 to about 80 Shore A, as determined using the Durometer Hardness Test;
wherein the thermoformed network of yarns is the thermoformed product of a first textile comprising a first network of yarns including a first coated yarn comprising the first core yarn and a first coating, the first coating comprising the first polymeric composition, the first core yarn comprising a second polymeric composition, wherein the first coating is axially centered surrounding the core yarn, a nominal average outer diameter of the coated yarn is up to about 1.0 millimeter, the first coating has an average radial coating thickness of about 50 micrometers to about 200 micrometers, and wherein, in the thermoformed network, the first polymeric composition consolidating the thermoformed network of yarns is the re-flowed and re-solidified product of the first polymeric composition of the first coating of the first coated yarn;
wherein, in the first coated yarn, the first thermoplastic composition has a first melting temperature greater than about 110 degrees Celsius and less than about 190 degrees Celsius, the second polymeric composition of the core yarn has a second deformation temperature, and the second deformation temperature is at least 50 degrees Celsius greater than the first melting temperature of the first polymeric composition;
wherein a first side of the thermoformed network defines at least a portion of a surface of the outsole configured to be externally-facing or ground-facing or ground-contacting when the outsole is part of a finished article of footwear.

The present disclosure is directed to an upper for an article of footwear, comprising:
a knit textile comprising a thermoformed network of interlooped yarns comprising a first core yarn and a first polymeric composition, wherein the first polymeric composition consolidates the thermoformed network of interlooped yarns by surrounding at least a portion of the first core yarn and occupying at least a portion of spaces between yarns in the thermoformed network of yarns, wherein the first polymeric composition comprises a thermoplastic elastomeric polyurethane, and wherein the first polymeric composition has a Durometer Hardness using a Shore A scale of from about 70 to about 80, as determined using the Durometer Hardness Test;
wherein the thermoformed network of yarns is the thermoformed product of a first textile comprising a first network of yarns including a first coated yarn comprising the first core yarn and a first coating, the first coating comprising the first polymeric composition, the first core yarn comprising a second polymeric composition, wherein the first coating is axially centered surrounding the core yarn, a nominal average outer diameter of the coated yarn is up to about 1.0 millimeter, the first coating has an average radial coating thickness of about 50 micrometers to about 200 micrometers, and wherein, in the thermoformed network, the first polymeric composition consolidating the thermoformed network of yarns is the re-flowed and re-solidified product of the first polymeric composition of the first coating of the first coated yarn;

wherein, in the first coated yarn, the first thermoplastic composition has a first melting temperature greater than about 110 degrees centigrade and less than about 190 degrees centigrade, the second polymeric composition of the core yarn has a second deformation temperature, and the second deformation temperature is at least 50 degrees centigrade greater than the first melting temperature of the first polymeric composition;

wherein the thermoformed network of the textile defines at least a portion of a surface of the upper configured to be externally-facing when the upper is part of a finished article of footwear;

wherein the at least a portion of the surface of the upper defined by the thermoformed network has a total surface area of at least 1 square centimeter, and within the total surface area, at least 15 to 100 percent of the total surface area comprises the first polymeric composition.

The present disclosure is directed to an outsole for an article of footwear, comprising:

a textile comprising a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition comprises a thermoplastic elastomeric styrenic copolymer, wherein the first polymeric composition has a Durometer Hardness of from about 70 to about 80 Shore A, as determined using the Durometer Hardness Test;

wherein the thermoformed network of yarns is the thermoformed product of a first textile comprising a first network of yarns including a first coated yarn comprising the first core yarn and a first coating, the first coating comprising the first polymeric composition, the first core yarn comprising a second polymeric composition, wherein the first coating is axially centered surrounding the core yarn, a nominal average outer diameter of the coated yarn is up to about 1.0 millimeter, the first coating has an average radial coating thickness of about 50 micrometers to about 200 micrometers, and wherein, in the thermoformed network, the first polymeric composition consolidating the thermoformed network of yarns is the re-flowed and re-solidified product of the first polymeric composition of the first coating of the first coated yarn;

wherein, in the first coated yarn, the first thermoplastic composition has a first melting temperature greater than about 110 degrees Celsius and less than about 190 degrees Celsius, the second polymeric composition of the core yarn has a second deformation temperature, and the second deformation temperature is at least 50 degrees Celsius greater than the first melting temperature of the first polymeric composition;

wherein a first side of the thermoformed network defines at least a portion of a surface of the outsole configured to be externally-facing or ground-facing or ground-contacting when the outsole is part of a finished article of footwear.

The present disclosure is directed to an upper for an article of footwear, comprising:

a knit textile comprising a thermoformed network of interlooped yarns comprising a first core yarn and a first polymeric composition, wherein the first polymeric composition consolidates the thermoformed network of interlooped yarns by surrounding at least a portion of the first core yarn and occupying at least a portion of spaces between yarns in the thermoformed network of yarns, wherein the first polymeric composition comprises a thermoplastic elastomeric styrenic copolymer, and wherein the first polymeric composition has a Durometer Hardness using a Shore A scale of from about 70 to about 80, as determined using the Durometer Hardness Test;

wherein the thermoformed network of yarns is the thermoformed product of a first textile comprising a first network of yarns including a first coated yarn comprising the first core yarn and a first coating, the first coating comprising the first polymeric composition, the first core yarn comprising a second polymeric composition, wherein the first coating is axially centered surrounding the core yarn, a nominal average outer diameter of the coated yarn is up to about 1.0 millimeter, the first coating has an average radial coating thickness of about 50 micrometers to about 200 micrometers, and wherein, in the thermoformed network, the first polymeric composition consolidating the thermoformed network of yarns is the re-flowed and re-solidified product of the first polymeric composition of the first coating of the first coated yarn;

wherein, in the first coated yarn, the first thermoplastic composition has a first melting temperature greater than about 110 degrees centigrade and less than about 190 degrees centigrade, the second polymeric composition of the core yarn has a second deformation temperature, and the second deformation temperature is at least 50 degrees centigrade greater than the first melting temperature of the first polymeric composition;

wherein the thermoformed network of the textile defines at least a portion of a surface of the upper configured to be externally-facing when the upper is part of a finished article of footwear;

wherein the at least a portion of the surface of the upper defined by the thermoformed network has a total surface area of at least 1 square centimeter, and within the total surface area, at least 15 to 100 percent of the total surface area comprises the first polymeric composition.

In one aspect, the deformation temperature of the polymeric composition of the core yarn is at least 20 degrees Celsius higher than the melting temperature of the polymeric composition of the coating. This allows the core yarn to be coated by the coating when the coating is in a molten state. In another aspect, the thermoplastic elastomer(s) of the polymeric composition of the coating have glass transition temperature(s) below minus 20 degrees Celsius. This allows the thermoplastic elastomer(s) present in the polymeric composition to be in their "rubbery" state, even when the article comprising the textile is used in cold environments. In another aspect, the melting temperature of polymeric composition of the coating is at least 100 degrees Celsius. This ensures the polymeric composition will not melt when the article comprising the textile is shipped or stored under hot conditions. In another aspect, the melting temperature of polymeric composition of the coating is at least 130 degrees Celsius. This ensures the polymeric composition will not melt when the article comprising the textile is subjected to conditions often encountered by textiles during the manufacturing processes for articles of footwear, apparel or sporting equipment, such as steaming processes. In another aspect, the melting temperature of polymeric composition of the coating is at less than 170 degrees Celsius. This ensures the textile can be thermoformed at temperatures which do not negatively impact other textiles or components which may form part of the textile or article comprising the textile. For example, dye may migrate out of package-dyed polyester yarns when they are exposed to temperatures greater than 150 degrees Celsius for extended periods of time. In another aspect, the enthalpy of melting of the thermoplastic elastomer(s) of the polymeric composition of the coating can be less than about 30 Joules per gram or 25 Joules per gram. A lower melting enthalpy means that, during the thermoforming process, less heat and a shorter heating time is required to fully melt the polymeric composition and achieve good flow of the molten polymeric composition to better consolidate the network of yarns in the textile. In another aspect, the recrystallization temperature of thermoplastic elastomer(s) of the polymeric composition of the coating can be above 60 degrees Celsius, or above 95 degrees Celsius. A higher recrystallization temperature promotes rapid re-solidification of the polymeric composition after thermoforming, which can reduce the amount of time required to cool the textile after thermoforming, and may avoid the need to provide active cooling of the textile, thereby reducing cycle time and reducing energy consumption.

The present disclosure is directed to a film, fiber, filament or yarn comprising a first polymeric composition comprising at least one thermoplastic elastomer.

The present disclosure is also directed to a textile comprising a film, fiber, filament or yarn comprising a first polymeric composition comprising at least one thermoplastic elastomer.

The present disclosure is also directed to process for manufacturing a film, fiber, filament or yarn, comprising using a first polymeric composition comprising at least one thermoplastic elastomer to form the film, fiber, filament or yarn.

The present disclosure is also directed to a textile comprising a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition.

The present disclosure is also directed to process for manufacturing a textile comprising using a film, fiber, filament or yarn as described herein.

The present disclosure is also directed to an article comprising: a first polymeric composition, wherein the first polymeric composition is a reflowed and re-solidified product of a film, fiber, filament or yarn as described herein; and a second element selected from a second shaped component, a second film, a second fiber, a second filament, a second yarn, or a second textile.

The present disclosure is also directed to a process for manufacturing an article, the process comprising: placing a first film, fiber, filament, yarn, or textile comprising a first polymeric composition comprising a thermoplastic elastomer as described herein, or a textile comprising the first polymeric composition comprising the thermoplastic elastomer as described herein on a surface; while the first film, fiber, filament, yarn or textile is on the surface, increasing a temperature of the first film, fiber, filament, yarn or textile to a temperature that is above the melting temperature of the first polymeric composition; and subsequent to the increasing the temperature, while the first film, fiber, filament, yarn or textile remains on the surface, decreasing the temperature to a temperature below the melting temperature of the first polymeric composition, thereby forming a article.

Described herein are films comprising a first polymeric composition comprising at least one thermoplastic elastomer. In some aspects, the first polymeric composition of the film can be a low processing temperature polymeric composition. In various aspects, the film can be a multi-layered film comprising a first layer comprising the first thermoplastic elastomer. For example, the multi-layered film can be a bilayer film comprising a first layer comprising the first thermoplastic elastomer and a second layer comprising a second polymeric material. The second polymeric material can be a second thermoplastic composition comprising a second thermoplastic elastomer. The multi-layered film can be formed by co-extrusion or lamination.

Described herein are fibers comprising the first polymeric composition comprising at least one thermoplastic elastomer. As used herein, the "fiber" is understood to be a fiber suitable for use in a yarn or a textile. A fiber has a small diameter relative to its length, where its length is discrete, e.g., a cut or staple fiber include filaments. In various aspects, the fiber can be a single-component fiber composed of one thermoplastic composition. In other aspects, the fiber can be a bi-component fiber composed of two thermoplastic compositions. In a further aspect, the fiber can be a multi-component fiber composed of three or more thermoplastic compositions.

Described herein are filaments comprising the first polymeric composition comprising at least one thermoplastic elastomer. As used herein, the "filament" is understood to be filament suitable for use in a yarn or a textile. A filament has a small diameter relative to its length, where its length is many orders of magnitude greater than its diameter, such as a silk filament or extruded filament, or can be substantially continuous, such as an extruded filament. In various aspects, the filament can be a single-component filament composed of one thermoplastic composition. In other aspects, the filament can be a bi-component filament composed of two thermoplastic compositions. In a further aspect, the filament can be a multi-component fiber composed of three or more thermoplastic compositions. The filament can be a single filament, e.g., a monofilament. Alternatively, the filament can be a plurality of filaments. The plurality of filaments can include filaments formed of a single thermoplastic composition, or a plurality of filaments formed from two or more different thermoplastic compositions. The plurality of filaments can be a plurality of loose (i.e., not entangled) filaments, or can be a plurality of entangled filaments.

Described herein are yarns useful in making textiles. In one aspect, the yarn comprises a coating of a first polymeric composition comprising at least one thermoplastic elastomer. The yarns can be formed using staple fibers or continuous filaments comprising of the thermoplastic composition. In one aspect, the fibers or filaments used to produce the yarn comprise a single polymeric composition. The first polymeric composition can be a low processing temperature polymeric composition. In one example, the yarn can be a coated yarn having a core, wherein the core comprises a high processing temperature polymeric composition, and the coating comprises the low processing temperature polymeric composition. Alternatively, the yarn can comprise fibers, filaments, cores and/or coatings formed from two or more different polymeric compositions.

In one aspect, using a coated yarn allows the incorporation of desirable rubbery polymeric properties into textiles. In one aspect, tensile strength of a 150 denier, high tenacity core polyester eliminates excess stretch and heat shrink risks. In one aspect, the tensile strength of the yarn is about 1 kilogramforce at break, and less than 20 percent strain to break, or less than 15 percent strain to break, or from about 10 to about 12 percent strain to break. In another aspect, heat shrink for the coated yarns is less than 20 percent or less than 10 percent upon heating.

In some aspects, use of lubricating oil such as mineral oil or silicone oil enables knitting of elastomer-coated yarns to be comparable to knitting of common polyester yarns. In one aspect, from about 0.1 weight percent to about 3 weight percent of the textile, or about 0.5 weight percent to about 2 weight percent of the textile. In one aspect, the lubricating composition can be applied to the coated yarn after the coating process. In another aspect, the lubricating compositions can be admixed with the first polymeric composition prior to coating the core yarn.

In another aspect, the yarn can be coated by any method known in the art. In one aspect, the polymeric coating compositions disclosed herein are suitable for manufacturing by pultrusion and/or pulling the yarns through baths of liquid polymeric materials. In still another aspect, regardless of coating process, sufficient coating material is provided on the yarn such that, when knit or woven alone or with one or more other yarns in various configurations and subsequently thermoformed and allowed to re-flow and re-solidify, the polymeric material forms a structure with an adequate concentration of the polymeric material on one or more surfaces, and/or within the core, depending upon the placement of the coated yarn within the knit or woven structure.

The foregoing films, fibers, filaments, yarns, or any combination thereof, can be used to prepare a textile. The textile can comprise one or more of the disclosed films, fibers, filaments or yarns. In various aspects, the textile can be a woven textile comprising one or more of the disclosed films, fibers, filaments, or yarns. In a further aspect, the textile can be a knit textile comprising one or more disclosed films, fibers, filaments, or yarns. In a still further aspect, the textile can be a non-woven textile comprising one or more of the disclosed films, fibers, filaments or yarns. In other aspects, the textile can be a crocheted textile or braided textile comprising one or more of the disclosed films, fibers, filaments or yarns.

In an aspect, a textile is provided comprising a first film, fiber, filament or yarn described herein. In one aspect, the textile further includes a second yarn, where the second yarn is different from the first yarn (e.g., comprises at least one thermoplastic elastomer that differs from a thermoplastic elastomer of the first polymeric composition based on molecular weight, polymeric structure, melting temperature, melt flow index, hardness, or modulus). In another aspect, the second yarn is substantially free of a thermoplastic elastomer.

In one aspect, the textile comprises a first network of yarns including a first coated yarn, where the first coated yarn includes a first core yarn and a first coating including a first polymeric composition disposed on at least a portion of an outer surface of the first core yarn, wherein the first polymeric composition is a thermoplastic elastomeric composition.

The first yarn and second yarn can be used so as to form separate zones of the textile. For example, the first yarn can form a majority of a first surface of the textile, and the second yarn can form a majority of a second surface opposing the first surface of the textile. The first yarn and the second yarn can be laid down in a first zone and an adjacent second zone, wherein the first zone comprises an increased concentration of the second yarn compared to the second zone. The first yarn and the second yarn can be laid down in a first zone, a second zone, and a third zone, the second zone positioned between the first and third zones, wherein the first zone comprises an increased concentration of the second yarn compared to the second zone, and wherein the third zone comprises an increased concentration of the first yarn compared to the second zone. percent In an aspect, a woven textile is provided comprising a first film, fiber, filament, or yarn as described herein. Optionally, the woven textile further includes a second film, fiber, filament or yarn, where the second yarn has a higher melting or deformation temperature from the first yarn. In another aspect, the second film, fiber, filament or yarn is substantially free of a thermoplastic elastomer. The first film, fiber, filament or yarn and the second film, fiber, filament or yarn can be used to form separate zones of the woven thermoformed textile. For example, a first yarn can form substantially all or a portion of a warp of the weave of the woven thermoformed textile, and a second yarn can form substantially all or a portion of a weft of the weave of the woven thermoformed textile, or vice versa.

In an aspect, a knit or crochet textile is provided comprising a first film, fiber, filament or yarn as described herein. The knit or crochet textile can optionally further include a second film, fiber, filament or yarn, where the second film, fiber, filament or yarn has a higher melting temperature or deformation temperature from the first film, fiber, filament or yarn In another aspect, the second film, fiber, filament or yarn is substantially free of a thermoplastic elastomer. A first yarn and a second yarn can at least partly form a plurality of interconnected courses in at least one knit layer of a knit textile. Alternatively, the knit or crochet textile can include interconnected loops comprising a second yarn and inlaid portions comprising the first film, fiber, filament or yarn, wherein the second yarn has a melting temperature or deformation temperature greater than the melting temperature of the first polymeric composition.

The knit textile can be formed through one or more of a variety of a knitting process, such as flat knitting or circular knitting. For example, a flat knitting process can be utilized to manufacture the knit textile. Although flat knitting can provide a suitable process for forming the knit textile, other knitting processes can also be utilized such as wide tube circular knitting, narrow tube circular knit jacquard, single knit circular knit jacquard, double knit circular knit jacquard, warp knit tricot, warp knit raschel, and double needle bar raschel. In aspects, the knit textile can be subject to post-processing steps, e.g., to remove a portion of the knit textile, to add components to the knit textile, to create a fleece texture, etc. In other aspects, the knit textile can comprise various knitted structures and/or comprise different knitted sublayers.

In certain aspects, the knit textile can be a knit article having a substantially seamless configuration. In certain aspects, the entire knit article can be seamless. The seamless knit article may, for example, be provided by circular knitting. A circular knit article can allow a three-dimensionally preshaped article to be provided without having to be sewn up at a designated place(s). Thus, unwanted seams in the knit article can be avoided and the three-dimensionally preshaped knit article can have a particularly good fit and the additional aforementioned benefits of a seamless structure.

In a further aspect, the knit textile can be a knit article formed of unitary knit construction. As utilized herein, a knit article is defined as being formed of "unitary knit construction" when formed as a one-piece element through a knitting process. That is, the knitting process substantially forms the various features and structures of the knit article without the need for significant additional manufacturing steps or processes. Although portions of the knit article can be joined to each other (e.g., edges of the knit article being joined together, as at seam) following the knitting process, the knit article remains formed of unitary knit construction because it is formed as a one-piece knit element. In various aspects, the knit article can further comprise other elements (e.g., a tongue, a strobel, a lace, a heel counter, logos, trademarks, placards) that can be added following the knitting process.

The knit textile can incorporate various types and combinations of stitches and yarns. With regard to stitches, the knit textile can have one type of stitch in one area of the knit textile and another type of stitch in another area of the knit textile. Depending upon the types and combinations of stitches utilized, areas of the knit textile can have, for example, a plain knit structure, a mesh knit structure, or a rib knit structure. The different types of stitches may affect the physical properties of the knit textile, including aesthetics, stretch, thickness, air permeability, and abrasion-resistance. That is, the different types of stitches may impart different properties to different areas of knit textile. With regard to yarns, the knit textile may have one type of yarn in one area of the knit textile and another type of yarn in another area of the knit textile, e.g., a yarn comprising a first polymeric composition in one area of the knit textile and a yarn comprising a second polymeric composition, such as a thermoplastic composition, in another area of the knit textile. Depending upon various design criteria, the knit textile can incorporate yarns with different deniers, materials (e.g., cotton, elastane, polyester, rayon, wool, and nylon), and degrees of twist, for example. The different types of yarns may affect the physical properties of the knit textile, including aesthetics, stretch, thickness, air permeability, and abrasion-resistance. That is, the different types of yarns may impart different properties to different areas of the knit textile. By combining various types and combinations of stitches and yarns, each area knit article can have specific properties that enhance the comfort, durability, and performance of the knit textile as required by its use in an article of footwear, article of apparel, or article of sporting equipment.

It should be noted, however, that the textiles and thermoformed textiles of the present disclosure, including knit articles, can be utilized in manufacture of composite elements. In some aspects, a composite element can comprise a first textile prepared as disclosed herein, along with a second textile or a film or a shaped component. That is, the composite element comprises a first textile region and a second region selected from a region comprising a second textile, a region comprising a film, a region comprising a shaped component, or combinations thereof.

In certain aspects, a thermoformed textile is provided according to the present disclosure. As used herein, a thermoformed textile is understood to be a textile comprising the first polymeric composition that has been thermoformed to have a different shape or texture or both. The thermoforming can be conducted on a substantially flat surface such as a plate, or in a shaped mold, or on a shaped article such as a last. For example, the thermoformed textile is a textile in which at least a portion of the first polymeric composition present in the textile has been thermoformed (i.e., softened, molded and re-solidified, or melted, molded and re-solidified, such that at least a portion of the first network of yarns of the textile becomes a thermoformed network of yarns in which the first polymeric composition of the coated yarn consolidates the thermoformed network of yarns by surrounding at least a portion of the first core yarn and occupying at least a portion of spaces between yarns). Once thermoformed, the first polymeric composition of a thermoformed textile has a different physical shape than before it was thermoformed and retains this second shape until the first polymeric composition is thermoformed again. In one example, the thermoforming process re-flows the first polymeric composition from a first state as a first film to a second state in which the first polymeric composition penetrates into or between portions of the textile which had surrounded the first film. For example, during the thermoforming process, the molten first polymeric composition may penetrate between or into second fibers, filaments or yarns of the textile, and may, when re-solidified, act as a consolidating resin for the second fibers, filaments or yarns. In another example, the thermoforming process re-flows the plurality of fibers, filament, plurality of filaments, yarn, plurality of yarns, or any combination thereof, into a second state, in which the first polymeric composition no longer has a fibrous, filamentous, or yarn-like configuration.

The thermoformed textile comprising the first polymeric composition can be a thermoformed textile wherein at least a portion of the film, plurality of fibers, filament, plurality of filaments, yarn, yarns, or any combination thereof have been at least partially melted and re-solidified into a new conformation which is different than their original (i.e., pre-thermoforming) conformation. The thermoformed textile can comprise a partially re-flowed structure in which only a portion of the first polymeric composition present in the textile has been re-flowed, or an essentially completely re-flowed structure in which substantially all of the first polymeric composition present in the textile has been re-flowed. The thermoformed textile can also include a second plurality of fibers including a second polymeric composition, such as a second polymeric composition comprising a second thermoplastic elastomer. In an aspect, zones or regions of the textile can be thermoformed into continuous, film-like layers, or thermoformed and molded to adopt desired surface topographies.

The textile or thermoformed textile as described herein can be a component of an article of footwear. The textile or thermoformed textile can be used to provide or enhance properties of the article such as, for example, abrasion resistance, traction, grip, or a combination of these properties to at least a portion of the article of footwear. The textiles described herein can define an externally-facing surface of the article of footwear. In one aspect, the textile or thermoformed textile is a component of an upper for an article of footwear. In one aspect, disclosed herein is an upper for an article of footwear comprising a textile, wherein the textile comprises a first network of yarns including a first coated yarn, where the first coated yarn comprises a first core yarn and a first coating including a first polymeric composition disposed on at least a portion of an outer surface of the first core yarn, wherein the first polymeric composition is a thermoplastic elastomeric composition. In an aspect, the textile defines at least a portion of a surface of the upper configured to be externally facing when the upper is part of a finished article of footwear.

In another aspect, the textile or thermoformed textile is an outsole for an article of footwear or is a component of an article of footwear. In another aspect, the textile or thermoformed textile is a rand or zone bridging a region between a footwear upper and the sole structure. In yet another aspect, the textile or thermoformed textile is a combination upper and outsole for an article of footwear, wherein the upper includes an integrated outsole area. Optionally, the upper and the integrated outsole area are at least partially formed from a textile. The outsole, or the outsole area of the combination upper and outsole can be configured to include a ground-facing surface, or a ground-contacting surface, or both, and at least a portion of the textile described herein defines at least a portion of the ground-facing surface, or the ground-contacting surface, or both. For example, the outsole or outsole area can be configured to include a ground-facing surface but not a ground-contacting surface, and at least a portion of the textile defines at least a portion of the ground-facing surface. In another example, the outsole or outsole area can be configured to include a ground-facing surface but not a ground-contacting surface, and at least a portion of the textile defines at least a portion of the ground-facing surface, and wherein the at least a portion of the textile defines the at least a portion of the ground-facing surface is textured, or includes at least one traction element, or both. Optionally, the at least one traction element can a thermoformed traction element formed from the textile.

The textile or thermoformed textile as described herein can be a component of an article of apparel. The textile can define an externally-facing surface of the article of apparel. The textile or thermoformed textile can be used to provide abrasion resistance or traction or both to at least a portion of the article of apparel, such as, for example on an elbow area, a knee area, or both. The textile or thermoformed textile can be used to provide protection to electronic components embedded in or attached to the article of apparel. The textile or thermoformed textile can be used to provide protection to a wearer from hard or sharp components embedded in or attached to the article of apparel.

The textile or thermoformed textile as described herein can be a component of an article of sporting equipment. The textile can define an externally-facing surface of the article of sporting equipment. The textile or thermoformed textile can be used to provide abrasion resistance or traction or both to at least a portion of the article of sporting equipment, such as a portion of the article of sporting equipment which contacts the ground or had surfaces during use. The textile or thermoformed textile can be used to provide protection to electronic components embedded in or attached to the article of sporting equipment.

In certain aspects, the present disclosure is also directed to articles comprising a thermoformed film component that has been thermoformed from a first state as a film into a second state as a softened or melted and re-solidified film (i.e., a film comprising a first polymeric composition, wherein at least a portion of the film has been softened or melted and re-solidified into a new conformation which is different than its original film conformation prior to thermoforming). The thermoforming can be conducted on a substantially flat surface such as a plate, or in a shaped mold, or on a shaped article such as a last.

The thermoformed film component as described herein can be a component of an article of footwear. The thermoformed film component can be used to provide abrasion resistance or traction or both to at least a portion of the article of footwear. The first polymeric composition can define an externally-facing surface of the article of footwear. In one aspect, the thermoformed film component is a component of an upper for an article of footwear. In another aspect, disclosed herein is an upper for an article of footwear comprising a textile comprising a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition. In an aspect the textile can define at least a portion of a surface on the upper configure to be externally-facing when the upper is part of a finished article of footwear. In another aspect, the first polymeric composition can define at least a portion of the surface of the upper configured to be externally-facing when the upper is part of a finished article of footwear, or defines at least a portion of a surface of the upper configured to be internally-facing when the upper is part of a finished article of footwear, or forms at least a portion of an interior layer of the upper when the upper is part of a finished article of footwear, or any combination thereof.

In another aspect, the thermoformed film component is an outsole for an article of footwear or is a component of an article of footwear. In yet another aspect, the thermoformed film component is a combination upper and outsole for an article of footwear, wherein the upper includes an outsole area. The outsole, or the outsole area of the combination upper and outsole can be configured to include a ground-facing surface, or a ground-contacting surface, or both, and at least a portion of the first polymeric composition defines at least a portion of the ground-facing surface, or the ground-contacting surface, or both. For example, the outsole or outsole area can be configured to include a ground-facing surface but not a ground-contacting surface, and at least a portion of the first polymeric composition defines at least a portion of the ground-facing surface. In another example, the outsole or outsole area can be configured to include a ground-facing surface but not a ground-contacting surface, and at least a portion of the first polymeric composition defines at least a portion of the ground-facing surface, and wherein the at least a portion of the first polymeric composition defines the at least a portion of the ground-facing surface is textured, or includes at least one traction element, or both. Optionally, the at least one traction element can a thermoformed traction element formed from the textile.

The thermoformed film component as described herein can be a component of an article of apparel. The first polymeric composition can define an externally-facing surface of the article of apparel. The thermoformed film component can be used to provide abrasion resistance or traction or both to at least a portion of the article of apparel, such as, for example on an elbow area, a knee area, or both. The thermoformed film component can be used to provide protection to electronic components embedded in or attached to the article of apparel. The thermoformed film component can be used to provide protection to a wearer from hard or sharp components embedded in or attached to the article of apparel.

The thermoformed film component as described herein can be a component of an article of sporting equipment. The first polymeric composition can define an externally-facing surface of the article of sporting equipment. The thermoformed film component can be used to provide abrasion resistance or traction or both to at least a portion of the article of sporting equipment, such as a portion of the article of sporting equipment which contacts the ground or had surfaces during use. The thermoformed film component can be used to provide protection to electronic components embedded in or attached to the article of sporting equipment.

The present disclosure is also directed to articles comprising: a textile comprising a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition; and a second element selected from a second shaped component, a second film, a second fiber, a second filament, a second yarn, or a second textile. The article can be a textile or thermoformed textile as described herein, wherein the article includes the re-flowed and re-solidified product of the first polymeric composition, and the second element selected from the second shaped component, second film, second fiber, second filament, second yarn, or second textile. The article can be a thermoformed film component as described herein, wherein the article includes the re-flowed and re-solidified product of the first polymeric composition, and the second element selected from the second shaped component, second film, second fiber, second filament, second yarn, or second textile.

In some aspects, the article is an article of footwear, which includes, but is not limited to, such articles as shoes. "Article of footwear" is used to refer to an article intended for wear on a human foot, e.g., in some aspects, an article of footwear can be a shoe, such as an athletic shoe. Articles of footwear generally include an upper and a sole structure. The upper provides a covering for the foot that comfortably receives and securely positions the foot with respect to the sole structure. Moreover, the upper generally provides protection for the foot and may provide other attributes such as weather resistance, water resistance, contact or interaction with athletic equipment, or the like. The sole structure can provide various kinds of support, cushioning and shock absorption. The sole structure is secured to a lower portion of the upper and is generally positioned between the foot and the ground. In addition to attenuating ground reaction forces (that is, providing cushioning) during walking, running, and other ambulatory activities, the sole structure can influence foot motions (for example, by resisting pronation), impart stability, and provide traction, for example. Accordingly, the upper and the sole structure operate cooperatively to provide a comfortable structure that is suited for a wide variety of activities.

An exemplary article of footwear is athletic or sports footwear, including, but not limited to, running shoes, basketball shoes, soccer shoes, baseball shoes, football shoes, tennis shoes, rugby shoes, cross-training shoes, walking shoes, hiking boots, golf shoes, sneakers, and the like. Alternatively, the article of footwear can be non-athletic footwear, including, but not limited to, dress shoes, loafers, casual wear shoes, sandals, and boots, including work boots. A shoe can or cannot enclose the entire foot of a wearer. For example, a shoe could be a sandal or other article that exposes large portions of a wearing foot. The person of ordinary skill in the art can appreciate, therefore, that the materials and processes disclosed herein apply to a wide variety of footwear types or styles, in addition to the specific type or style discussed in the following material and depicted in the accompanying figures.

An upper forms a structure that that provides a covering for some or all of a wearer's foot and positions that foot relative to a sole structure of that shoe. The upper forms a void on the interior of the footwear for receiving the foot. The void has the general shape of the foot, and access to the void can be provided at an ankle opening. In certain aspects, the upper extends over the instep and toe areas of the foot, along medial and lateral sides of the foot, and around the heel area of the foot. The upper can have any design, shape, size and/or color. For example, in certain aspects, e.g., if an article is a basketball shoe, then the upper can be a high top upper that is shaped to provide high support on an ankle. Alternatively, in certain aspects, e.g., if an article is a running shoe, then the upper can be a low top upper. In accordance with the present disclosure, the upper or upper component can comprise a film, fiber, filament, yarn, textile, thermoformed textile, or thermoformed film component as described herein.

The upper can also incorporate a closure system such as a lacing system to permit entry and removal of the foot from the void within the upper. Additionally or alternatively, the upper can also incorporate an adjustment system to adjust fit of the footwear and/or provide lock-down between the upper and the sole structure. A closure and/or adjustment system such as a lacing system often is incorporated into the upper to selectively change the size of the ankle opening and to permit the wearer to modify certain dimensions of the upper, particularly girth, to accommodate feet with varying proportions. In addition, the upper can include a tongue that extends under the lacing system to enhance the comfort of the footwear (e.g., to modulate pressure applied to the foot by the laces). The tongue can be attached at the base of the lacing structure; can be attached at the base of the lacing structure and on the medial side of the lacing structure, or on the lateral side of the lacing structure, or on both sides; or can be integrally formed with the upper. The upper can include a heel counter to limit or control movement of the heel. The upper can include a toe cap to provide abrasion resistance or protection or both to the toe box portion of the upper. Abrasion resistance, traction, or both can be provided in specific regions of the upper including on portions of the medial side, the lateral side, the instep region, or any combination thereof. For example, use of materials which provide increased levels of traction are useful on athletic footwear which may come into contact with a ball during use. Optionally, the upper can include a heel counter; a toe cap; an abrasion resistant region on the medial side, the lateral side, or the instep; a region of increased traction on the medial side, the lateral side, or the instep; or any combination thereof.

In one aspect, a textile, including a thermoformed textile, as described herein defines at least a portion of an outer surface of the upper. In another aspect, the textile as described herein defines at least a portion of the surface of the upper configured to be externally-facing when the upper is part of a finished article of footwear, or defines at least a portion of a surface of the upper configured to be internally-facing when the upper is part of a finished article of footwear, or forms at least a portion of an interior layer of the upper when the upper is part of a finished article of footwear, or any combination thereof.

In one aspect, the textiles, including the thermoformed textiles described herein can cover from about 15 percent to about 100 percent of the outward-facing surface area of an upper. In one aspect, the textile covers from about 15 percent to about 35 percent of the surface area of the external face of the upper. In another aspect, the textile covers from about 40 percent to about 70 percent of the surface area of the external face of the upper. In another aspect, the textile covers from about 75 percent to about 100 percent of the surface area of the external face of the upper.

In another aspect, the textiles, including the thermoformed textiles, can be present on a lateral side of the upper, a medial side of the upper, a heel region of the upper, a toe region of the upper, or any combination thereof. In some aspects, when the textiles form part or all of an upper for an article of footwear, the textiles can be present in a first layer and a second layer. In one aspect, the first layer can be an outward facing layer and the second layer can be a base layer or internal layer that is not seen when the article of footwear is being worn. In another aspect, the first layer and second layer can independently comprise a knitted textile, a crocheted textile, a braided textile, a woven textile, a nonwoven textile, or some combination thereof. In one aspect, when two layers of the textiles are present, the top layer can be useful for boot-to-ball control, abrasion resistance, and stretch resistance and the bottom layer can be useful for providing water resistance, stretch resistance, and durability to the article of footwear. In some aspects, a core layer can be present between the top layer and the base layer. In an alternative aspect, the textile can be present as a single layer comprising an outward-facing side, an inward-facing side, and a core, wherein the outward-facing side comprises the coated yarns which can be useful for boot-to-ball control, abrasion resistance, and stretch resistance, and the inward-facing side comprises the coated yarns which can be useful for water resistance, stretch resistance, and durability, among other properties.

In some aspects, a sole structure can include one or more components or layers, which can individually or collectively provide an article of footwear with a number of attributes, such as support, rigidity, flexibility, stability, cushioning, comfort, reduced weight, or other attributes. In some aspects, a sole structure can comprise layers referred to as an insole, a midsole, and an outsole. In some aspects, however, one or more of these components can be omitted. In certain aspects, a sole structure can optionally comprise a sole plate. In some aspects, the sole structure comprises at an outsole component that includes an exterior major surface, which can be exposed and ground-contacting, and an interior major surface. In a further aspect, the sole structure can further comprise a midsole component that can be attached to the upper along the entire length of the upper. When present, the midsole forms the middle layer of the sole structure and serves a variety of purposes that include controlling foot motions and attenuating impact forces.

The outsole includes the ground-contacting portions of the article of footwear. Conventionally, durable, wear-resistant materials are used for outsoles. In accordance with the present disclosure, the outsole or outsole component can comprise a film, fiber, filament, yarn, textile, thermoformed textile, or thermoformed film component as described herein. Outsoles commonly include texturing or other features such as traction elements to improve traction. The outsole can optionally further comprise one or more integrally formed or removable cleats.

In one aspect, the textile defines at least a portion of an externally-facing surface of the outsole, optionally wherein the externally-facing surface is configured to be ground-facing or ground-contacting when the outsole is part of a finished article of footwear. In another aspect, the textile defines at least a portion of the medial side or lateral side of the outsole.

A combination upper and outsole for an article of footwear is an integrated component which serves both as the upper of the article of footwear and as the outsole of the article of footwear. In contrast to conventional footwear formed by first forming a separate upper and a separate outsole, and then attaching the upper and the outsole to each other. In contrast, in a combination upper and outsole, at least a portion of the upper area and the outsole area of the unit are formed at the same time, for example, by thermoforming one or more components on a last. Thus, the combination upper and outsole unit comprises a single textile, thermoformed textile, or thermoformed film component which forms both at least a portion of the externally-facing surface of the upper and at least a portion of the ground-facing or ground-contacting surface of the outsole.

Exemplary Aspects of Articles of Sporting Equipment, Articles of Wear and Textiles As discussed above, certain aspects are directed to one or more textiles, thermoformed textiles, or thermoformed film components that include the films, fibers, filaments or yarns as described herein. In certain aspects, such textiles, thermoformed textiles, or thermoformed film components can form at least a portion of an article of sporting equipment or article of wear, including articles of apparel and articles of footwear. In certain aspects, the disclosed textiles, thermoformed textiles, or thermoformed film components can form at least a portion of a component of an article of footwear. In certain aspects, the disclosed textiles, thermoformed textiles, or thermoformed film components can form at least a portion of a component of an article of sporting equipment.

Turning now to the figures, in particular, FIGS. 1A and 1B, an article of footwear 100 is depicted as one exemplary article of wear. While FIGS. 1A and 1B depict an article of footwear 100, it should be understood that other articles of wear are also contemplated by the present disclosure. The article of footwear 100 of FIGS. 1A and 1B generally can include a ground-facing outsole area 110, an ankle collar area 112, a lateral midfoot area 114a, and a medial midfoot area 114b, a toe box area 116, and a heel area 118. Further, the article of footwear 100 can include a plurality of eyestays 120, a vamp area 122, a tongue area 124, and a throat area 126. As shown in FIGS. 1A and 1B, article of footwear 100, is intended to be used with a right foot; however, it should be understood that the following discussion can equally apply to a mirror image of article of footwear 100 that is intended for use with a left foot.

The article of footwear 100 depicted in FIGS. 1A and 1B can include at least one textile 102 that at least partly forms a portion of the article of footwear 100. Optionally, the textile 102 of the article of footwear 100 can include at least two, or optionally at least three separate textile zones, e.g., zones 104, 106, and 108, identifying specific functional areas of the article of footwear 100. In certain aspects, these specific functional areas are at least partly associated with the targeted incorporation of specific textile media in varying amounts, techniques, and combinations into these textile zones (illustrated as zones 104, 106, and 108 in FIGS. 1A and 1B). It should be understood that, while the textile 102 includes three specific functional areas, more than three functional areas are also contemplated.

In certain aspects, the textile zone 104 can exhibit a rigid or semi-rigid functionality suitable for use as a ground-facing outsole 110 for the article of footwear 100. Accordingly, in certain aspects, the textile zone 104 can be positioned to include at least a portion of a ground-facing outsole 110 of the article of footwear 100. In certain aspects, the targeted incorporation of the films, fibers, filaments or yarns described herein into the textile zone 104 of the textile 102, upon thermoforming, can at least partly provide the abrasion-resistant and/or traction functionality for use as a ground-facing outsole 110.

Further, in aspects, another textile zone, such as, for example, textile zone 108, can exhibit flexibility and/or pliability to accommodate movements from a wearer. In certain aspects, the textile zone 108 can include the ankle collar area 112, the tongue area 124, and/or the throat area 126 of the article of footwear 100.

In certain aspects, another textile, such as, for example, zone 106, can be positioned between the textile zones 104 and 108. In certain aspects, the textile zone 106 can include at least a portion of the lateral midfoot region 114a and/or the medial midfoot region 114b on the article of footwear 100. In certain aspects, the textile zone 106 can include a combination of a first film, fiber, filament or yarn described herein from the textile zone 104 with a second film, fiber, filament or yarn, such as, for example, the second film, fiber, filament or yarn from the textile zone 108, where the second film, fiber, filament or yarn has different properties (e.g., melting temperature, deformation temperature, etc.) compared to the first film, fiber, filament or yarn. In such aspects, this combination of textile media present in the textile zone 106 allows the textile zone 106 to function as a flexible, pliable portion of the upper and as an abrasion-resistant or high traction zone, and optionally as a transition between the outsole functionality of the textile zone 104 and the flexible pliable functionality of the textile zone 108, allowing for a more gradual transition from the outsole portion to flexibility of the textile 102. In one example, only textile zone 104 comprises the first polymeric composition of the disclosure. In another example, only textile zone 106 comprises the first polymeric composition of the present disclosure. In another example, both textile zones 104 and 106 comprise the first polymeric composition, wherein a concentration of the first polymeric composition in textile zone 104 is greater (e.g., at least 10 weight percent greater, at least 20 weight percent greater, or at least 30 weight percent greater) than in textile zone 106. In yet another example, textile zone 108 is substantially free of the first polymeric composition of the disclosure.

Further, in such aspects, the textile zone 106 can exhibit rigidity or semi-rigidity to a lesser extent than the textile zone 104, but to a greater extent than the textile zone 108. Also, in the same or alternative aspects, the textile zone 106 can exhibit flexibility to a lesser extent than the textile zone 108, but to a greater extent than the textile zone 104.

Alternatively or additionally, the three textile zones 104, 106 and 108 can be at least partly located within a midfoot region, such as lateral midfoot region 114a and/or medial midfoot region 114b.

While any or all of textile zones 104, 106 and 108 can be formed of separate textiles operably connected to each other, a single textile having two or more integrally formed textile zones can be used. In one particular example, a single upper and outsole unit comprises two or more separately formed or integral textile zones.

In certain aspects in the textile zone 106, the combination of the first film, fiber, filament or yarn described herein is present in the textile zone 104 and a second film, fiber, filament or yarn described herein is present in the textile zone 108. When this textile is exposed to the thermoforming process, the process can impart one or more structural properties to these zones making them appropriate for use in the article of footwear 100, such as abrasion resistance, improved traction, semi-rigid support, or any combination thereof, in the lateral and/or medial midfoot regions 114a and 114b, and/or three-dimensional shape or structure suitable for one or more portions of the article of footwear 100.

In certain aspects, as can be seen in FIG. 1A, the textile zone 106 extends away from the textile zone 104 towards the eyestays 120. In such aspects, the combination of textile media comprising the first film, fiber, filament or yarn described herein and textile media comprising the second film, fiber, filament or yarn can allow for the transferring of a force transmitted from the eyestays 120 or other lacing mechanisms into this combination of textile media present in the lateral and/or medial midfoot regions 114a and 114b. In certain aspects, for the successful transfer of the forces transmitted from the eyestays 120, the textile zone 104, and/or the first film, fiber, filament or yarn described herein present in the textile zone 104, can terminate to an area 128 that is a distance of at least about 0.5 cm, about 1.0 cm, or about 2.0 cm from the eyestays 120, and/or at least about 3, at least about 4, or at least about 5 needle lengths below the eyestays 120, when the textile 102 is a knit textile formed on a commercial knitting machine. In such aspects, the flexible and pliable characteristics of the second film, fiber, filament or yarn that are present in the zone 108 that is adjacent the eyestays 120 can facilitate in transferring forces transmitted from the eyestays 120 to the textile zone 106 and/or the first films, fibers, filaments or yarns described herein present in the lateral and/or medial midfoot regions 114a and 114b.

In the aspect depicted in FIGS. 1A and 1B, the textile zone 106 is positioned in the toe box area 116 and the heel area 118. In such aspects, the combination of the first film, fiber, filament or yarn described herein and the second film, fiber, filament or yarn can provide structure and/or support due to the rigidity provided by the thermoformed material. Further, the thermoformed material can provide abrasion resistance or increased traction in the toe box area 116 and/or the heel area 118. In alternative aspects, the textile zone 104 can form at least a portion of the toe box area 116 and/or the heel area 118 for increased rigidity or increased abrasion resistance or traction, since the textile zone 104 includes a greater amount, or alternative positioning (e.g., outer knit surface), of the first film, fiber, filament or yarn described herein than the textile zone 106.

FIG. 1C depicts an alternative aspect of an article of footwear 100a. In such aspects, the article of footwear 100a can generally include at least three types of textile zones: the textile zone 104a, the textile zone 106a, and the textile zone 108a. In certain aspects, the textile zones 104a, 106a, and 108a can have the same properties and parameters as the textile zones 104, 106, and 108, respectively, of the article of footwear 100 discussed above with reference to FIG. 1A.

In the aspect depicted in FIG. 1C, portions, e.g., portions 104b and 104c, of the textile zone 104a can extend from an outsole area up through a midfoot area 115A and toward a plurality of eyestays 120a. In such aspects, a rigid or semi-rigid functionality provided by the portions 104b and 104c extending from an outsole area through the midfoot area 115A to a plurality of eyestays 120a can provide increased wearer stability in the midfoot area 115A. Further, in aspects, a force applied through one or more of the plurality of eyestays 120a can at least partly be transferred onto the rigid or semi-rigid portions 104b and 104c extending through the midfoot area 115A, and into the rigid or semi-rigid textile zone 104a present in an outsole area, providing increased support and comfort for a wearer.

In certain aspects, in addition to the thermoformed material providing abrasion resistance or traction or both to one or more areas of the article, the thermoformed material can provide structure, rigidity, strength, support, a water-proof or water-resistant surface, or any combination thereof.

Figure 2B:
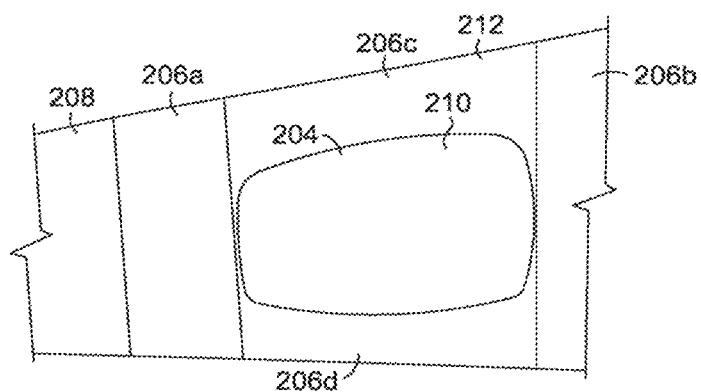
FIG. 2B is a close-up view of the elbow patch of the article of apparel of FIG. 2A in accordance with aspects of the present invention.

FIGS. 2A and 2B depict a shirt 200 as an exemplary article of apparel. The shirt 200 depicted in FIGS. 2A and 2B includes at least one textile, thermoformed textile, or thermoformed film component 202 that at least partly forms a portion of the shirt 200. As best seen in FIG. 2B, the textile, thermoformed textile, or thermoformed film component 202 can be a textile or thermoformed textile which includes three separate textile zones 204, 206a-d, and 208, which can identify specific functional areas of the 200. In certain aspects, these specific functional areas are at least partly associated with the targeted incorporation of specific textile media in varying amounts and combinations into these textile zones 204, 206a-d, and 208.

In certain aspects, the textile zone 204 can include a reinforced area such as an exterior-facing film or patch 210, which can, for example, provide abrasion resistance to an elbow region 212 of the shirt 200. In such aspects, the targeted integral incorporation of the films, fibers, filaments or yarns described herein into the textile zone 204 can at least partly form the patch 210, when the textile 202 is thermoformed, by melting or deforming the films, fibers, filaments or yarns as described herein and subsequent cooling and solidifying of the melted first polymeric composition to form a patch 210.

In various aspects, the textile zone 208 can exhibit flexibility and/or pliability similar to a conventional shirt material. Further, in certain aspects, the textile zone 206 can at least partly provide a transition within the textile 202 from the more rigid or semi-rigid patch 210 present in textile zone 204 to the more flexible pliable portion present in the textile zone 208. In such aspects, the textile zones 206a-d can include a combination of the first film, fiber, filament or yarn described herein present in the textile zone 204 and the second film, fiber, filament or yarn present in the textile zone 208. While not shown in FIGS. 2A and 2B, the textile zones 206b-d also provide a transition to a flexible pliable material, such as that present in the textile zone 208.

In certain aspects, like with the textile zone 106 of the textile 102 discussed above with reference to FIGS. 1A and 1B, this combination of the first film, fiber, filament or yarn described herein from textile zone 204 and the second film, fiber, filament or yarn present from textile zone 208 can provide a seamless or integrated transition from the patch 210 to the flexible pliable portion found in textile zone 208 of the shirt 200.

While this exemplary description in FIGS. 2A and 2B of the textile zones 204, 206a-d, and 208 relates to an elbow region of the article of apparel 200, it should be understood that the textile zones 204, 206a-d, and 208 and associated properties can be applied to other areas of a shirt or other articles of apparel, such as a knee, thigh, hip, chest, and/or lower back region of an article of apparel, or to areas requiring reinforcement such as areas adjacent to a fastener, for example, a zipper, a button, a snap, a pull cord, and the like.

Figure 3:
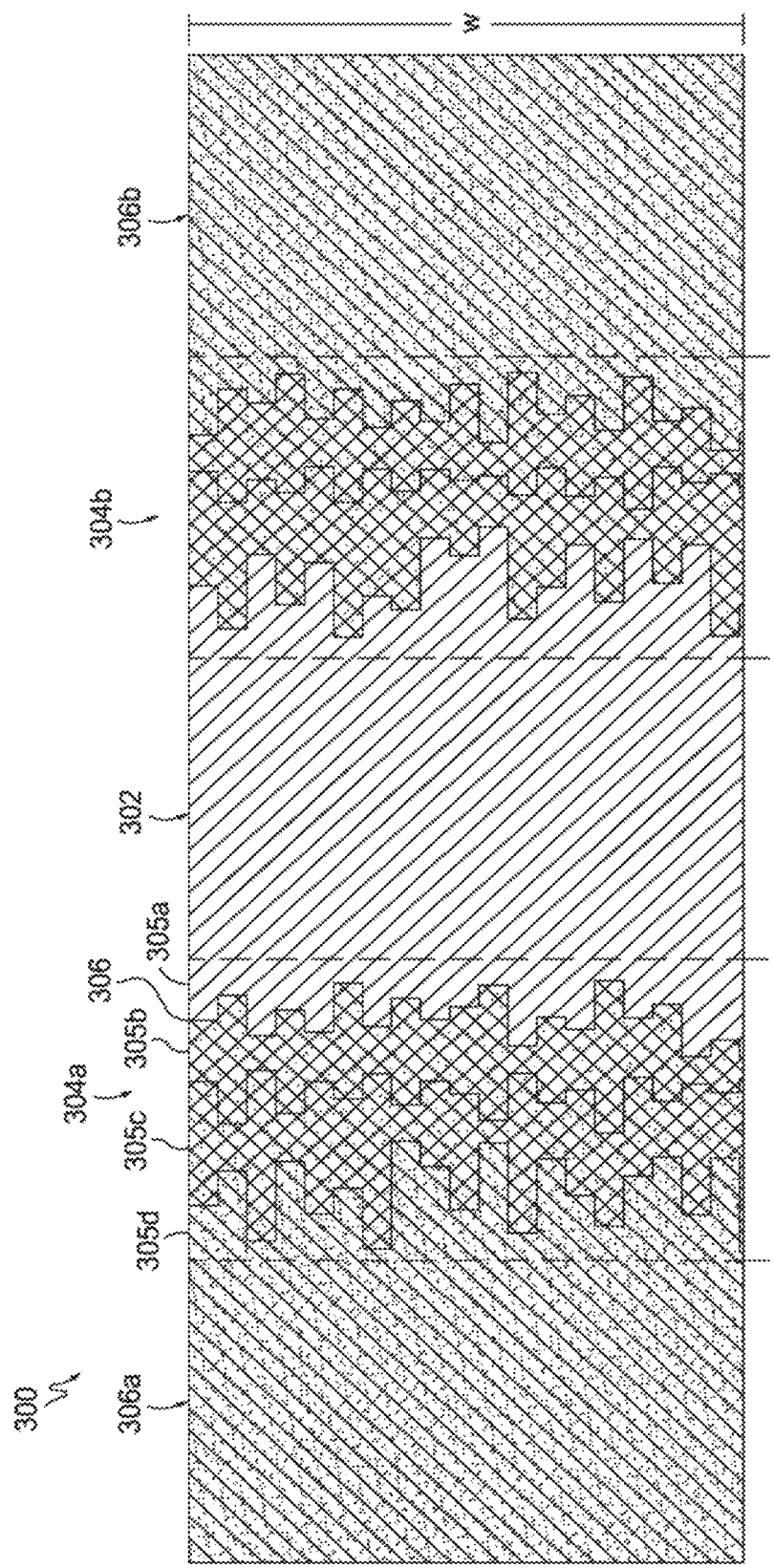
FIG. 3 is a plan view of a schematic depiction of a textile having three types of textile zones, in accordance with aspects of the present invention.

Turning now to FIG. 3, a plan view of a schematic textile 300 is provided. It should be understood that the textile 300 can be any type of textile known to one skilled in the art. A non-limiting list of textiles that are suitable for use in the articles of wear and methods disclosed herein includes knit textiles, woven textiles, non-woven textiles, crocheted textiles, and braided textiles.

Similar to the textile 102 of FIGS. 1A and 1B, and the textile 202 of FIGS. 2A and 2B, the textile 300 of FIG. 3 includes three types of textile zones. For example, the textile 300 includes a textile zone 302 that can include the first film, fiber, filament or yarn described herein, textile zones 306a and 306b that can include the second film, fiber, filament or yarn, and textile zones 304a and 304b that can include a combination of films, fibers, or yarns compose of different thermoplastic elastomers. In textile 300 of FIG. 3, the textile zones 304a and 304b can be positioned on either side of textile zone 302, while textile zones 306a and 306b can be positioned on the opposite sides of the textile zones 304 and 304b, respectively.

In certain aspects, the films, fibers, filaments, yarns, and textiles described herein, when exposed to a thermoforming process, can impart a structural or functional property to an article of wear or sporting equipment. Further, the combination of first films, fibers, filaments, yarns described herein and second films, fibers, filaments, or yarns can provide structural support and three-dimensional structure for a particular article of wear or sporting equipment. Further, in certain aspects, this combination of films, fibers, filaments, yarns, and textiles can provide an integrated transition between a rigid thermoformed material and flexible pliable fibers.

In certain aspects, based on the relative positioning of the first films, fibers, filaments, yarns, and textiles described herein and the second films, fibers, filaments, or yarns in the in different zones of the textiles, thermoformed textiles and thermoformed film component, the zones can have varying concentration of the first and second films, fibers, filaments or yarns, and thus can have varying concentrations of the first polymeric composition and the second polymeric composition in these zones.

As used herein, the term "concentration" refers to a clustering or congregation in a specific volume. Thus, the term concentration includes measuring the amount (e.g., the weight in grams) of a material in a specified volume (e.g., cubic centimeter). For example, in a knit textile, a first portion of a single knit layer of a textile can have an increased concentration of a first yarn compared to a second portion of the textile by having more stitches (e.g., knit stitches, tuck stitches, and/or float stitches) of that first yarn than the second portion of equal size. In another example, a first portion of a textile can include a greater concentration of an inlaid film, fiber, filament or yarn than a second portion. In another example, in a non-woven textile, a first portion of the textile can have an increased concentration of a first fiber if that textile was formed with more of the first fiber (e.g., a weight in grams) than a second portion of equal size.

In aspects, a textile, thermoformed textile, or thermoformed film component can include a first zone and a second zone, wherein the first zone comprises at least 5 weight percent, or at least 10 weight percent, or at least 20 weight percent, or at least 30 weight percent more of the first polymeric composition than the second zone.

Figure 4A:
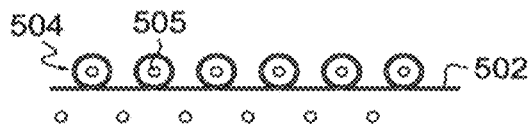
FIGS. 4A-4J depict exemplary knit structures in accordance with aspects of the present invention.

FIGS. 4A-4J depict exemplary potential knitting structures that can be present in in a knit textile or knit thermoformed textile as disclosed herein. FIG. 4A depicts a knit stitch (or sometimes referred to as a Jersey stitch) structure 502 formed from a back needle bed 504. It should be understood that the row of small circles associated with the back needle bed 504, represents needles (e.g., a needle 505) of the back needle bed 504, in accordance with traditional stitch schematics. Further, the same is true for a front needle bed, e.g., the front needle bed 508 depicted in FIG. 4B; that is, that the row of small circles associated with the front needle bed 508 represent needles (e.g., a needle 507) in the front needle bed 508.

Figure 4B:
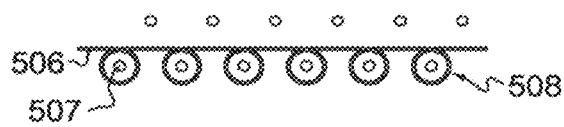
Figure 4C:
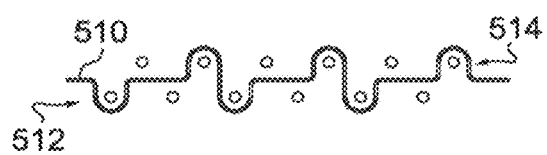
Figure 4D:
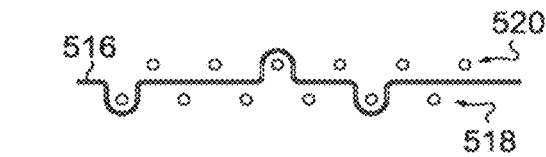
Figure 4E:
Figure 4F:
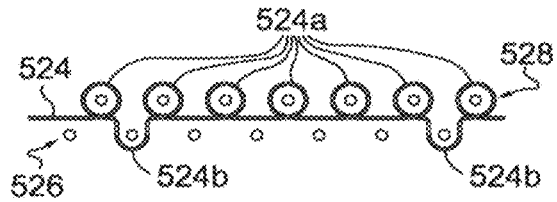
Figure 4G:
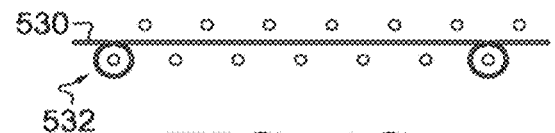
Figure 4H:
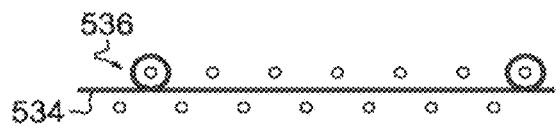
Figure 4I:
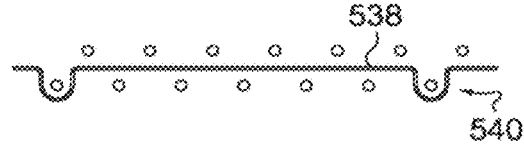
Figure 4J:
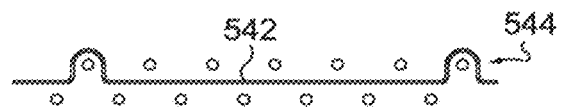

FIG. 4B depicts a knit stitch structure 506 formed from a front needle bed 508. FIG. 4C depicts a float and tuck stitch structure 510, with tuck stitches that are formed by a front needle bed 512 and a back needle bed 514. FIG. 4D depicts another float and tuck stitch structure 516, with tuck stitches formed by a front needle bed 518 and a back needle bed 520. FIG. 4E depicts a float stitch structure 522. FIG. 4F depicts a knit and tuck stitch structure 524 having knit stitches 524a formed by a back needle bed 528 and tuck stitches 524b formed by a front needle bed 526. FIG. 4G depicts a knit and float stitch structure 530, with the knit stitches formed on a front needle bed 532. FIG. 4H depicts a knit and float stitch structure 534, with the knit stitches formed a back needle bed 536. FIG. 4I depicts a tuck and float knit structure 538, with the tuck stitches formed by a front needle bed 540. FIG. 4J depicts a tuck and float knit structure 542, with the tuck stitches formed by a back needle bed 544.

In certain aspects, it can be desirable to bulk up the film, fiber, filament or yarn described herein in a particular region or zone, in order to provide a desired thickness and rigidity to the article when thermoformed, e.g., to form a ground-facing outsole of an article of footwear. In such aspects, when using a knit textile, the region or zone can include repeat stitches or inlaid films, fibers, filaments or yarns to increase the concentration of the first polymeric composition described herein relative to other zones.

In certain aspects, in regions of the textile 300 that include a substantial amount of the first polymeric composition described herein, e.g., the textile zone 302, an anchor yarn can be provided in the textile 300 to help restrict the flow of the melted first polymeric composition described herein and/or to provide some flexibility to the zone once thermoformed. For example, the anchor yarn can be present in the textile 300 as many different types of knit structure, such as one or more of structures depicted in FIGS. 4E and 4G-J. In certain aspects, the stitch selection for the anchor yarn can depend upon the desired resistance to elongation of the material through which the anchor yarn extends. For example, an anchor yarn stitch which floats five needles between tuck or knit stitches would provide a greater resistance to stretch to the material through which the anchor yarn extends compared to an anchor yarn stitch which only floats 2 or 3 needles between tuck or knit stitches. In such an example, the differing resistance to elongation between the length of the float is a result of non-linear portions (e.g., stitch loops) that are more prone to elongation than linear segments, which results in different amounts of resistance to elongation.

In such aspects, the anchor yarn can exhibit an elongation that is less than the elongation of the low processing temperature polymeric composition, such as a yarn comprising the low processing temperature polymeric composition or a melted yarn component produced by thermoforming such a yarn. For example, in aspects, the anchor yarn can exhibit an elongation that is at least about 10% less than the elongation of a yarn comprising the low processing temperature polymeric composition or a melted yarn component produced by thermoforming a yarn comprising the low processing temperature polymeric composition. In one aspect, the anchor yarn can exhibit an elongation that at least about 25% less than the elongation of a yarn comprising the low processing temperature polymeric composition or a melted yarn component produced by thermoforming a yarn comprising the low processing temperature polymeric composition. In another aspect, the anchor yarn can exhibit an elongation that at least about 50% less than the elongation of a yarn comprising the low processing temperature polymeric composition or a melted yarn component produced by thermoforming a yarn comprising the low processing temperature polymeric composition. In yet another aspect, the anchor yarn can exhibit an elongation that at least about 75% less than the elongation of a yarn comprising the low processing temperature polymeric composition or a melted yarn component produced by thermoforming a yarn comprising the low processing temperature polymeric composition. Exemplary anchor yarns include polyamide yarns, polyolefin yarns, and polyester yarns, including yarns having tenacities of from about 5 grams per denier to about 10 grams per denier.

As discussed above, the textiles described herein, which can include fibers and/or yarns comprising the film, fiber, filament or yarn described herein, can be thermoformed to impart some structure of properties to the article of wear. Further, as discussed above, the thermoforming process can cause at least a portion of the film, fiber, filament or yarn described herein present in the textile to melt or deform and subsequently solidify.

Figure 5A:
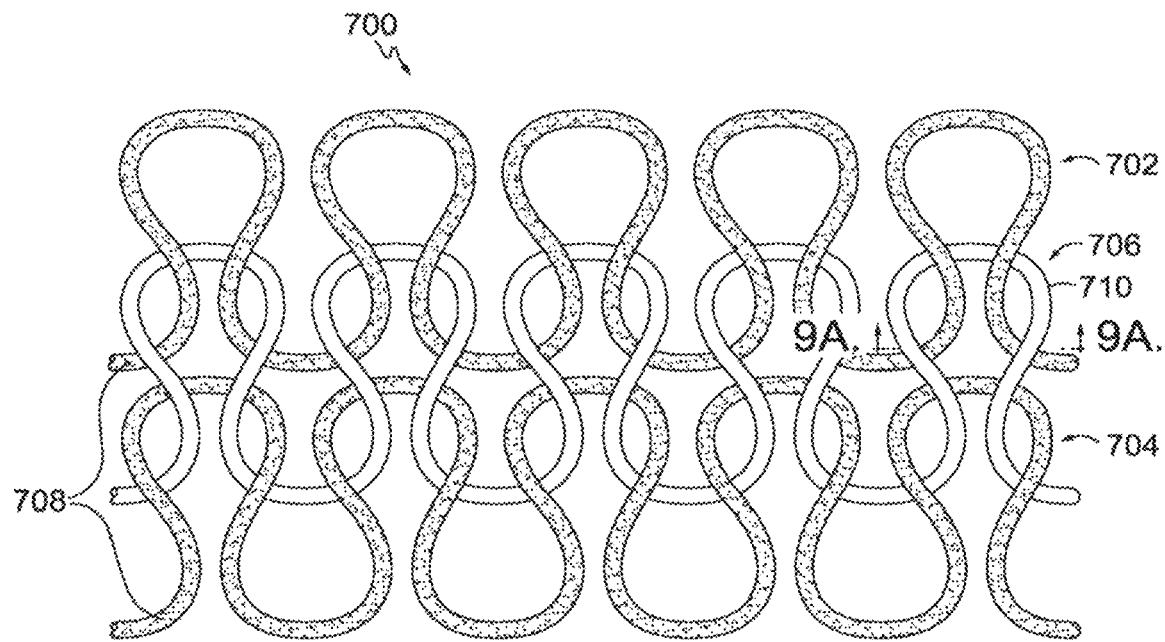
FIG. 5A is a schematic representation of three interconnected courses of loops with the middle course of loops being formed of a different yarn than the outer courses of loops, in accordance with aspects of the present invention.

FIG. 5A schematically depicts a portion 700 of the textile zone 304a of the upper knit layer of the textile 300 of FIG. 3 prior to a thermoforming process. The portion 700 includes a first course 702 and a second course 704 having a first yarn 708. The portion also includes a third course 706 of a second yarn 710 that comprises the film, fiber, filament or yarn described herein. In such an aspect, the third course 706 of loops of the second yarn 710 can be interconnected, e.g., interlooped, to the first course 702 and the second course 707 having the first yarn 708. As used herein, "interlooped" refers to the how a loop from one course can wrap around a loop of another course such as in a knit stitch, and also refers to how one loop can have another segment of yarn pulled through the loop (or through the loop and around the yarn forming the loop) in order to form a second loop, as in a crochet process.

Figure 5B:
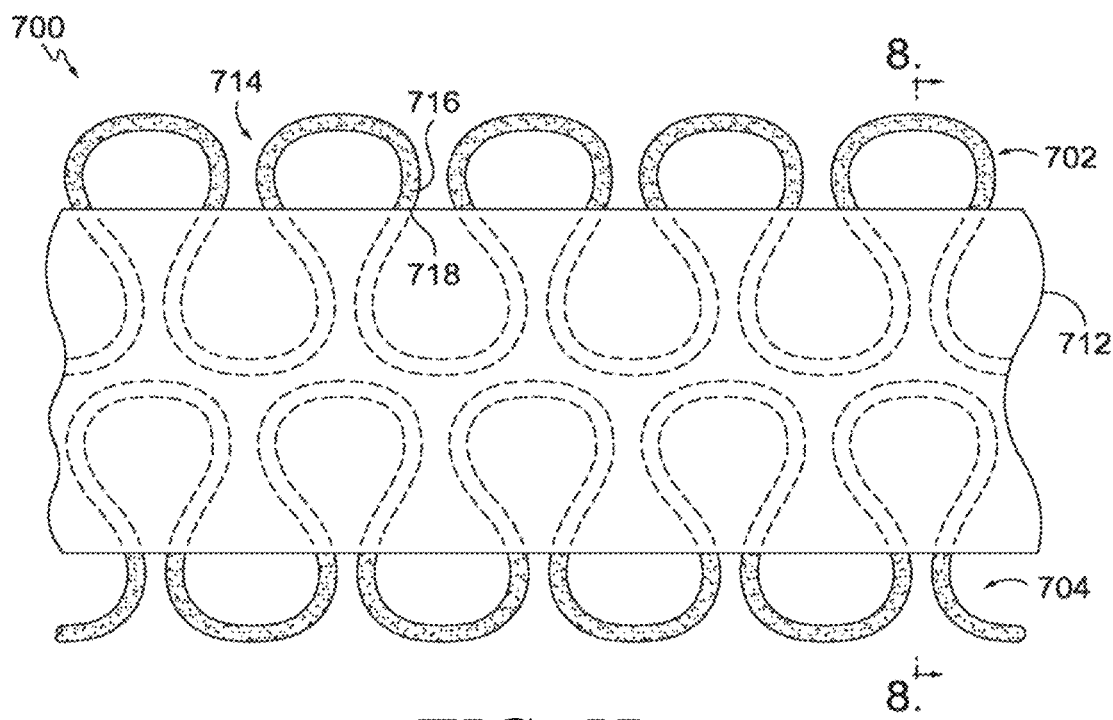
FIG. 5B is a schematic representation of the interconnected courses of loops of FIG. 5A after being exposed to a thermoforming process, and showing the middle course of loops being transformed into a component including re-flowed polymeric composition which no longer has the configuration of a yarn upon thermoforming, where the two outer courses of loops remain in the configuration of yarns, in accordance with aspects of the present invention.

FIG. 5B depicts the portion 700 after being exposed to a thermoforming process. As can be seen by comparing FIGS. 5A and 5B, the second yarn 710 that comprises the film, fiber, filament or yarn described herein was thermoformed from a yarn material into a melted yarn component 712. In certain aspects, the heating step of the thermoforming process at least partly caused the film, fiber, filament or yarn described herein in the second yarn 710 to melt and flow and then subsequently solidify by the completion of the thermoforming process into the melted yarn component 712.

In aspects, as can be seen in FIGS. 5A and 5B, the thermoforming process has also transformed at least a portion of the knit structure of the portion 700 of the upper knit layer of the textile 300 of FIG. 3. For example, the courses 702, 704, and 706 depicted in FIG. 7A have been transformed such that the portion 700 no longer includes interconnected courses of loops of a yarn comprising the film, fiber, filament or yarn described herein and a second yarn, at least partly due to the transformation of the yarn 710 in the second course 706 to the melted yarn component 712. As can be seen in FIG. 5B, although the thermoforming process can eliminate the interconnected loops in the portion 700 of the upper knit layer of the textile 300 of FIG. 3, the remaining course 702 and 704 can be connected by the melted yarn component 712. In such aspects, this portion 700 of upper knit layer of the textile 300 of FIG. 3 can fix the position of the courses 702 and 704 to one another, as opposed to when the courses 702 and 704 were interconnected via the course 706 prior thermoforming. Further, in such aspects, a top portion 714 of the loops of the first course 702 can still be free to interconnect with other courses of yarn allowing one to modulate the level of rigidity and/or three-dimensional forming provided by the textile zone 304a.

Figure 6:
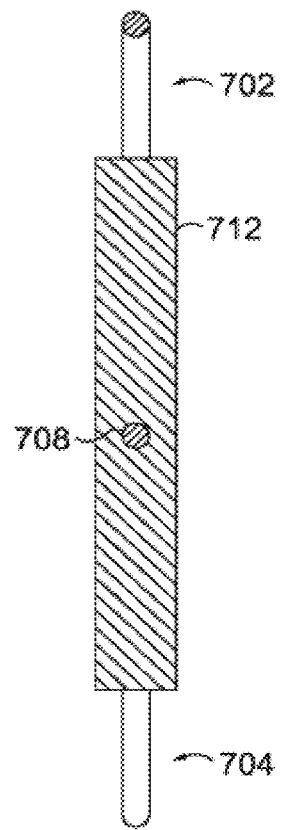
FIG. 6 is a schematic representation of a cross-section of the component including re-flowed polymeric composition of FIG. 5B, and showing a portion of a yarn from one of the outer courses of loops being encapsulated within the re-flowed polymeric composition, in accordance with aspects of the present invention.

FIG. 6 depicts a cross-section of the portion 700 of the upper knit layer of the textile 300 of FIG. 3 along the cut line 8 illustrated in FIG. 5B. As can be seen in FIG. 6, at least portion of the first yarn 708 can be encapsulated within the melted yarn component 712. Depending on the conditions used during the thermoforming process, the melted yarn component 712 can solidify into a film-like structure surrounding at least a portion of the loops of the first course 702 and the second course 704 of the first yarn 708.

As can be seen in the aspect depicted in FIGS. 5B and 6, the first yarn 708 did not melt or deform after being exposed to the thermoforming process. Further, in certain aspects, the first yarn 708 can contain a dye 716 (depicted as the speckling within the first yarn 708) that does not leach out after being exposed to the thermoforming process. For example, as can be seen in FIGS. 5B and 6, there is no visible leaching of the dye 716 from the first yarn 708 into adjacent regions of the melted yarn component 712, e.g., the adjacent region 718. In certain aspects, at least about 80 weight percent, at least about 90 weight percent, at least about 95 weight percent, or at least 99 weight percent of the dye 716 remains within the first yarn 708 or within the thermoformed portion 700 of the upper knit layer of the textile 300 of FIG. 3. In the same or alternative aspects, upon thermoforming, there is no visible leaching of the dye into any additional materials associated with the final article of wear, which the portion 700 of upper knit layer of the textile 300 of FIG. 3 textile 300 is incorporated into.

Figure 7A:
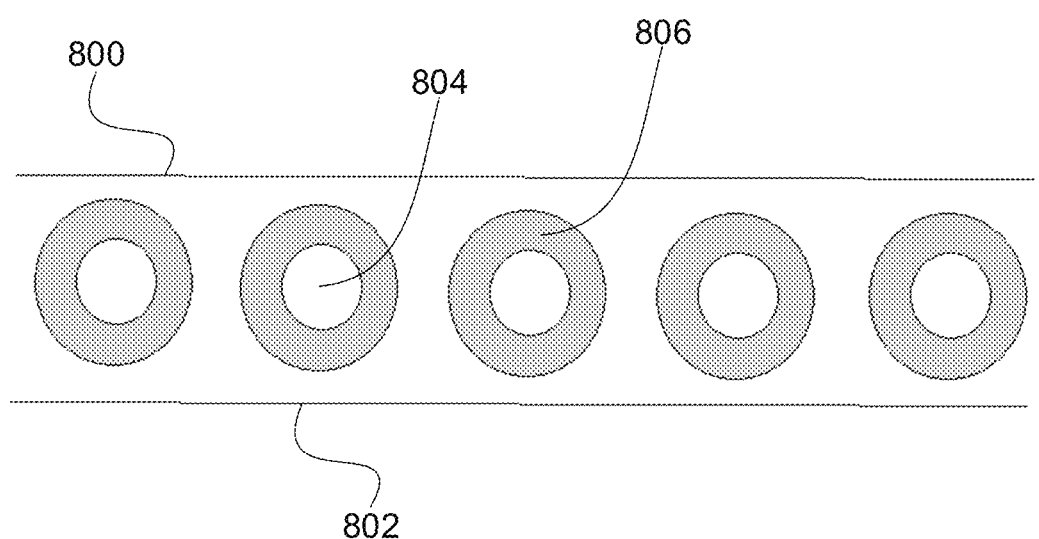
Figure 7B:
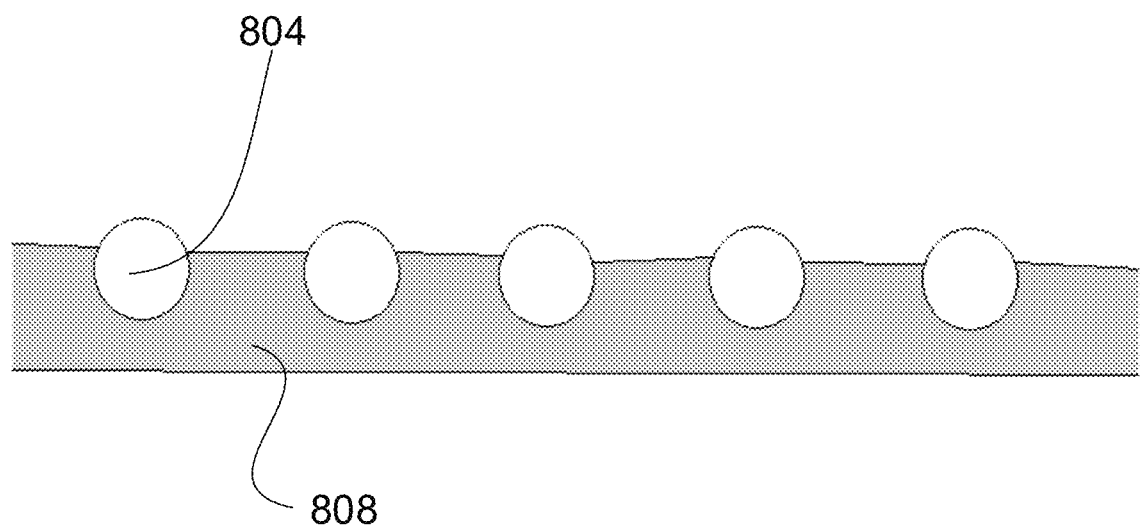
FIG. 7B shows the same textile after thermoforming.

FIG. 7A shows a cross-sectional view of a textile as disclosed herein, prior to thermoforming, the textile having a first side 800, a second side 802, and a core comprising coated yarns as disclosed herein, the coated yarns further having a core yarn 804 and a coating comprising a polymeric composition 806. FIG. 7B shows the same textile following thermoforming, where the core yarn 804 is disposed within the re-flowed and re-solidified polymeric composition 808 of the coated yarn.

Figure 7C:
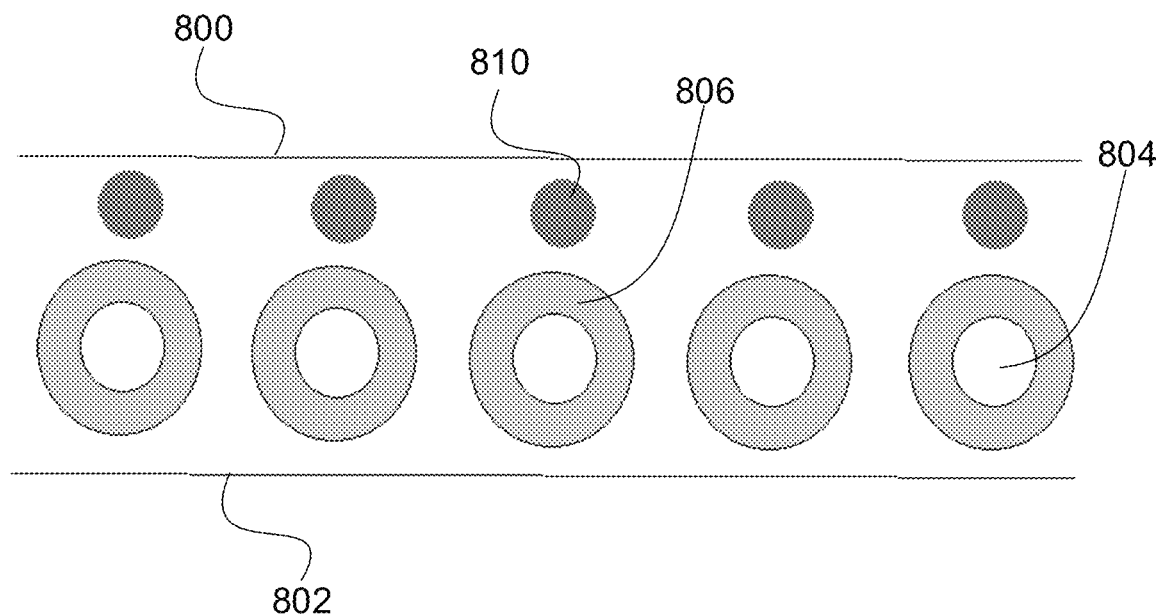
Figure 7D:
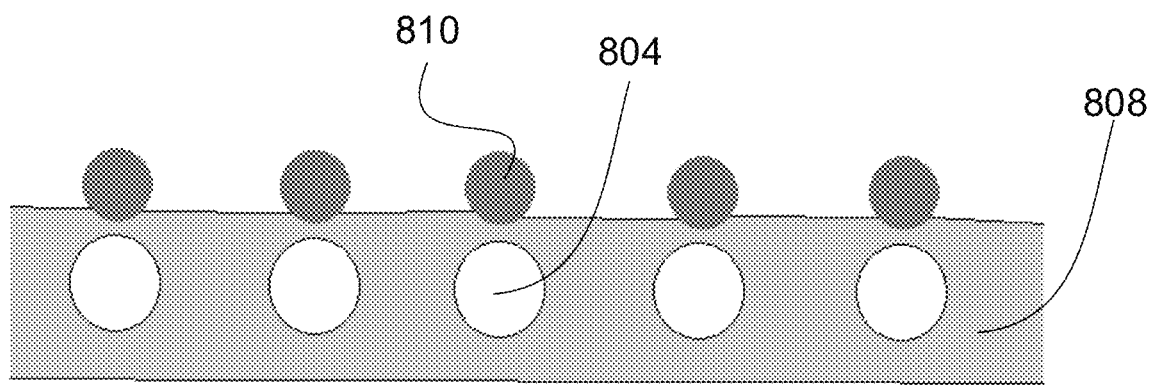
FIG. 7D shows the same textile after thermoforming.
Figure 7E:
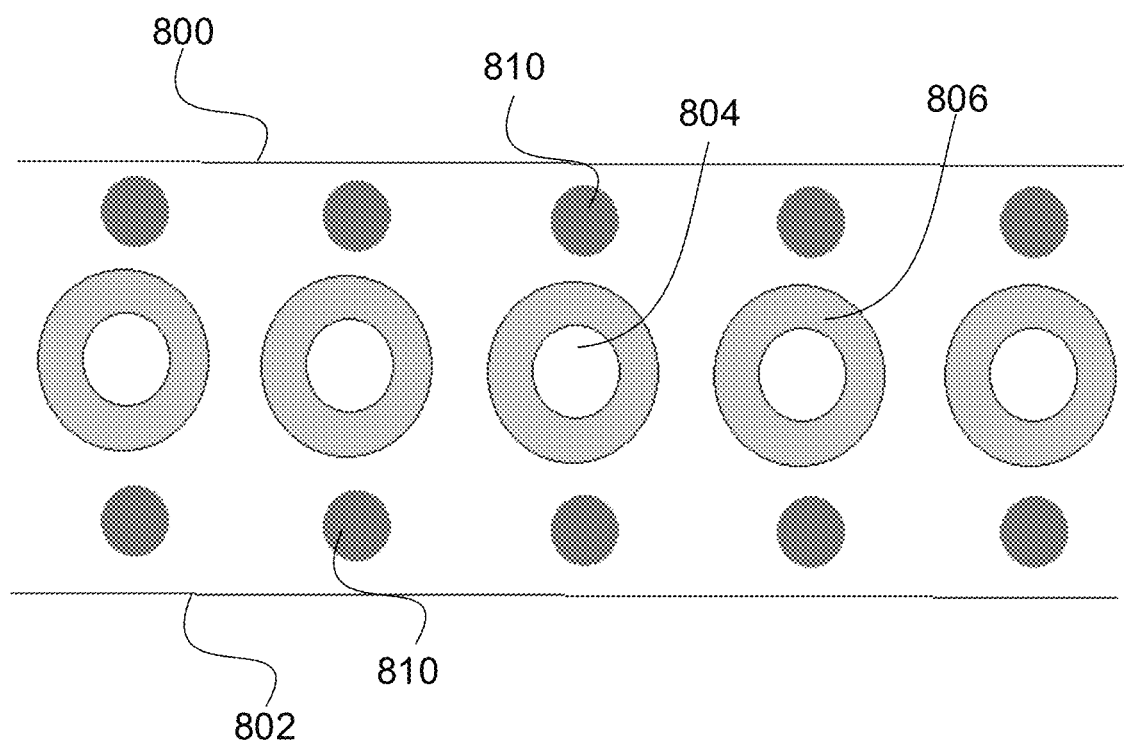
Figure 7F:
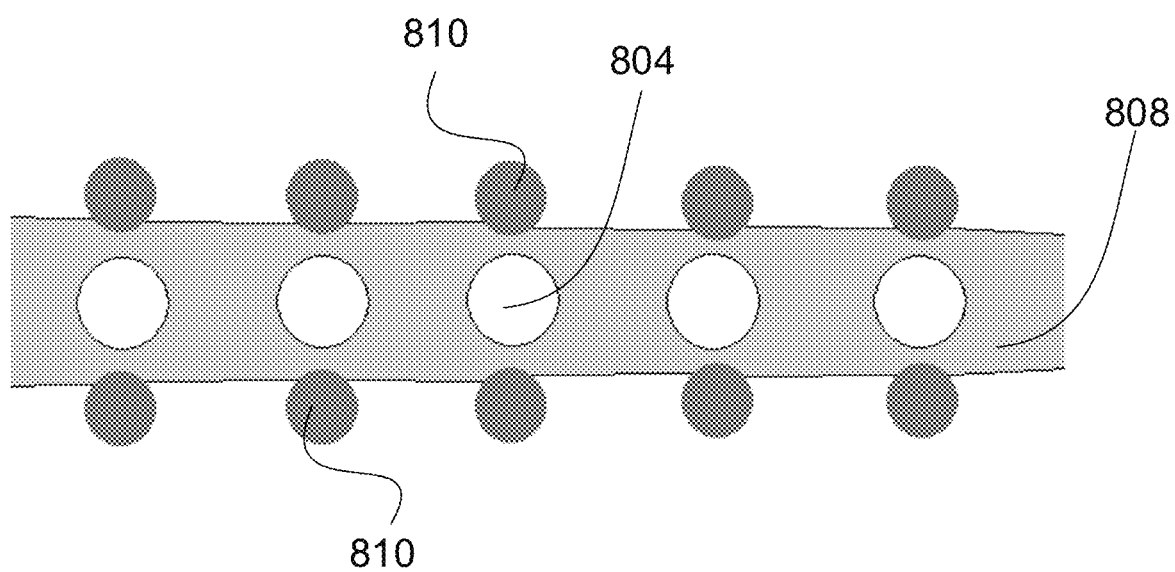
FIG. 7F shows the same textile after thermoforming.

FIG. 7C shows a cross-sectional view of a textile as disclosed herein, prior to thermoforming, the textile having a first side 800, a second side 802, and a core comprising coated yarns as disclosed herein and an additional second yarn 810 disposed on at least one side of the textile, the coated yarns further having a core yarn 804 and a coating comprising a polymeric composition 806. FIG. 7D shows the same textile following thermoforming, where the core yarn 804 is disposed within the re-flowed and re-solidified polymeric composition 808 of the coated yarn and the second yarn is disposed at the surface of the re-flowed and re-solidified polymeric composition.

FIG. 7A shows a cross-sectional view of a textile as disclosed herein, prior to thermoforming, the textile having a first side 800, a second side 802, and a core comprising coated yarns as disclosed herein an additional second yarn disposed on the first side and the second side of the textile 810, the coated yarns further having a core yarn 804 and a coating comprising a polymeric composition 806. FIG. 7B shows the same textile following thermoforming, where the core yarn 804 is disposed within the re-flowed and re-solidified polymeric composition 808 of the coated yarn and the second yarn is disposed at both surfaces of the re-flowed and re-solidified polymeric composition.

The article can be an article of manufacture or a component of the article. The article of manufacture can include footwear, apparel (e.g., shirts, jerseys, pants, shorts, gloves, glasses, socks, hats, caps, jackets, undergarments), containers (e.g., backpacks, bags), and upholstery for furniture (e.g., chairs, couches, car seats), bed coverings (e.g., sheets, blankets), table coverings, towels, flags, tents, sails, and parachutes, or components of any one of these. In addition, the textile or articles including the textile can be used with or disposed items such as striking devices (e.g., bats, rackets, sticks, mallets, golf clubs, paddles, etc.), athletic equipment (e.g., golf bags, baseball and football gloves, soccer ball restriction structures), protective equipment (e.g., pads, helmets, guards, visors, masks, goggles, etc.), locomotive equipment (e.g., bicycles, motorcycles, skateboards, cars, trucks, boats, surfboards, skis, snowboards, etc.), balls or pucks for use in various sports, fishing or hunting equipment, furniture, electronic equipment, construction materials, eyewear, timepieces, jewelry, and the like.

The article can be an article of footwear. The article of footwear can be designed for a variety of uses, such as sporting, athletic, military, work-related, recreational, or casual use. Primarily, the article of footwear is intended for outdoor use on unpaved surfaces (in part or in whole), such as on a ground surface including one or more of grass, turf, gravel, sand, dirt, clay, mud, pavement, and the like, whether as an athletic performance surface or as a general outdoor surface. However, the article of footwear may also be desirable for indoor applications, such as indoor sports including dirt playing surfaces for example (e.g., indoor baseball fields with dirt infields).

In particular, the article of footwear can be designed for use in indoor or outdoor sporting activities, such as global football/soccer, golf, American football, rugby, baseball, running, track and field, cycling (e.g., road cycling and mountain biking), and the like. The article of footwear can optionally include traction elements (e.g., lugs, cleats, studs, and spikes as well as tread patterns) to provide traction on soft and slippery surfaces, where components of the present disclosure can be used or applied between or among the traction elements and optionally on the sides of the traction elements but on the surface of the traction element that contacts the ground or surface. Cleats, studs and spikes are commonly included in footwear designed for use in sports such as global football/soccer, golf, American football, rugby, baseball, and the like, which are frequently played on unpaved surfaces. Lugs and/or exaggerated tread patterns are commonly included in footwear including boots design for use under rugged outdoor conditions, such as trail running, hiking, and military use.

In particular, the article can be an article of apparel (i.e., a garment). The article of apparel can be an article of apparel designed for athletic or leisure activities. The article of apparel can be an article of apparel designed to provide protection from the elements (e.g., wind and/or rain), or from impacts.

In particular, the article can be an article of sporting equipment. The article of sporting equipment can be designed for use in indoor or outdoor sporting activities, such as global football/soccer, golf, American football, rugby, baseball, running, track and field, cycling (e.g., road cycling and mountain biking), and the like.

Figure 8N:
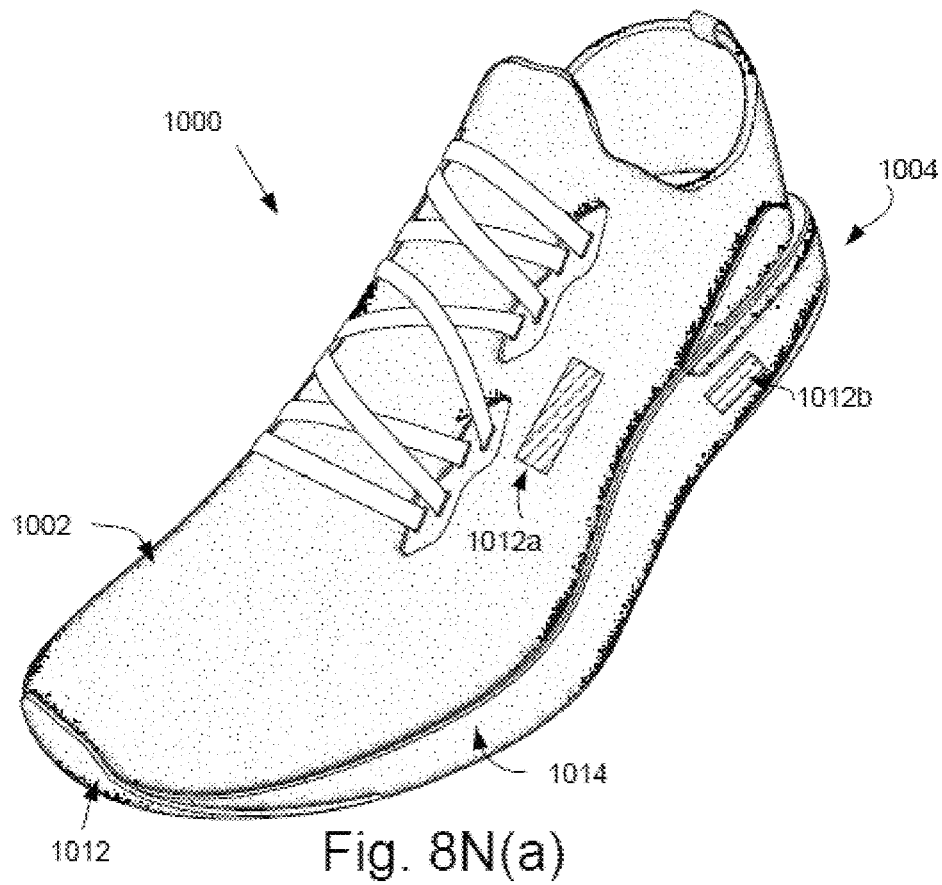
FIGS. 8N(a)-8Q(e) illustrate additional details regarding different types of footwear.
Figure 8N:
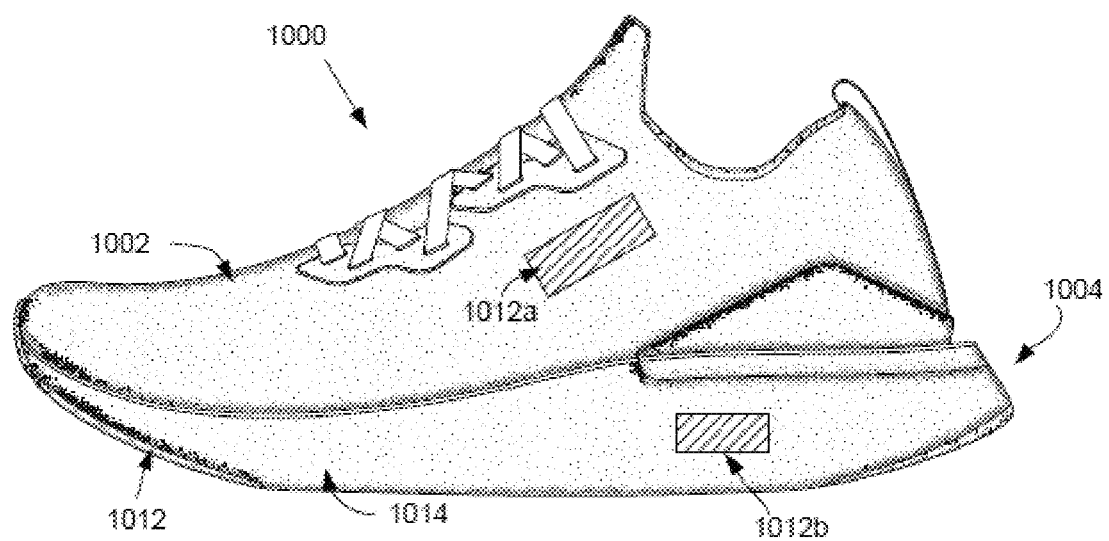
Figure 8O:
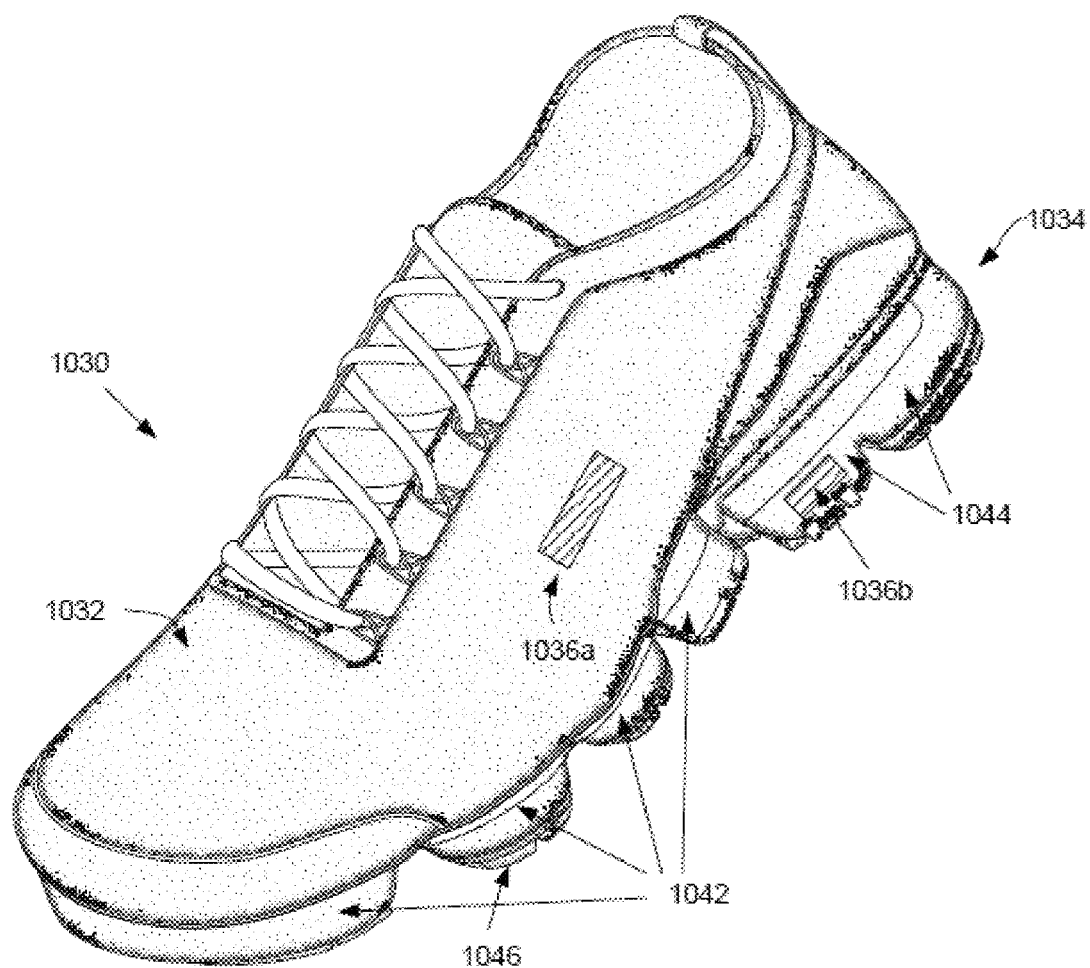
FIGS. 8A-8M show various articles of footwear, apparel, athletic equipment, container, electronic equipment, and vision wear in accordance with the present disclosure.
Figure 8O:
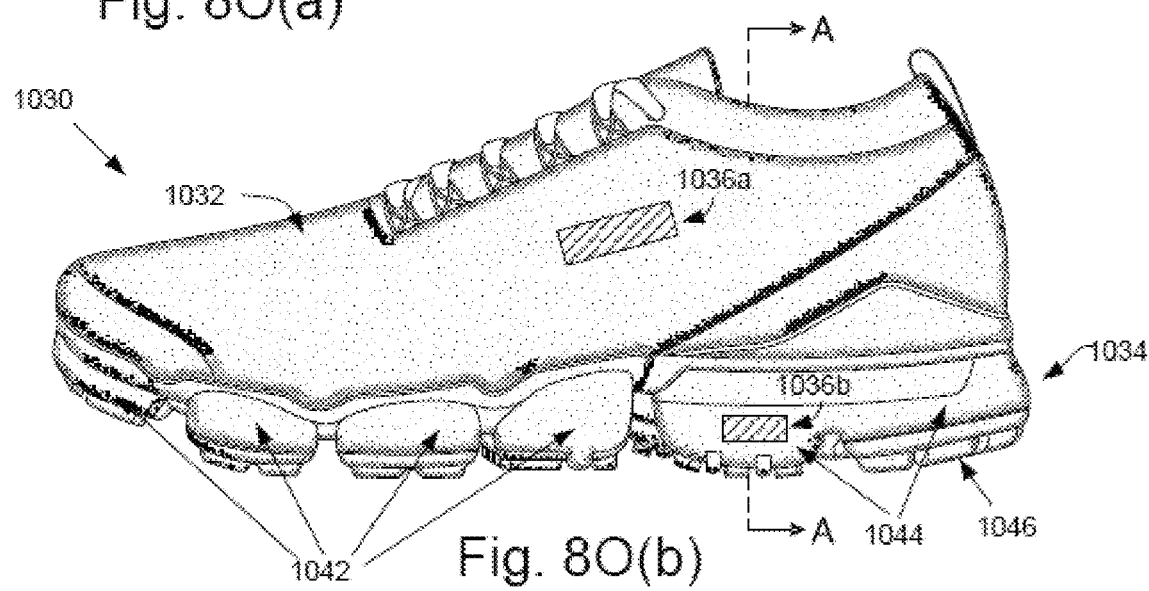
Figure 8O:
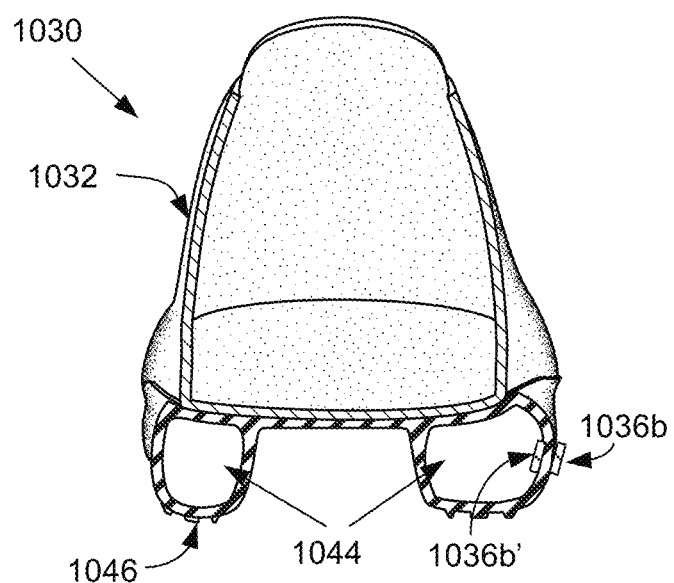
Figure 8P:
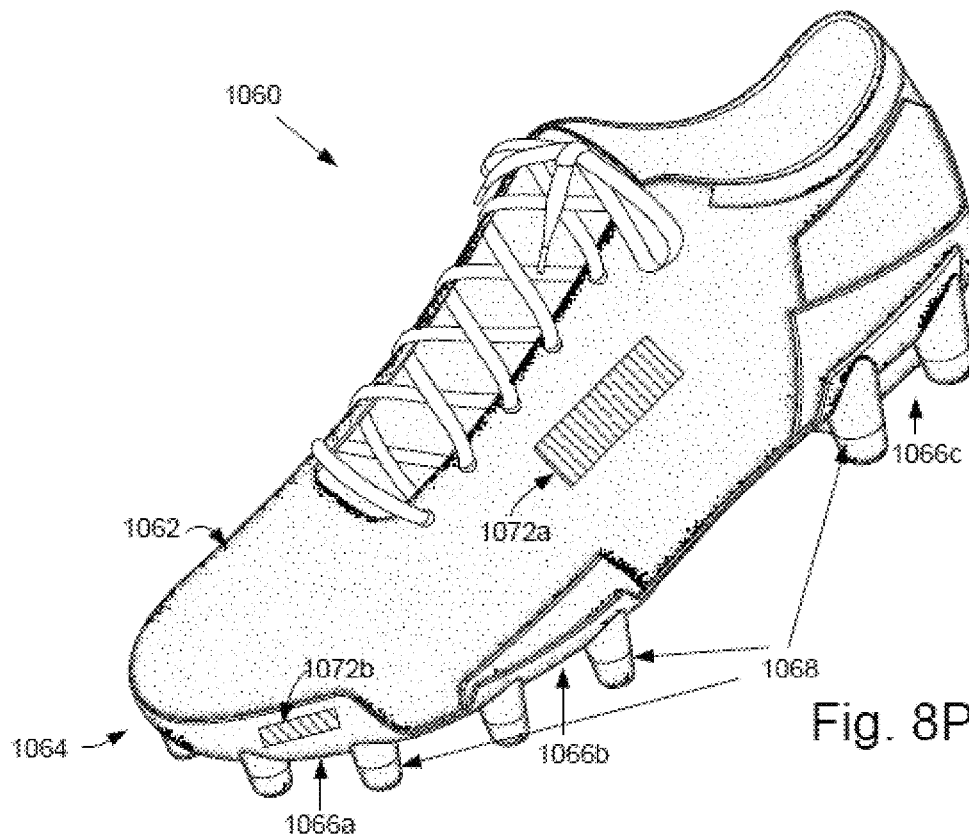
Figure 8P:
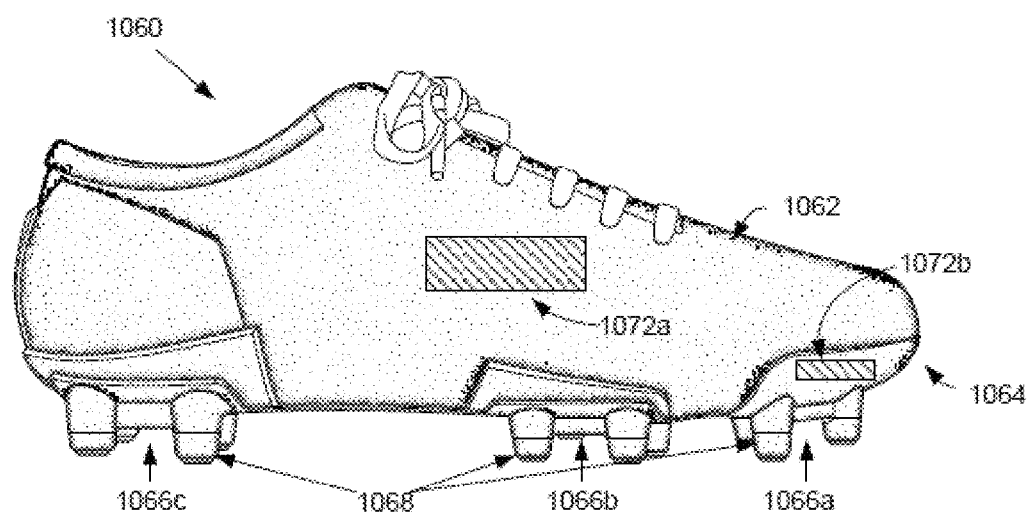
Figure 8Q:
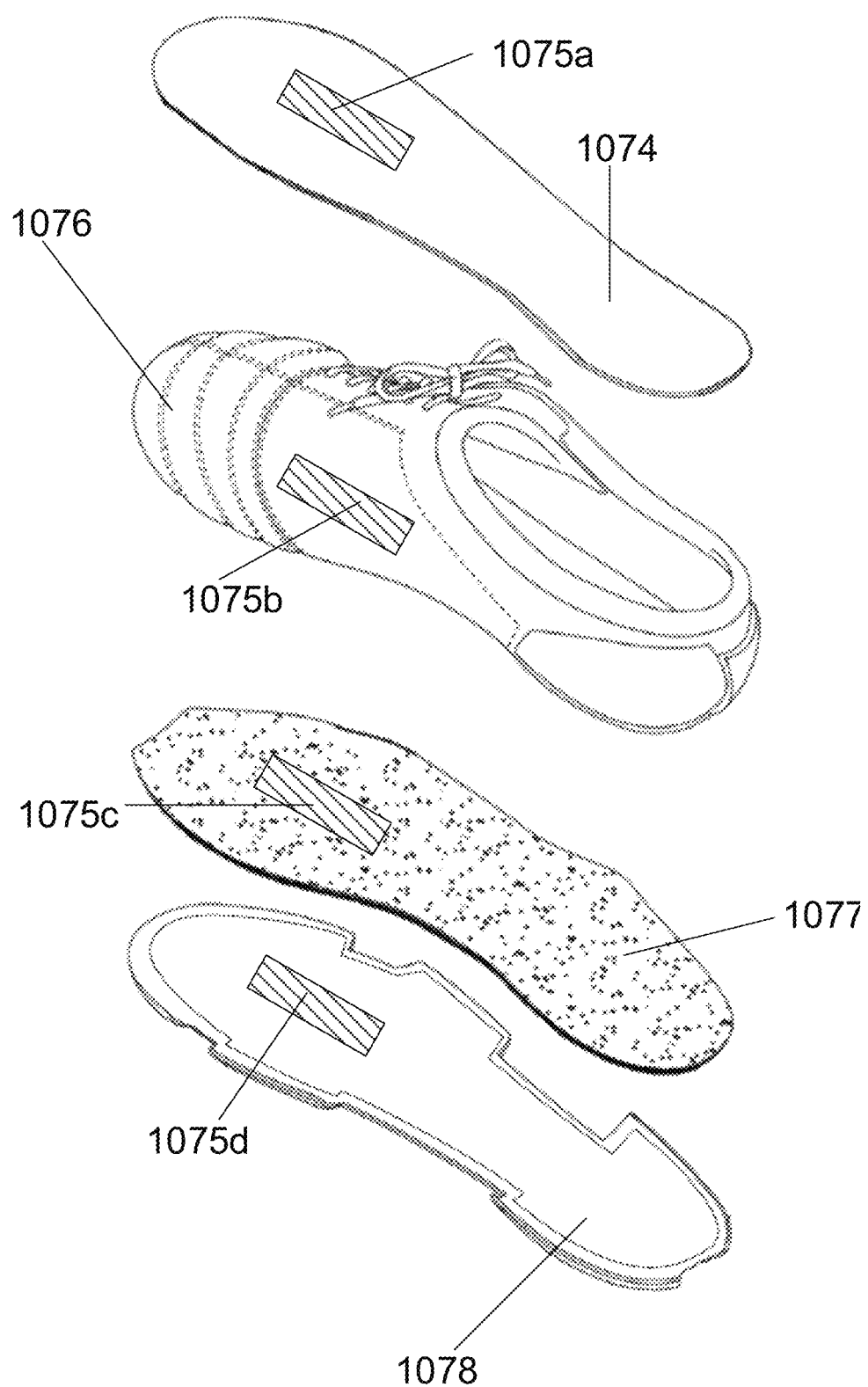
Figure 8Q:
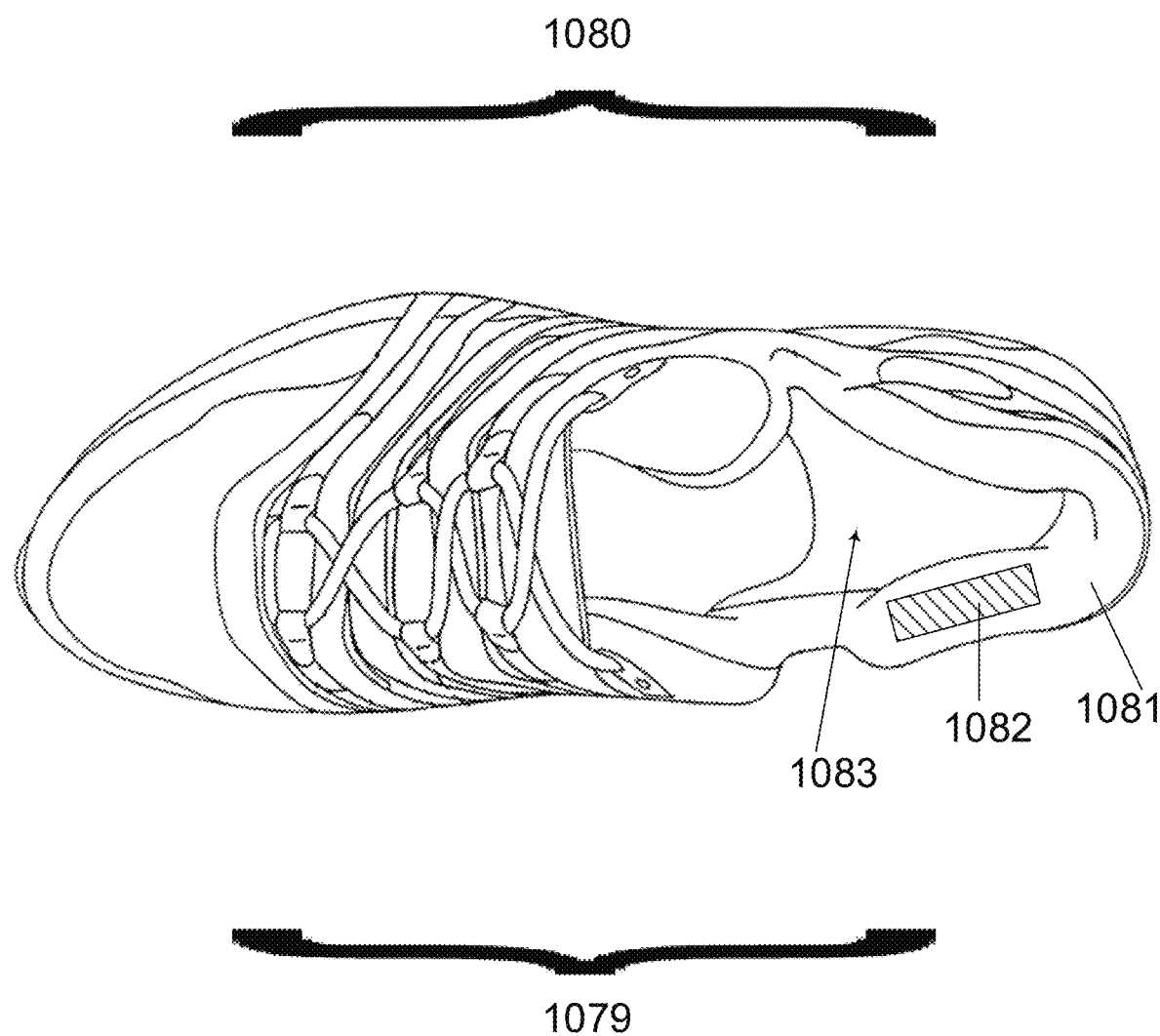
Figure 8Q:
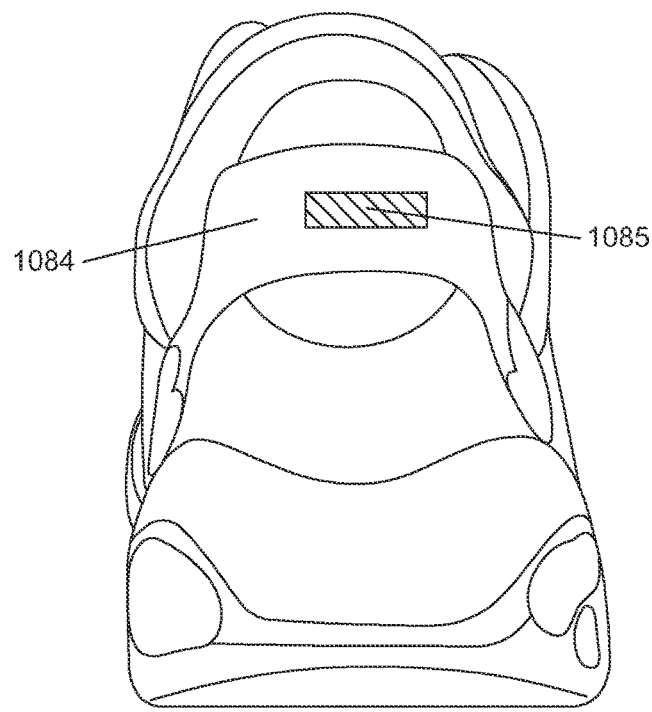
Figure 8Q:
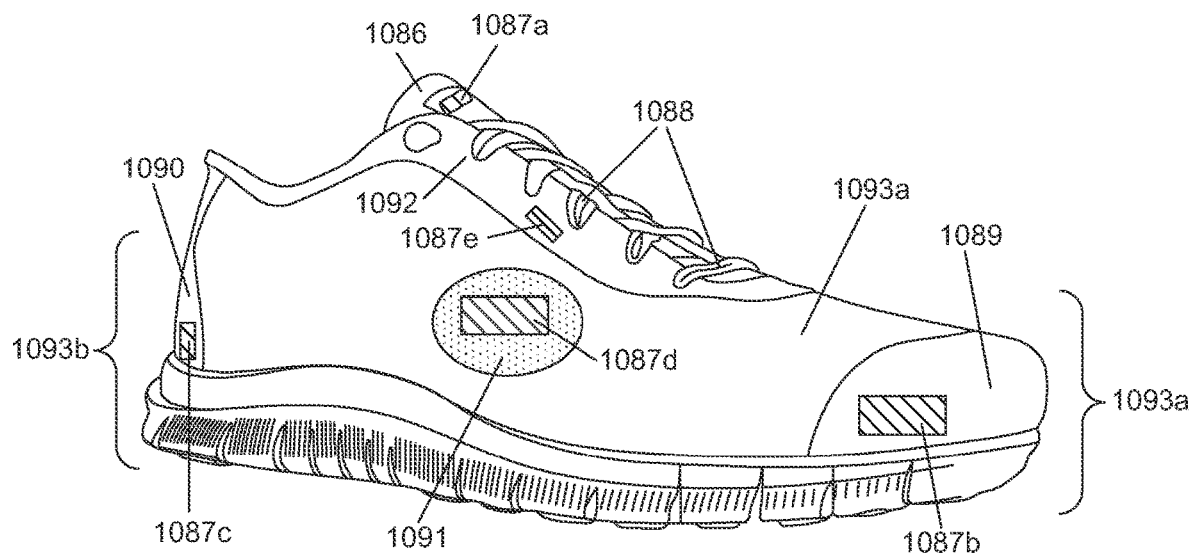
Figure 8Q:
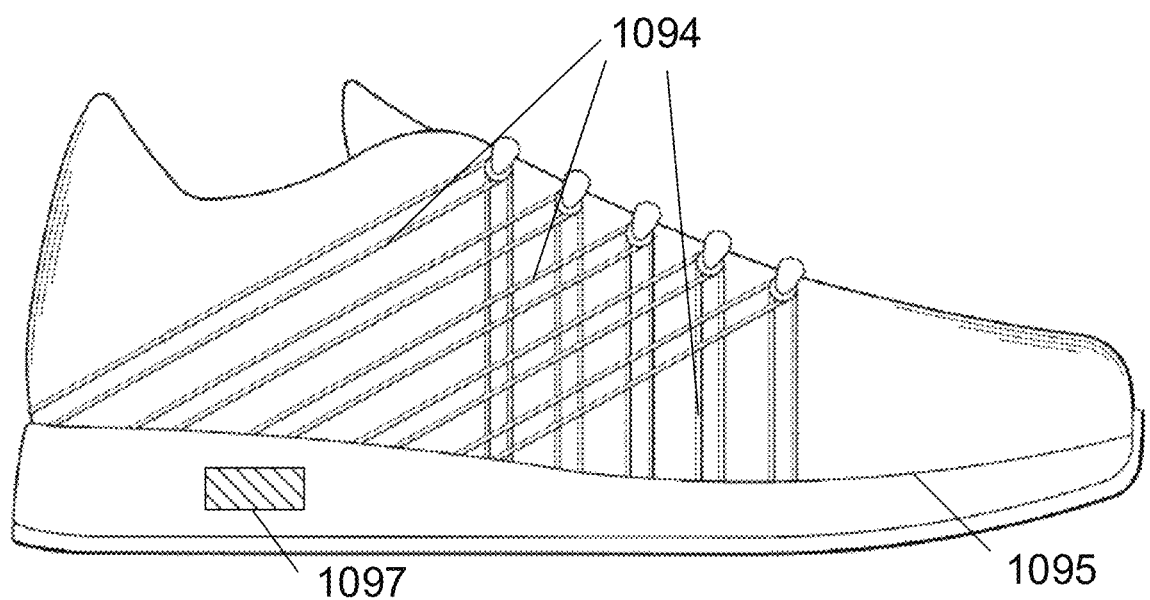

FIGS. 8A-8Q illustrate various articles which can comprise a textile of the present disclosure, including a thermoformed textile of the present disclosure. As illustrated in FIGS. 8A-8Q, hashed areas are positioned on various regions and structures of the articles. These hashed areas are intended to illustrate general regions and structures which can comprise a textile of the present disclosure, and are not necessarily intended to be representative of the size of the surface area of the region or surface defined by a surface of the textile. In some aspects, the hashed areas indicate a surface of a region or a surface of a structure which can be defined by the thermoplastic network of a thermoformed textile in accordance with the present disclosure. In one aspect, the surface defined by the thermoplastic network can have a total surface area of at least one square centimeter. In another aspect, the surface defined by the thermoplastic network comprises a polymeric composition of a coated yarn in re-flowed and re-solidified form.

FIGS. 8A-8M illustrates footwear, apparel, athletic equipment, container, electronic equipment, and vision wear that include the textile of the present disclosure, including a thermoformed textile of the present disclosure. The structure including the textile is represented by hashed areas 12A'/12M'-12A"/12M'. The location of the structure is provided only to indicate one possible area that the structure can be located. Also, two locations are illustrated in some of the figures and one location is illustrated in other figures, but this is done only for illustration purposes as the items can include one or a plurality of structure, where the size and location can be determined based on the item.

FIGS. 8N(a)-8N(b) illustrate a perspective view and a side view of an article of footwear 100 that include a sole structure 1004 and an upper 1002. The structure including the textile is represented by 1022a and 1022b. The sole structure 1004 is secured to the upper 1002 and extends between the foot and the ground when the article of footwear 1000 is worn. The primary elements of the sole structure 1004 are a midsole 1014 and an outsole 1012. The midsole 1014 is secured to a lower area of the upper 1002 such as a strobe (not shown) and may include a cushioning element comprising a resilient material such as a polymer foam or another appropriate material. in other configurations, the cushioning element of the midsole 1014 can incorporate fluid-filled chambers, plates, moderators, and/or other elements that further attenuate forces, enhance stability, or influence motions of the foot. The outsole 1012 is secured to a lower surface of the midsole 1014 and may comprise a wear-resistant elastomeric material such as a natural or synthetic rubber material. The outsole can be textured to impart traction, or can include one or more traction elements. The traction elements can be separate elements affixed to the outsole, or can be integrally formed with the outsole The upper 1002 can be formed from various elements (e.g., lace stays, tongue, collar, medial side, lateral side, vamp, toe box, heel counter) that combine to provide a structure for securely and comfortably receiving a foot. Although the configuration of the upper 1002 may vary significantly, the various elements generally define a void within the upper 1002 for receiving and securing the foot relative to sole structure 1004, Surfaces of the void within upper 1002 are shaped to accommodate the foot and can extend over the instep and toe areas of the foot, along the medial and lateral sides of the foot, under the foot, and around the heel area of the foot. The upper 1002 can be made of one or more materials such as films, textiles, cables, yarns, fibers, foams, natural leathers, synthetic leathers, and the like that are knitted, stitched, bonded or otherwise connected together. Although this configuration for the sole structure 1004 and the upper 1002 provides an example of a sole structure that may be used in connection with an upper, a variety of other conventional or nonconventional configurations for the sole structure 1004 and/or the upper 1002 can also be utilized. Accordingly, the configuration and features of the sole structure 1004 and/or the upper 1002 can vary considerably.

FIGS. 8O(a) and 8O(b) illustrate a perspective view and a side view of an article of footwear 1030 that include a sole structure 1034 and an upper 1032. The structure including the textile is represented by 1036a and 1036b/1036b'. The sole structure 1034 is secured to the upper 1032 and extends between the foot and the ground when the article of footwear 1030 is worn. The upper 1032 can be formed from various elements (e.g., lace, tongue, collar) that combine to provide a structure for securely and comfortably receiving a foot. Although the configuration of the upper 1032 may vary significantly, the various elements generally define a void within the upper 1032 for receiving and securing the foot relative to the sole structure 1034. Surfaces of the void within the upper 1032 are shaped to accommodate the foot and can extend over the instep and toe areas of the foot, along the medial and lateral sides of the foot, under the foot, and around the heel area of the foot. The upper 1032 can be made of one or more materials such as textiles including natural and synthetic leathers, molded polymeric components, polymer foam and the like that are stitched or bonded together.

The primary sole components of the sole structure 1034 can include a forefoot component 1042, a heel component 1044, and an outsole 1046. Each of the forefoot component 1042 and the heel component 1044 can be directly or indirectly secured to a lower area of the upper 1032. In some aspects, the outsole 1046 may include one or both of an integrally-formed heel component and forefoot component (not shown). The sole component can comprise a polymeric material that encloses a fluid, which may be a gas, liquid, or gel. During walking and running, for example, the forefoot component 1042 and the heel component 1044 may compress between the foot and the ground, thereby attenuating ground reaction forces. That is, the forefoot component 1042 and the heel component 1044 may be inflated and/or may be pressurized with the fluid to cushion the foot. In aspects where the outsole 1046 is a separate sole component, the outsole 1046 can be secured to lower areas of the forefoot component 1042 and the heel component 1044 and may be formed from a wear-resistant material that is textured to impart traction. The sole component, such as a forefoot component 1042 or a heel component 1044 or a combination forefoot and heel component (not shown), can comprise one or more polymeric materials (e.g., a film comprising layers of one or more polymeric materials) that form one or more chambers that includes a fluid such as a gas. Wien the sole component comprises a plurality of chambers, the plurality of chambers can be independent or fluidically interconnected. In some configurations, the sole structure 1034 may include a foam material forming at least one layer or region of the sole structure, for example, a layer or region that extends between the upper 1032 and one or both of the forefoot component 1042 and the heel component 1044, or a foam region may be located within indentations in the lower areas of the forefoot component 1042 and the heel component 1044. In other configurations, the sole structure 1032 may incorporate plates, moderators, lasting elements, or motion control members that further attenuate forces, enhance stability, or influence the motions of the foot, for example. In some configurations, the sole structure or sole component can consist essentially of one or more plates comprising one or more traction elements, such as a single plate extending from the toe to the heel of the upper, or two or more plates, where a single plate is directly or indirectly affixed to a tip of the region of the upper, a forefoot region of the upper, a midfoot region of the upper, a heel region of the upper, or any combination thereof. Although the depicted configuration for the sole structure 1034 and the upper 1032 provides an example of a sole structure that may be used in connection with an upper, a variety of other conventional or nonconventional configurations for the sole structure 1034 and/or the upper 1032 can also be utilized. Accordingly, the configuration and features of the sole structure 1034 and/or the upper 1032 can vary considerably.

FIG. 8O(c) is a cross-sectional view of A-A that depicts the upper 1032 and the heel component 1044. The textile 1036b can be disposed on the externally-facing surface of the heel component 1044 or alternatively or optionally the textile 1036b' can be disposed on the internally-facing side of the heel component 1044.

FIGS. 8P(a) and 8P(b) illustrate a perspective view and a side view of an article of footwear 160 that includes traction elements 1068. The structure including the textile is represented by 1072a and 1072b. The article of footwear 1060 includes an upper 1062 and a sole structure 1064, where the upper 1062 is secured to the sole structure 1064. The sole structure 1064 can include one or more of a toe plate 1066a, a mid-foot plate 1066b, and a heel plate 1066c. The plate can include one or more traction elements 1068, or the traction elements can be applied directly to a ground-facing surface of the article of footwear. As shown in FIGS. 8P(a) and (b), the traction elements 1068 are cleats, but the traction elements can include lugs, cleats, studs, and spikes as well as tread patterns to provide traction on soft and slippery surfaces. In general, the cleats, studs and spikes are commonly included in footwear designed for use in sports such as global football/soccer, golf, American football, rugby, baseball, and the like, while lugs and/or exaggerated tread patterns are commonly included in footwear (not shown) including boots design for use under rugged outdoor conditions, such as trail running, hiking, and military use. Footwear designed for running on paved surfaces commonly include tread patterns. The sole structure 1064 is secured to the upper 1062 and extends between the foot and the ground when the article of footwear 1060 is worn.

FIGS. 8Q(a)-8Q(j) illustrate additional views of exemplary articles of athletic footwear including various configurations of upper 1076. FIG. 8Q(a) is an exploded perspective view of an exemplary article of athletic footwear showing insole 1074, upper 1076, optional midsole or optional lasting board 1077, and outsole 1078, which can take the form of a plate. Structures including the disclosed textiles are represented by 1075a-1075d. FIG. 8Q(b) is a top view of an exemplary article of athletic footwear indicating an opening 183 configured to receive a wearer's foot as well as an ankle collar 1081 which may include textile 1082. The ankle collar is configured to be positioned around a wearers ankle during wear, and optionally can include a cushioning element. Also illustrated are the lateral side 1080 and medial side 1079 of the exemplary article of athletic footwear. FIG. 8Q(c) is a back view of the article of footwear depicted in FIG. 13Q(b), showing an optional heel clip 1084 that can include textile 1085. FIG. 8Q(d) shows a side view of an exemplary article of athletic footwear, which may optionally also include a tongue 1086, laces 1088, a toe cap 1089, a heel counter 1090, a decorative element such as a logo 1091, and/or eyestays for the laces 1092 as well as a toe area 1093a, a heel area 1093b, and a vamp 1093c. In some aspects, the heel counter 1090 can be covered by a layer of knitted, woven, or nonwoven fabric, natural or synthetic leather, film, or other shoe upper material. In some aspects, the eyestays 1092 are formed as one continuous piece; however, they can also comprise several separate pieces or cables individually surrounding a single eyelet or a plurality of eyelets. Structures including the disclosed textiles are represented by 1087a-1087e. While not depicted, the disclosed textiles can be present on the eyestays 1092 and/or the laces 1088. In some configurations, the sole structure can include a sole structure, such as a midsole having a cushioning element in part or substantially all of the midsole, and the textile can be disposed on an externally-facing side of the sole structure, including on an externally-facing side of the midsole. G. 8Q(e) is a side view of another exemplary article of athletic footwear. In certain aspects, the upper can comprise one or more containment elements 1094 such as wires, cables or molded polymeric component extending from the lace structure over portions of the medial and lateral sides of the exemplary article of athletic footwear to the top of the sole structure to provide lockdown of the foot to the sole structure, where the containment element(s) can have a textile (not shown) disposed on an externally-facing side thereon. In some configurations, a rand (not shown) can be present across part or all of the biteline 1095.

Processes for Manufacturing

Certain conventional thermoforming processes include the selective thermoforming of only a portion of an article, e.g., by masking portions of the article not desired to be exposed to the thermoforming process, or using tooling which contacts or covers only a portion of an article. However, such conventional methods result in time and energy intensive manufacturing processes, as multiple steps are required to mask and unmask portions of the article before and after the thermoforming process, or multiple sets of tooling are required. Other conventional thermoforming processes include the thermoforming of article components prior to assembly into an article. This conventional process is also a time and resource intensive process, as multiple steps and machinery are required to individually form the article components prior to assembling the article. Moreover, an article formed from several individual components results in multiple seams where the individual components interface, thereby providing weaknesses in the article, less natural feel for a wearer, and/or actual discomfort or injury for a wearer.

The manufacturing processes disclosed herein solve one or more of the foregoing problems. The manufacturing processes disclosed herein utilize one or more of the films, textiles, yarns and fibers disclosed herein. For example, in certain aspects, as discussed further below, the specific and selective incorporation of the film, fiber, filament, yarn, or textile as described herein into an article provides a way to program structural features into an article that can be formed upon thermoforming. In some aspects, the article can comprise a textile comprising the film, fiber, filament or yarn as described herein, e.g., a textile comprising at least one plurality of fibers or yarn comprising a film, fiber, filament or yarn as described herein in at least a portion of the textile. In another aspect, the article can comprise a first shaped article comprising a film, fibers, filaments, textile, yarn as described herein, and a second shaped component, film, textile, yarn or plurality of fibers, e.g., a knit upper for an article of footwear and a film as described herein. In further aspects, the article can comprise an aggregation of components at least a portion of which comprise a film, fiber, filament or yarn as described herein and a second fiber, upon which the disclosed thermoforming process has been applied.

Since, in aspects, such structural features are built into the article depending upon the location in the article of the film, fiber, filament or yarn as described herein, upon thermoforming these structural features become integrated with each other, allowing for a more natural feel for the wearer or user. For example, a knit program for electronic knitting equipment can used to determine the location of structural features. However, as already noted, the manufacturing processes (and advantages associated with these processes) is not limited to the use of the textiles disclosed herein. For example, a process to form structural features in a disclosed article can utilize a film as described herein with a textile is also contemplated as a process to program structural features into a disclosed article. Alternatively, a process to effectively program structural features into a disclosed article can utilize a shaped component comprising a film, fiber, filament or yarn as described herein with a textile.

Additionally, this selective incorporation of the film, fiber, filament or yarn as described herein into an article provides for a streamlined manufacturing process. For example, in certain aspects, an entire article can be formed by arranging components and exposing the arranged components to a thermoforming process, where the components that include the film, fiber, filament or yarn as described herein melt, flow, and re-solidify into a more rigid structural feature, while the components that include a film, fiber, filament or yarn as not provided herein do not deform during the thermoforming process. In such aspects, this allows for the entire article to be exposed to the thermoforming process without the need to mask or protect areas that the manufacturer does not wish to melt, flow, and re-solidify, thereby resulting in a more time and energy efficient manufacturing process. Further, in some cases, use of the articles described herein in the manufacturing processes described herein also allows for several different structural or other advantageous features to be provided in the article without the need to combine individual components into the final article, since such features can be built into the article at the textile level using the film, fiber, filament or yarn as described herein.

In various aspects, the thermoforming process occurs at a temperature above the melting temperature of the thermoplastic elastomer present in the films, fibers, yarns and textiles described herein. In an aspect, thermoforming generates a "consolidated" textile. In one aspect, a consolidated textile comprises a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition. In another aspect, the thermoformed network of yarns is the thermoformed product of a first textile comprising a first network of yarns including a first coated yarn comprising the first core yarn and a first coating, where the first coating includes the first polymeric composition and wherein, in the thermoformed network, the first polymeric composition consolidating the thermoformed network of yarns is the re-flowed and re-solidified product of the first polymeric composition of the first coating of the first coated yarn. In some aspects, the thermoformed network of yarns is the thermoformed product of a first textile as described herein.

Also disclosed is a method of making a textile, the method comprising forming a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition, thereby forming a thermoformed network of yarns comprising the first core yarn and the first polymeric composition, wherein the first polymeric composition consolidates the thermoformed network of yarns by surrounding at least a portion of the first core yarn and occupying at least a portion of the spaces between yarns in the thermoformed network of yarns.

In a further aspect, in a consolidated textile, the first polymeric composition surrounds external surfaces of at least a portion of the yarn or yarns forming the textile, the first polymeric composition occupies spaces between the yarns, and the first polymeric composition forms attachments between the yarns, such that the stretch of the textile is reduced. In one aspect, the reduction in stretch can be along just one axis of the consolidated textile (e.g., an x axis, a y axis, or a bias axis at a 45 degree angle to the x and y axes) or along more than one axis of the consolidated textile.

In certain aspects, the core yarn can be a monofilament or multifilament yarn. The yarns can be based on natural or manmade fibers including polyester, high tenacity polyester, polyamide yarns, metal yarns, stretch yarns, carbon yarns, glass yarns, polyethylene or polyolefin yarns, bi-component yarns, PTFE yarns, ultra-high-molecular-weight polyethylene (UHMWPE) yarns, liquid crystal polymer yarns, specialty decorative yarns or reflective yarns or a multi-component yarn comprising one or more of the yarns.

In various aspects, the polymeric composition can further comprise an additive, such as, but not limited to, be one or more of a thickener, processing aid, a dye or colorant. In a further aspect, the additive is not optional and comprises at least one thickener. In a still further aspect, the additive is not optional and comprises at least one processing aid. In yet a further aspect, the additive is not optional and comprises at least one thickener and at least one processing aid. In certain aspects, the thickener can comprise an inorganic material such as silica, talc, or calcium carbonate ($CaCO_3$).

In certain aspects, as described herein, a thickener can be used during the preparation of the first polymeric composition (i.e., coating composition) in order to improve productivity and matting properties. In a further aspect, the thickener is silica powder, talc, or $CaCO_3$. The thickener acts, at least in part, to increase the viscosity of the first polymeric composition.

In certain aspects, the first polymeric composition can comprise a processing agent in order to improve productivity. In a further aspect, the processing agent can be montane wax or a fatty acid ester (C5-C9) with pentaerythritol.

In certain aspects, the coated yarn having a desired color can be produced by adding a master batch corresponding to the desired color during production of the first polymeric composition for coating yarn. In a further aspect, a TPU compound for coating yarn, which has a desired hardness, can be prepared by controlling the content of raw material. In a still further aspect, the thickness of coated yarn can be reduced depending on the thickness of yarn made of polyester, nylon, spandex or the like.

In various aspects, the first polymeric composition for coating yarn has a cold Ross flex test result of about 120,000 to about 180,000, or of about 140,000 to about 160,000, or of about 130,000 to about 170,000 when tested on a thermoformed plaque of the first polymeric composition for coating yarn in accordance with the cold Ross flex test as described herein below.

In certain aspects, the coated yarn can be prepared by compounding in a conventional extruder the first polymeric composition, and optionally also including one or more additives, and then coating the compounded first polymeric composition on the surface of the core yarn. In a further aspect, the process for preparing the coated yarn comprises the steps of: 1) preparing formed thermoplastic pellets; and 2) producing coated yarn. The formed thermoplastic pellets can be prepared by the method disclosed herein, prepared by similar methods as known to the skilled artisan, or obtained from a commercially available source.

The step of preparing formed thermoplastic pellets can comprise the following steps: 1) mixing a thermoplastic elastomer with various additives, e.g., a thickener and/or a processing aid, and feeding the mixture into the hopper of a conventional compounding extruder; 2) melting, kneading and compounding the mixture in the cylinder of the compounding extruder at a suitable temperature and pressure; 3) cutting the compounded thermoplastic elastomer, discharged through the dice of the compounding extruder, in cooling water to form pellets; and 4) drying the formed thermoplastic elastomer pellets at a suitable temperature for about period of time and aging the dried pellets at a suitable temperature for a suitable period of time.

In a particular example, the step of preparing formed thermoplastic pellets comprises the steps of: 1) mixing thermoplastic elastomer with various additives, e.g., a thickener and/or a processing aid, and feeding the mixture into the hopper of a conventional compounding extruder; 2) melting, kneading and compounding the mixture in the cylinder of the compounding extruder at a temperature of about 150-250 degrees Celsius and a pressure of about 50-150 kgf; 3) cutting the compounded thermoplastic elastomer, discharged through the dice of the compounding extruder, in cooling water to form pellets; and 4) drying the formed thermoplastic elastomer pellets at a temperature of 60-80 degrees Celsius for about 4-6 hours and aging the dried pellets at a temperature of 30-50 degrees Celsius for about 7 days or more.

In certain aspects, the step of producing the coated yarn can comprise the following steps: 1) mixing the formed thermoplastic elastomer pellets, prepared as described above, with a master batch corresponding to a desired color and feeding the mixture into the hopper of a yarn coating extruder; 2) melting the mixture of the formed thermoplastic elastomer pellets and the master batch in the cylinder of the yarn coating extruder at a suitable temperature and a suitable pressure; 3) coating the compounded thermoplastic elastomer and master batch on the surface of yarn passing through a nipple and a dice to produce coated yarn; and 4) winding the coated yarn around a bobbin using a winding machine.

In one aspect, the coated yarn can have a thermal shrinkage of from 0 to 20 percent, optionally of from 0 to 15 percent, or of from 0 to 10 percent, measured as described in the Property Analysis and Characterization Procedures. In another aspect, the coated yarn can have a tenacity of from about 1 gram per denier to about 10 grams per denier, optionally of about 2 grams per denier to about 8 grams per denier, or of about 2.5 grams per denier to about 5 grams per denier, measured as described in the Property Analysis and Characterization Procedures. In still another aspect, the coated yarn can have a strain at break of from 0 to 20 percent, optionally of from 0 to 15 percent, or of 0 to 10 percent, measured as described in the Property Analysis and Characterization Procedures. In any of these aspects, thermal shrinkage, tenacity, and strain at break relate to the suitability of yarns for commercial knitting machines. In a further aspect, coated yarns having the disclosed properties are suitable for commercial knitting.

In particular, the step of producing the coated yarn can comprise the following steps: 1) mixing the formed thermoplastic elastomer pellets with a master batch corresponding to a desired color and feeding the mixture into the hopper of a yarn coating extruder; 2) melting the mixture of the formed thermoplastic elastomer pellets and the master batch in the cylinder of the yarn coating extruder at a temperature of about 150-250 degrees Celsius. and a pressure of about 50-150 kgf; 3) coating the compounded thermoplastic elastomer and master batch on the surface of yarn passing through a nipple and a dice to produce coated yarn; and 4) winding the coated yarn around a bobbin using a winding machine.

In one aspect, the yarn is a coated yarn comprising a core yarn comprising a second polymeric composition and a coating layer disposed on the core yarn, the coating layer comprising the first polymeric composition, wherein the first polymeric composition has a first melting temperature, wherein the second polymeric composition is a second thermoplastic composition having a second deformation temperature, and the second deformation temperature is at least 20 degrees Celsius greater, optionally at least 50 degrees Celsius greater, optionally at least 75 degrees Celsius greater, or optionally at least 100 degrees Celsius greater than the first melting temperature of the first polymeric composition.

In one aspect, the yarn is a coated yarn comprising a core yarn comprising a second polymeric composition and a coating layer disposed on the core yarn, the coating layer comprising the first polymeric composition, wherein the first polymeric composition has a first melting temperature, wherein the second polymeric composition is a second thermoplastic composition having a second deformation temperature, and the second deformation temperature is at least 20 degrees Celsius greater than the first melting temperature of the first polymeric composition, wherein the second polymeric composition is a first thermoset composition.

In one aspect, the yarn is a coated yarn comprising a core yarn comprising a second polymeric composition and a coating layer disposed on the core yarn, the coating layer comprising the first polymeric composition, wherein the first polymeric composition has a first melting temperature, wherein the second polymeric composition is a second thermoplastic composition having a second deformation temperature, and the second deformation temperature is at least 20 degrees Celsius greater than the first melting temperature of the first polymeric composition, wherein the second polymeric composition is a first thermoset composition, and wherein the difference between the second deformation temperature and the first melting temperature is at least 20 degrees Celsius, at least 50 degrees Celsius, at least 75 degrees Celsius, or at least 100 degrees Celsius.

In various aspects, the thermoforming process occurs at a temperature above the first melting temperature of the first polymeric composition but below the deformation temperature of the second polymeric composition. In this aspect, the core yarn (i.e., the second polymeric composition) does not deform or soften during the coating process.

In various aspects, the thermoforming process occurs at a temperature below the deformation temperature of the second polymeric composition that has been dyed so that such dye does not leach out of the yarn or fiber and into the surround during the thermoforming process. Thus, in order to form various textiles and articles described herein, the deformation temperature of the second polymeric composition is below a temperature used to dye the core fiber.

In particular examples, the films, fibers, filaments, and yarns described herein have melting characteristics and acceptable levels of shrinkage when present in a yarn and used in commercial knitting equipment.

Accordingly, in one aspect, a process for manufacturing an article is provided. The article can be a component of an article of footwear, a component of an article of apparel, or is a component of an article of sporting equipment. For example, a component of an article of sporting equipment can be a hat, a component of a bag, a component of a ball, and a component of protective equipment.

In one aspect, the process for manufacturing the article includes placing a first film, fiber, filament or yarn as described herein, or a textile as described herein on a surface; while the first film, fiber, filament, yarn or textile is on the surface, increasing a temperature of the first film, fiber, filament, yarn or textile to a temperature that is above the melting temperature of the first polymeric composition; and subsequent to the increasing the temperature, while the first film, fiber, filament, yarn or textile remains on the surface, decreasing the temperature to a temperature below the melting temperature of the first polymeric composition, thereby forming a article.

In one aspect, disclosed herein is a method for making an article comprising affixing a first textile to a second component, wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition. In another aspect, disclosed herein is a method of making an article, the method comprising thermoforming a first textile, wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition and wherein the thermoforming comprises melting, reflowing, and re-solidifying the first polymeric composition within the first textile, forming a thermoformed textile comprising a thermoformed network of yarns comprising the first core yarn and the first polymeric composition, wherein the first polymeric composition consolidates the thermoformed network of yarns by surrounding at least a portion of the first core yarn and occupying at least a portion of spaces between yarns in the thermoformed network of yarns. In still another aspect, disclosed herein is a method for making an article, the method comprising affixing a first textile to a second component, wherein the first textile comprises a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition. In some aspects, the method for making the article further includes the process of making a textile as disclosed herein. Also disclosed are articles made by the disclosed methods and processes.

In one aspect, a method for making an upper for an article of footwear is provided, the method comprising affixing a first textile to a second component, wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition. In another aspect, disclosed herein is a method for making an upper for an article of footwear, the method comprising thermoforming an upper comprising a first textile, wherein the first textile comprises a first network of yarns including first coated yarn, the first coated yarn comprising a first core yarn and a first coating including a first polymeric composition disposed on at least a portion of an outer surface of the first core yarn, wherein the first polymeric composition is a thermoplastic elastomeric composition and wherein the thermoforming comprises melting, reflowing, and re-solidifying the first polymeric composition with n the first textile, forming a thermoformed textile comprising a thermoformed network of yarns comprising the first core yarn and the first polymeric composition, wherein the first polymeric composition consolidates the thermoformed network of yarns by surrounding at least a portion of the first core yarn and occupying at least a portion of spaces between yarns in the thermoformed network of yarns. In still another aspect, disclosed herein is a method for making an upper for an article of footwear, the method comprising affixing a first textile to a second component, wherein the first textile comprises a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition. Also disclosed are uppers made by the disclosed methods and processes.

In some aspects, more than one coating can be applied to the yarns disclosed herein. In one aspect, disclosed herein are yarns containing an optional second coating and/or an optional third coating. In some aspects, the first coating is applied to the entirety of the core yarn and the second and/or third coatings are applied on top of the first coating. In other aspects, the first coating is applied to only a portion of the core yarn and the second and/or third coatings are applied to portions of the core yarn uncoated by the first coating. In any of these aspects, when the second coating and/or the third coating is polymeric, the second coating and/or third coating displays melting characteristics similar to those of the first coating. In some aspects, the second coating and/or the third coating melts at a lower temperature than the $T_m$ of the first coating.

In another aspect, a process for making a midsole-outsole unit for an article of footwear is provided. The process includes affixing a midsole cushioning element and an outsole component for an article of footwear to each other, wherein the first polymeric composition defines at least a portion of an outer surface of the outsole configured to be ground-facing or ground-contacting.

In another aspect, a process for manufacturing an upper for an article of footwear is provided. In one aspect, the method involves affixing an upper and an outsole to each other to form the article of footwear, wherein the first polymeric composition defines at least a portion of an outer surface of the upper.

In another aspect, a process for manufacturing an outsole for an article of footwear is provided. In one aspect, the method involves affixing an upper and an outsole to each other to form the article of footwear, wherein the first polymeric composition defines at least a portion of an outer surface of the outsole configured to be ground-facing or ground-contacting.

In another aspect, a process for manufacturing a midsole-outsole unit for an article of footwear comprising a midsole cushioning element and an outsole element is provided. In one aspect, the method involves affixing an upper and an outsole to each other to form the article of footwear, wherein the first polymeric composition defines at least a portion of an outer surface of the midsole-outsole unit configured to be ground-facing or ground-contacting.

In another aspect, a process for making an upper for an article of apparel is provided. The process includes weaving a first course that includes interlacing a first yarn and a second yarn. The first and/or second yarn includes a film, fiber, filament or yarn as described herein. In some aspects, at least a portion of the first yarn is a warp yarn; and wherein at least a portion of the second yarn is a weft yarn. In alternative aspects, at least a portion of the first yarn is a weft yarn; and wherein at least a portion of the second yarn is a warp yarn. In one aspect, when the textile is a woven textile, the first network of yarns includes interlaced sets of yarns comprising the first coated yarn in a warp direction, or in a weft direction, or in both the warp and weft directions.

In a still further aspect, a process for manufacturing an upper for a shoe is provided. The process includes receiving an upper that includes a first yarn and a second yarn. The first and/or second yarn includes a film, fiber, filament or yarn as described herein. In a first portion of the upper, at least one of the first yarn and the second yarn form a plurality of interconnected loops. The process also includes placing the upper on a last. Further, the process includes heating the entire upper, while on the last, to a temperature that is above the melting temperature of the thermoplastic elastomer present in the film, fiber, filament or yarn described herein. Subsequent to the heating the entire upper, cooling the entire upper, while on the last, to a temperature below the melting temperature of the thermoplastic elastomer, to thereby form a thermoformed upper.

In yet another aspect, a process for manufacturing an upper for a shoe is provided. The process includes receiving an upper including one or more first film, fiber, filament or yarns as described herein and one or more second films, fibers, or yarns. The upper includes a ground-facing outsole area, and wherein at least a portion of the one or more first fibers is present on the ground-facing outsole area. The process further includes placing the upper on a last such that at least a portion of the ground-facing outsole area covers at least a portion of a bottom of the last. The process also includes heating the entire upper, while on the last, to a temperature that is above the melting temperature of the thermoplastic elastomer present in the film fibers, or yarn described herein. Subsequent to the heating the entire upper, cooling the entire upper, while on the last, to a temperature below the melting temperature of the thermoplastic elastomer, to thereby form a thermoformed upper.

In a yet further aspect, a process for making a knit upper for an article of footwear is provided. The process includes knitting a first course that includes loops of a first yarn and a second yarn. The first yarn included a film, fibers, filaments, or yarn as described herein. The process further includes knitting a second course that comprises loops of the first yarn and the second yarn. At least a portion of the first course and at least a portion of the second course form a plurality of interconnected loops.

In one aspect, the first yarn and second yarn can be knitted to form a textile. Following textile formation, it can, in some aspects, be desirable to add additional polymeric components directly to the knitted textile. In one aspect, additional polymeric components can be used to form components of an article of footwear such as soccer boot lug tips, an outsole, a rand, or another component. In one aspect, the additional polymeric components can have the same composition as the coating composition disclosed herein but are not incorporated as yarn coatings. In a further aspect, the additional polymeric components can be processed by another method such as injection overmolding. In one aspect, the molten injection component is miscible with and adheres well to the knit textile without the need for primer or adhesive bonding preparation since the molten injection component and the yarn coating composition have the same chemical composition.

The method steps, processes, and operations described herein are not to be construed as necessarily requiring their performance in the particular order discussed or illustrated, unless specifically identified as an order of performance. Additional or alternative steps can be employed.

Exemplary Pre-Thermoforming and Thermoforming Processes

As discussed above, in certain aspects, the articles and textiles described above, e.g., the textile 300 of FIG. 3, can form at least a portion of an article of wear, such as an article of footwear. In such aspects, the textile can form an upper for the article of footwear, where the upper includes a ground-facing outsole portion.

In certain aspects, the article or textile can be combined with additional materials in forming the upper for the article of footwear. For example, in one or more aspects, the textile can be combined or layered with one or more of an ankle collar lining, ankle collar foam, upper lining, or upper foam layer. In certain aspects, one or more of these additional materials can be secured to the textile, e.g., by knitting, stitching, or adhesion, prior to thermoforming the textile.

In one aspect, the films, fibers, filaments, yarns and textiles can be thermoformed using a molding surface such as a flat plate or a conventional two-piece mold. The articles can be heated before contacting the molding surface or can be heated while contacting the molding surface. Optionally, pressure can be applied during or following the heating. When the articles are thermoformed in a flat form, the entire article does not need to be heated (e.g., portions can be masked, or a shaped heated element can be used).

In particular examples, the film, fiber, filament, yarn, textile, or footwear component comprising the first polymeric composition disclosed herein can be thermoformed on a molding surface such as a last. In the example where the article is a component footwear that includes an upper or a component of an upper, (e.g., is a textile that will become part of an upper, is an upper, or is an upper and outsole unit), in order to prepare the article for the thermoforming process, the article is placed on a last such that the article wraps over a portion of the last, or last enters the inside of the upper. For example, the article can wrap around the last to cover all of or a portion of: a bottom portion of the last, a forefoot portion of the last, a heel portion of the last, or any combination thereof. In certain aspects, the last can be formed of a polymeric material such as a high processing temperature polymer composition. In a particular aspect, the last can be formed of a polymeric material having a melting temperature $T_m$ or a degradation temperature greater than 250 degrees Celsius or greater than 300 degrees Celsius such as, for example, a silicone polymer. The last can be made of other types of material as long as such a material would not be deformed or melt during the thermoforming process or otherwise adversely affect the thermoforming of the upper.

In certain aspects, a first layer can be placed on a molding surface, such as a last, before the article, such as an article of footwear or component of an article of footwear. For example, a first layer, such as a liner, can be optionally placed over a molding surface, such as a last. Accordingly, a film, fiber, filament, yarn or textile according to this disclosure is then placed such it covers at least a portion of the liner. Thus, at least a portion of the film, fiber, filament or yarn as described herein is covering at least a portion of the liner.

In further aspects, an outer layer can be optionally positioned on at least a portion of the article that is positioned on a molding surface and covering at least a portion of the article. The outer layer, which can comprise a film, fiber, filament, yarn or textile comprising the first polymeric composition, can be optionally placed over at least a portion of a textile or an article, such as an upper, that is positioned on a molding surface, such as a last. For example, a textile zone which is associated with the ground-facing outsole portion of the upper can cover all or at least a portion of the bottom portion of the last, or at least a portion of a textile or article in contact with the last. Accordingly, a textile zone associated with the upper can cover all or at least a portion of the upper region of the last or can cover all or at least a portion of a textile or upper in contact with the last. Thus, at least a portion of the film, fiber, filament, yarn, textile or component comprising the first polymeric composition as described herein is in contact with at least a portion of the outer layer, or forms at least a portion of the outer layer.

In certain aspects, a shaped component, such as a heel counter or a toe cap, can be optionally placed on an outer surface of an upper or a combination upper and outsole unit. Alternatively, a shaped component, such as a heel counter or a toe cap, can be optionally placed on an inner surface of an upper and thermoformed in contact therewith. It is understood that the placement of a shaped component, whether an outer surface of an upper or an inner surface of an upper, is completed before applying a mask, protective sheath, a vacuum, or any combination thereof as described herein below.

In certain aspects, during the thermoforming process, the film, fiber, filament or yarn as described herein can melt and flow. In various aspects, it can be desirable to mask regions of the article or restrict or direct the flow of the melted film, fiber, filament or yarn as described herein, or both. In such aspects, a protective sheath can be applied over the article positioned on a molding surface. For example, a protective sheath can be positioned over an upper positioned on a last. In certain aspects, the protective sheath can be formed of a polymeric material having a melting temperature greater than that of the second polymeric composition. In a particular aspect, the protective sheath can be formed of an elastomeric polymeric material having a melting temperature $T_m$ or a degradation temperature greater than 250 degrees Celsius or greater than 300 degrees Celsius such as, for example, a silicone polymer. The protective sheath can be made of other types of material as long as such a material would not be deformed or melt during the thermoforming process or otherwise adversely affect the thermoforming of the upper. In aspects, the protective sheath can apply a compressive force to the outer surface of the article being thermoformed, which can aid in restricting and/or directing the flow of the melted first polymeric composition as described herein. Additionally or alternatively, a vacuum can be drawn on the combination of the molding surface and the article positioned on the molding surface, and optionally, when present the protective sheath positioned on the article. For example, a bag under vacuum can be compressed on the outside of the article or protective sheath to apply a compressive force to the article or the article and the protective sheath to ensure the article is in flush contact with the molding surface, or is in flush contact with the molding surface and the protective sheath. Additionally, a protective sheath or a vacuum bag can be used to form a texture on the reflowed first polymeric composition during the thermoforming process.

As discussed above, the thermoforming process includes increasing the temperature of the first polymeric composition, e.g., the film, fiber, filament, yarn, textile, to a temperature that can cause at least a portion of the first polymeric composition as described herein present to melt and flow, or to deform. Further, the thermoforming process includes the subsequent decreasing of the temperature of the first polymeric composition to solidify the re-flowed first polymeric composition as described herein into the desired conformation and/or shape, such as an article of footwear.

As discussed above, it is desirable that the thermoforming process does not deform or alter the shaped components, textiles, fibers and/or yarn comprising the second polymeric composition with a deformation temperature greater than the melting temperature of the first polymeric composition present in the film, fiber, filament or yarn. In one or more aspects, the thermoforming can increase the temperature of the un-masked materials, or only the first polymeric composition, to a temperature of from about 90 degrees Celsius to about 240 degrees Celsius. In aspects, the thermoforming can increase the temperature of the un-masked materials, or only the first polymeric composition, to a temperature of from about 90 degrees Celsius to about 200 degrees Celsius. In one aspect, the thermoforming can increase the temperature of the un-masked materials, or only the first polymeric composition, to a temperature of from about 110 degrees Celsius to about 180 degrees Celsius.

In certain aspects, the temperature of the un-masked materials, or only the first polymeric composition, can be increased for about 10 seconds to about 5 minutes. In aspects, the temperature of the un-masked materials, or only the first polymeric composition, can be increased for about 30 seconds to about 5 minutes. In one aspect, the temperature of the un-masked materials, or only the first polymeric composition, can be increased for about 30 seconds to about 3 minutes.

In certain aspects, the thermoforming can expose the materials on the mold surface to a pressure of about 50 kPa to about 300 kPa. In aspects, the thermoforming can expose the materials on the mold surface to a pressure of about 50 kPa to about 250 kPa. In one aspect, the thermoforming can expose the materials on the mold surface to a pressure of about from about 100 kPa to about 300 kPa.

In certain aspects, the un-masked materials, or only the first polymeric composition, can be exposed the thermoforming under the above conditions multiple times in a row prior to undergoing the cooling step. For example, in some aspects, the un-masked materials, or only the first polymeric composition, can be exposed to the temperatures described above under the above conditions 2 to 10 times in a row prior to undergoing the cooling step. In an alternative example, in some aspects, the un-masked materials, or only the first polymeric composition, can be exposed the temperatures described above under the above conditions twice in a row prior to undergoing the cooling step.

In various aspects, subsequent to increasing the temperature of un-masked materials or only the first polymeric composition, the temperature of the un-masked materials, or only the first polymeric composition is decreased to a temperature below the melting temperature $T_m$ of the first polymeric composition present in the film, fiber, filament or yarn as described herein for a duration of time sufficient for the yarner-flowed first polymeric composition to solidify. For example, the un-masked materials or only the first polymeric composition can be heated using a thermal energy source, including, but not limited to, conventional heaters, such as convection heating, a conventional oven, air-circulating oven or forced hot air oven, steam, targeted microwave heat, ultraviolet radiation, infrared heating, and combinations of any of the foregoing. In an aspect, heat can be applied using hotplates, heat presses, or high tonnage presses with rigid clamshell molds. The thermal energy source can further comprise a plurality of thermal energy sources such as a plurality of similar sources, e.g., a plurality of heating coils or infrared emitters. Alternatively, a plurality of thermal energy sources can comprise a plurality of one or more different thermal energy sources, e.g., a plurality of heating coils and a plurality of infrared emitters that can be used simultaneously or sequentially, or alternatively, used in a mode where only one of the plurality of thermal energy sources is used at any given time.

In some aspects, heating can be carried out such that heat is transferred from another material or object to the un-masked materials or only the first polymeric composition. For example, a molding surface, such as plate, a multi-part closed mold, or a last, can itself be heated directly, e.g., via configuration as a resistive heating element. In an alternative aspect, a molding surface, such as a last, can be preheated to the desired temperature immediately prior to positioning an upper, a textile or an article thereon. In the foregoing aspects, the molding surface itself can act as a heating zone that transfers heat to an entire upper.

In some aspects, heating can be carried out using radio-frequency heating, e.g., microwave radiation, such that the radio-frequency heats the compositions via interaction of a radio-frequency field with a composition, such as the first polymeric composition, that is part of film, fiber, filament, yarn, textile or article.

In certain aspects, subsequent to heating the un-masked materials, the un-masked materials are cooled to a temperature below the melting temperature $T_m$ of the first polymeric composition present in the, fiber, filament or yarn as described herein. In such aspects, the un-masked materials can be exposed to reduced temperatures in a cooling zone. The cooling zone can expose the materials to a pressure of about 0 kilopascals. The materials, when in the cooling zone, can be exposed to a temperature of about −25 degrees Celsius to about 25 degrees Celsius. In aspects, the materials, when in the cooling zone, can be exposed to a temperature of about −10 degrees Celsius to about 25 degrees Celsius. In one aspect, the materials, when in the cooling zone, can be exposed to a temperature of about from about −10 degrees Celsius to about 10 degrees Celsius. The materials can be exposed to one or more of the cooling zone temperatures or ranges discussed above for about 10 seconds to about 5 minutes. The materials can be exposed to one or more of the cooling zone temperatures or ranges discussed above for about 10 seconds to about 3 minutes. The materials can be exposed to one or more of the cooling zone temperatures or ranges discussed above for about 10 seconds to about 2.5 minutes.

The textile can be prepared in a number of different ways. In one aspect, the textile can be prepared as a large piece (e.g., as a rolled good) from which one or more pieces of are cut out. In another aspect, the textile can be formed into a single piece (e.g., knit into a single element having roughly the desired size and shape).

In one aspect, the textile (e.g., a large piece or a single element) can be thermoformed before cutting out smaller pieces from a larger piece, or before trimming a single element. In another aspect, the textile can be cut or trimmed (e.g., cutting a large piece into a smaller piece, or trimming excess material from a single element) and then thermoformed.

In one aspect, the textile (e.g., a cut piece or a single element) can be attached to a second component (e.g., by stitching) before it is thermoformed. In another aspect, the textile (e.g., a cut piece or a single element) can be thermoformed after it has been attached to a second component.

In one aspect, the textile (e.g., an unattached cut piece or single element, or a cut piece or single element attached to a second component) can be thermoformed flat. In another aspect, a three-dimensional conformation can be imparted to the textile (e.g., by stitching or welding it to itself or a second component so that the textile takes on a curved shape, such as the shape of an upper of an article of footwear) before the textile is thermoformed.

In one aspect, the textile can be thermoformed in contact with a molding surface (e.g., to impart a curved surface or a surface texture). The molding surface can be flat, or can have a three-dimensional shape, such as a last for an article of footwear. In another aspect, the textile can be supported only at a few points of contact (e.g., supported by a few pins on a jig) when thermoformed.

In one aspect, the textile can be pressed against the molding surface with a force greater than atmospheric pressure during the thermoforming process. In another aspect, no additional pressure beyond atmospheric pressure may be applied to the textile during the thermoforming process.

In one aspect, the temperature of the entire textile can be increased during the thermoforming process (e.g., the entire textile can be heated). In another aspect, the temperature of only particular regions of the textile may be increased during the thermoforming process (e.g., by applying heat to only those regions of the textile, or by masking other regions of the textile with an insulating material such as silicone).

Films, Fibers, Filaments and Yarns

As discussed above, textiles and shaped components can include the selective incorporation of films, fibers, filaments, and yarns as described alone or in combination with other materials (e.g., second films, fibers, filaments, or yarns that do not fall under the films, fibers, filaments, and yarns described herein). In one aspect, the films, fibers and filaments, described herein can be used to form yarns which in turn can be used to form textiles, including knit, woven, crocheted, or braided textiles, in accordance with the present disclosure. The films, fibers, filaments, and yarns described herein can also be used to form non-woven textiles in accordance with the present disclosure. In one aspect, when the textile is a non-woven textile, the first network of yarns includes entangled or bonded yarns comprising the first coated yarn. In another aspect, the entangled or bonded yarns can be mechanically entangled yarns, thermally bonded yarns, yarns bonded by a solvent treatment, chemically bonded yarns, or any combination thereof.

In certain aspects, one or more of the yarns described herein can be mono-filament yarns or multi-filament yarns. In certain aspects, the yarns can be spun yarns. In various aspects, one or more of the yarns can be formed using conventional techniques including, but not limited to, melt-spinning, solution spinning, or electrospinning.

In certain aspects, the fibers described herein can be fibers of varying sizes, including fibers that are not suitable for spinning into spinning into commercial yarns. The yarns described herein include yarns that are suitable for use in a commercial knitting machine as well as yarns that are not individually suitable for use in a commercial knitting machine. In one aspect, the core yarns described herein have a linear mass density of about 150 denier to about 1,500 denier, or of about 150 denier to about 1,000 denier, or about 250 denier to about 1,500 denier, or about 250 denier to about 1,000 denier, or about 500 to about 1,000 denier, or about 500 to about 750 denier, or about 750 to about 1,000 denier. In another aspect, the core yarn has a diameter of from about 60 micrometers to about 200 micrometers, or about 80 micrometers to about 150 micrometers, or about 90 micrometers to about 120 micrometers.

In certain aspects, the yarns and/or fibers described herein can be used to provide a specific functionality. For example in certain aspects, a yarn as described herein can be thermoformed to form a film having water-proof or water-resistant properties.

In one aspect, coated yarns described herein can have a break strength of from about 0.6 to about 0.9 kilograms of applied force, or of from about 0.7 to about 0.9 kilograms of applied force, or of about 0.8 to about 0.9 kilograms of applied force, or greater than 0.9 kilograms of applied force.

As discussed above, in certain aspects, the films, fibers, filaments and yarns described herein can be dyed, e.g., for aesthetic purposes. In various aspects, the films, fibers, filaments and yarns can be dyed using conventional dyeing techniques, such as package dyeing or solution dyeing. Generally, package dyeing is a process that is performed on already formed films, fibers, filaments, and yarns, while solution dyeing adds coloration the thermoplastic polymeric composition prior to forming the films, fibers, filaments, or yarn. In certain aspects, the films, fibers, filaments and yarns as described herein are not pigmented or dyed, which can result in the region comprising the first polymeric composition being clear or nearly transparent.

In an aspect, the yarns described herein can be produced from films, fibers, or filaments composed of only a single thermoplastic elastomer. In other aspects, the fibers can be composed of a blend of two or more different thermoplastic elastomers.

In one aspect, the yarn is a coated yarn, wherein a core yarn comprises a second polymeric composition and a coating layer disposed on the core yarn, the coating layer comprising the first polymeric composition, wherein the first polymeric composition has a first melting temperature. In one aspect, the second polymeric composition is a second thermoplastic composition having a second deformation temperature, and the second deformation temperature is at least 20 degrees Celsius greater, at least 50 degrees Celsius greater, at least 75 degrees Celsius greater, or at least 100 degrees Celsius greater than the first melting temperature of the first polymeric composition. In another aspect, the second polymeric composition is a second thermoplastic composition having a second melting or deformation temperature, and the second deformation temperature is at about 20 degrees Celsius greater, about 50 degrees Celsius greater, about 75 degrees Celsius greater, or about 100 degrees Celsius greater than the first melting temperature of the first polymeric composition.

In one aspect, the first polymeric composition includes a polymeric component. In one aspect, the first polymeric composition can include a single polymeric component (e.g., a single thermoplastic elastomer). In other aspects, the first polymeric composition can include two or polymeric components (e.g., two or more different thermoplastic elastomers).

In one aspect, the second polymeric composition is a first thermoset composition. In one aspect, the second polymeric composition comprises a second thermoset composition.

The core yarn can be any material which retains its strength at the temperature at which the first polymeric material is extruded during the coating process. The core yarn can be natural fibers or regenerated fibers or filaments, or synthetic fibers or filaments. In one aspect, the core yarn can be composed of a cotton, silk, wool, rayon, nylon, elastane, polyester, polyamide, polyurethane, or polyolefin. In one aspect, the core yarn is composed of polyethylene terephthalate (PET). In one aspect, the second polymeric composition has a deformation temperature greater than 200 degrees Celsius, greater than 220 degrees Celsius, greater than 240 degrees Celsius, or between about 200 degrees Celsius to about 300 degrees Celsius.

In one aspect, the core yarn is a staple yarn, a multi-filament yarn or a mono-filament yarn. In one aspect the core yarn is polytwisted. In one aspect, the core yarn has a linear density of about 100 denier to about 300 denier, or of about 100 to about 250 denier, or about 100 to about 200 denier, or about 100 to 150 denier, or about 150 to 300 denier, or about 200 to 300 denier, or about 250 to 300 denier. In one aspect, the core yarn has a thickness of about 60 microns to 200 microns, about 60 to 160 microns, about 60 to 120 microns, about 60 to 100 microns, about 100 to 200 microns, or about 140 to 200 microns.

In one aspect, the core yarn is polyethylene terephthalate having a thickness of about 100 denier to about 200 denier, about 125 denier to about 175 denier, or about 150 denier to 160 denier. In one aspect, the core yarn is polyethylene terephthalate having a percent elongation of about 20 percent to about 30 percent, about 22 percent to about 30 percent, about 24 percent to about 30 percent, about 20 percent to about 28 percent, or about 20 percent to about 26 percent. In one aspect, the core yarn is polyethylene terephthalate having a tenacity of about 1 gram per denier to about 10 grams per denier, about 3 grams to about 10 grams per denier, about 5 grams to about 10 grams per denier, about 1 gram to about 7 grams per denier, or about 1 gram to about 5 grams per denier.

In one aspect, the coated yarn can be produced by extruding the coating (i.e., the first polymeric composition) onto the core yarn through an annular die or orifice such that the coating layer is axially centered surrounding the core yarn. The thickness of the coating applied to the core yarn can vary depending upon the application of the yarn. In one aspect, the coated yarn is used to produce a knitted textile. In one aspect, the coated yarn has a nominal average outer diameter of up to 1.00 millimeter, or of up to about 0.75 millimeters, or of up to about 0.5 millimeters, or of up to about 0.25 millimeters, or of up to about 0.2 millimeters, or of up to about 0.1 millimeters. In another aspect, the coating has a nominal average outer diameter of about 0.1 millimeters to about 1.00 millimeter, or about 0.1 millimeters to about 0.80 millimeters, or about 0.1 millimeters to about 0.60 millimeters. In another aspect, the coating on the yarn has an average radial coating thickness of about 50 micrometers to about 200 micrometers, or about 50 micrometers to about 150 micrometers, or about 50 micrometers to about 125 micrometers.

In one aspect, the core yarn has a thickness of about 100 denier to about 200 denier, about 125 denier to about 175 denier, or about 150 denier to 160 denier, and the coating has a nominal average outer diameter of about 0.10 millimeters to about 0.50 millimeters, or of about 0.10 millimeters to about 0.25 millimeters, or of about 0.10 millimeters to about 0.20 millimeters. In one aspect, the core yarn is polyethylene terephthalate having a thickness of about 100 denier to about 200 denier, about 125 denier to about 175 denier, or about 150 denier to about 160 denier, and the coating has a nominal average outer diameter of about 0.10 millimeters to about 0.50 millimeters, or of about 0.10 millimeters to about 0.25 millimeters, or of about 0.10 millimeters to about 0.20 millimeters.

In a further aspect, the coated yarn has a net total diameter of from about 0.2 to about 0.6 millimeters, or about 0.3 to about 0.5 millimeters, or about 0.4 to about 0.6 millimeters In some aspects, a lubricating oil including, but not limited to, mineral oil or silicone oil can be present on the yarn at from about 0.5 percent to about 2 percent by weight, or from about 0.5 percent to about 1.5 percent by weight, or from about 0.5 percent to about 1 percent by weight. In some aspects, lubricating compositions can be applied to the surface of the coated yarn before or during the process of forming the textile. In some aspects, the thermoplastic composition and the lubricating composition are miscible when the thermoplastic composition is reflowed and resolidified in the presence of the lubricating composition. Following reflowing and resolidification, the reflowed and resolidified composition can comprise the lubricating composition.

In one aspect, the core yarn has a percent elongation of about 8 percent to about 30 percent, about 10 percent to about 30 percent, about 15 percent to about 30 percent, about 20 percent to about 30 percent, about 10 percent to about 25 percent, or about 10 percent to about 20 percent. In one aspect, the core yarn has a tenacity of about 1 gram per denier to about 10 grams per denier, about 2 grams per denier to about 8 grams per denier, about 4 grams per denier to about 8 grams per denier, or about 2 grams per denier to about 6 grams per denier.

In another aspect, the yarn can be used as an inlaid that is incorporated into a textile (e.g., knit, woven etc.). In one aspect, the core yarn has a thickness of about 200 denier to about 300 denier, about 225 denier to about 275 denier, or about 250 denier to 260 denier. In one aspect, the core yarn is polyethylene terephthalate having a thickness of about 200 denier to about 300 denier, about 225 denier to about 275 denier, or about 250 denier to 260 denier. In one aspect, the coating has a nominal average outer diameter of up to about 3.0 millimeters, of up to about 2.5 millimeters, of up to about 2 millimeters, of up to about 1.5 millimeters, of up to about 1.0 millimeter, or of up to about 0.5 millimeters. In one aspect, the core yarn has a thickness of about 200 denier to about 300 denier, about 225 denier to about 275 denier, or about 250 denier to about 260 denier, and the coating has a nominal average outer diameter of about 0.5 millimeters to about 3.0 millimeters, or of about 1.0 millimeter to about 2.5 millimeters, or of about 1.5 millimeters to about 2.0 millimeters. In one aspect, the core yarn is polyethylene terephthalate having a thickness of about 200 denier to about 300 denier, about 225 denier to about 275 denier, or about 250 denier to about 260 denier, and the coating has a nominal average outer diameter of about 0.5 millimeters to about 3.0 millimeters, or of about 1.0 millimeter to about 2.5 millimeters, or of about 1.5 millimeters to about 2.0 millimeters.

The films, fibers, filaments, and yarns described herein have several unique properties that make them suitable for the production of articles such as textiles and the like. In one aspect, the films, fibers, filaments, and yards have improved resistance to abrasion. In other aspects, textiles and articles produced from or incorporating the films, fibers, filaments, and yarns described herein have improved resistance to abrasion. For example, when the films, fibers, filaments, and yarns are used to produce the outer sole of an article of footwear, the outer sole will have improved durability as the outer sole is less likely to lose mass over time.

In one aspect, when thermoformed, the first polymeric composition of the film, fibers, filaments, yarn, and textile has an Akron abrasion of less than 0.50 cubic centimeters, optionally less than 0.40 cubic centimeters, less than 0.30 cubic centimeters, less than 0.20 cubic centimeters, or less than 0.10 cubic centimeters as determined using the Akron Abrasion Test. In another aspect, when thermoformed, the first polymeric composition of the film, fibers, filaments, yarn, and textile has an Akron abrasion of about 0.05 cubic centimeters to about 0.5 cubic centimeters, about 0.10 cubic centimeters to about 0.45 cubic centimeters, or about 0.05 to about 0.20 cubic centimeters as determined using the Akron Abrasion Test.

In one aspect, when thermoformed, the first polymeric composition of the film, fibers, filaments, yarn, and textile has an Akron abrasion of less than 500 milligrams, optionally less than 400 milligrams, less than 300 milligrams, less than 200 milligrams, or less than 100 milligrams as determined using the Akron Abrasion Test. In another aspect, when thermoformed, the first polymeric composition of the film, fibers, filaments, yarn, and textile has an Akron abrasion of about 50 milligrams to about 500 milligrams, about 100 milligrams to about 400 milligrams, or about 100 milligrams to about 150 milligrams as determined using the Akron Abrasion Test.

In one aspect, when thermoformed, the first polymeric composition of the film, fibers, filaments, yarn, and textile has a DIN abrasion of less than 0.30 cubic centimeters, optionally less than 0.20 cubic centimeters, less than 0.10 cubic centimeters, less than 0.05 cubic centimeters, or less than 0.07 cubic centimeters as determined using the DIN Abrasion Test. In another aspect, when thermoformed, the first polymeric composition of the film, fibers, filaments, yarn, and textile has a DIN abrasion of about 0.01 cubic centimeters to about 0.30 cubic centimeters, about 0.05 cubic centimeters to about 0.20 cubic centimeters, or about 0.05 cubic centimeters to about 0.10 cubic centimeters as determined using the DIN Abrasion Test.

In one aspect, when thermoformed, the first polymeric composition of the film, fibers, filaments, and yarn has a DIN abrasion of less than 300 milligrams, optionally less than 200 milligrams, less than 100 milligrams, less than 50 milligrams, or less than 30 milligrams as determined using the DIN Abrasion Test. In another aspect, when thermoformed, the first polymeric composition of the film, fibers, filaments, yarn, and textile has a DIN abrasion of about 10 milligrams to about 300 milligrams, about 50 milligrams to about 250 milligrams, or about 50 milligrams to about 100 milligrams as determined using the DIN Abrasion Test.

In certain aspects, the films, fibers, and yarns described herein when incorporated into a textile or article the product has improved traction properties. In one aspect, the coefficient of friction of the films, fibers or yarns can be used to measure traction properties on various surfaces.

In one aspect, when thermoformed, the first polymeric composition of the film, fibers, filaments, yarn, and textile has a dry dynamic coefficient of friction (COF) on a dry surface (e.g., a smooth, flat, or textured surface such as, for example, wooden parquet court, concrete, asphalt, laminate, brick, or ceramic tile) of greater than 0.6, optionally of greater than 0.7, greater than 0.8, greater than 0.9, greater than 1.0, as determined using the Coefficient of Friction Test. In another aspect, when thermoformed, the first polymeric composition of the film, fibers, filaments, yarn, and textile has a dry dynamic COF of greater than 0.15, optionally of greater than 0.2, greater than 0.25, or greater than 0.3, using the Coefficient of Friction Test.

In one aspect, when thermoformed, the first polymeric composition of the film, fibers, filaments, yarn, and polymeric has a wet dynamic COF of greater than 0.25, optionally of greater than 0.30, greater than 0.35, greater than 0.40, or greater than 0.50, as determined using the Coefficient of Friction Test. In another aspect, when thermoformed, the first polymeric composition of the film, fibers, filaments, yarn, and textile has a wet dynamic COF of greater than 0.15, optionally of greater than 0.2, greater than 0.25, or greater than 0.3, using the Coefficient of Friction Test.

In certain aspect, it is desirable for the dynamic coefficient of friction for the same dry and wet surface (e.g., smooth concrete or court) to be as close as possible. In one aspect, the difference between the dynamic coefficient of friction of the dry surface and the wet surface is less than 15 percent. In another aspect, the difference between the dynamic coefficient of friction of the dry surface and the wet surface is from about 0 percent to about 15 percent, about 1 percent to about 10 percent, about 1 percent to about 5 percent, or about 2 percent to about 5 percent.

In one aspect, when thermoformed, the first polymeric composition of the film, fibers, filaments, yarn, and textile has a melting temperature from about 100 degrees Celsius to about 210 degrees Celsius, optionally from about 110 degrees Celsius to about 195 degrees Celsius, from about 120 degrees Celsius to about 180 degrees Celsius, or from about 120 degrees Celsius to about 170 degrees Celsius. I another aspect, the first polymeric composition has a melting temperature greater than about 120 degrees Celsius and less than about 170 degrees Celsius, and optionally greater than about 130 degrees Celsius, and less than about 160 degrees Celsius.

In a further aspect, when the melting temperature is greater than 100 degrees Celsius, the integrity of articles formed from or incorporating the first polymeric composition is preserved if the articles briefly encounter similar temperatures, for example, during shipping or storage. In another aspect, when the melting temperature is greater than 100 degrees Celsius, or greater than 120 degrees Celsius, articles formed from or incorporating the first polymeric composition can be steamed without melting or uncontrollably fusing any polyester components incorporated in the articles for purposes such as fill, zonal surface, or comfort features, as well as stretch yarn used for snugness and fit features.

In one aspect, when the melting temperature is greater than 120 degrees Celsius, materials incorporating the first or second polymeric composition disclosed herein are unlikely to soften and/or become tacky during use on a hot paved surface, a court surface, an artificial or natural soccer pitch, or a similar playing surface, track, or field. In one aspect, the higher the melting temperature of the first or second polymeric composition and the greater its enthalpy of melting, the greater the ability of an article of footwear or athletic equipment incorporating or constructed from the first or second polymeric composition to withstand contact heating excursions, frictional surface heating events, or environmental heating excursions. In one aspect, such heat excursions may arise when the articles contact hot ground, court, or turf surfaces, or from frictional heating that comes from rubbing or abrasion when the articles contact another surface such as the ground, another shoe, a ball, or the like.

In another aspect, when the melting temperature is less than about 210 degrees Celsius, or less than about 200 degrees Celsius, or less than about 190 degrees Celsius, or less than about 180 degrees Celsius, or less than about 175 degrees Celsius, but greater than about 120 degrees Celsius, or greater than about 110 degrees Celsius, or greater than about 103 degrees Celsius, polymer coated yarns can be melted for the purposes of molding and/or thermoforming a given region of textiles knitted therefrom in order to impart desirable design and aesthetic features in a short period of time.

In one aspect, a melting temperature lower than 140 degrees Celsius can prevent or mitigate the risk dye migration from polyester yarns incorporated in the footwear or other articles. In a further aspect, dye migration from package-dyed polyester yarns or filaments is a diffusion-limited process and short periods of exposure to temperatures greater than 140 degrees Celsius, such as during thermoforming, do not extensively damage, discolor, or otherwise render the appearance of the footwear or other articles unacceptable. However, in another aspect, if the melting temperature of the polymer coating is greater than about 210 degrees Celsius, thermal damage and dye migration may occur.

In one aspect, a high melting enthalpy indicates a longer heating time is required to ensure a polymer is fully melted and will flow well. In another aspect, a low melting enthalpy requires less heating time to ensure full melting and good flow.

In a further aspect, high cooling exotherms indicate rapid transitions from molten to solid. In another aspect, higher recrystallization temperatures indicate polymers are capable of solidifying at higher temperatures. In one aspect, high-temperature solidification can be beneficial for thermoforming. In one aspect, recrystallization above 95 degrees Celsius can promote rapid setting after thermoforming, reduce cycle time, reduce cooling demands, and improve stability of shoe components during assembly and use.

In one aspect, viscosity of the coating compositions disclosed herein can affect the properties and processing of the coating compositions. In a further aspect, high viscosities at low shear rates (e.g., less than 1 reciprocal second) indicate resistance to flow, displacement, and more solid-like behavior. In another aspect, low viscosities at higher shear rates (e.g., greater than 10 reciprocal seconds) lend themselves to high-speed extrusion. In one aspect, as viscosity increases, the ability to flow and deform adequately to coat core yarn substrate becomes challenging. In another aspect, materials that exhibit high shear thinning indices (e.g., where viscosity at 10 or 100 reciprocal seconds is lower than at 1 reciprocal second) can be challenging to extrude and may melt fracture if coated or extruded at a velocity that is too high.

In one aspect, the first polymeric composition of the film, fibers, filaments, yarn, and textile has a melt flow index of at least 0.2 grams per 10 minutes, optionally at least 2, at least 5, at least 10, at least 15, at least 20, at least 25, at least 30, at least 40, or at least 50 grams per 10 minutes, as determined using the Method to Determine the Melt Flow Index (ASTM D1238-13) at 160 degrees Celsius using a weight of 2.16 kg. In another aspect, when thermoformed, the first polymeric composition of the film, fibers, filaments, and yarn has a melt flow index of at least 0.2 grams per 10 minutes, optionally at least 5 grams per 10 minutes, at least 10 grams per 10 minutes, at least 15 grams per 10 minutes, at least 20 grams per 10 minutes, at least 25 grams per 10 minutes, at least 30 grams per 10 minutes, at least 40 grams per 10 minutes, or at least 50 grams per 10 minutes, as determined using the Method to Determine the Melt Flow Index (ASTM D1238-13) at 200 degrees Celsius using a weight of 10 kg. In one aspect, having a suitable melt flow rate or melt flow index allows the first polymeric composition to re-flow adequately around and between the knitted or woven textile fibers as disclosed herein. In another aspect, having a suitable melt flow rate allows a skin-like structure to form when the knitted or woven textile is thermoformed.

In one aspect, the first polymeric composition of the film, fibers, filaments, yarn, and textile has a durometer Shore A hardness of about 50 to about 90 Shore A, optionally from about 55 to about 85 Shore A, from about 60 to about 80 Shore A, from about 60 to about 70 Shore A, or from about 67 to about 77 shore A.

In one aspect, the first polymeric composition of the film, fibers, filaments, yarn, or textile has a specific gravity from about 0.8 to about 1.5, optionally from about 0.8 to about 1.30, or from about 0.88 to about 1.20. In another aspect, the first polymeric composition of the film, fibers, filaments, yarn, or textile has a specific gravity of from about 0.80 grams per cubic centimeter to about 1.30 grams per cubic centimeter, or from about 1.0 grams per cubic centimeter to about 1.2 grams per cubic centimeter as determined by the Method to Determine Specific Gravity (ASTM D792).

In one aspect, the first polymeric composition of the film, fibers, filaments, yarn, or textile have two or more of the first properties, or optionally three or more, four or more, five or more, six or more, seven or more, or all ten first properties provided above.

In one or more aspects, the textile described herein can exhibit a modulus of from about 1 megapascal to about 500 megapascals. In certain aspects, the coated yarns can exhibit a modulus of from about 5 megapascals to about 150 megapascals, or of from about 20 megapascals to about 130 megapascals, or of from about 30 megapascals to about 120 megapascals, or of from about 40 megapascals to about 110 megapascals. The term "modulus" as used herein refers to a respective testing method described below in the Property Analysis And Characterization Procedures section. In one aspect, a material having a high modulus is relatively stiffer than a material having a low modulus, which is more flexible. In another aspect, when the first polymeric compositions are used as coatings for yarns and incorporated into textiles and articles as described herein, textiles and articles comprising thermoplastic polymeric compositions having a lower modulus will be more flexible than articles comprising thermoplastic polymeric compositions having a high modulus.

In addition to the first properties, when thermoformed, the first polymeric composition of the film, fibers, filaments, yarn, or textile has one or more second properties. In one aspect, when thermoformed, the first polymeric composition of the film, fibers, filaments, yarn, or textile has a glass transition temperature less than 50 degrees Celsius, optionally less than 30 degrees Celsius, less than 0 degrees Celsius, less than −10 degrees Celsius, less than −20 degrees Celsius, or less than −30 degrees Celsius. In one aspect, when thermoformed, the first polymeric composition of the film, fibers, filaments, and yarn has a stress at break greater than 7 megapascals, optionally greater than 8 megapascals, as determined using Method to Determine the Modulus, Tenacity, and Elongation (yarn) at 25 degrees Celsius. In one aspect, when thermoformed, the first polymeric composition of the film, fibers, filaments, and yarn has a tensile stress at 300 percent modulus greater than 2 megapascals, optionally greater than 2.5 megapascals, or greater than 3 megapascals as determined using Method to Determine the Modulus, Tenacity, and Elongation (yarn) at 25 degrees Celsius. In one aspect, when thermoformed, the first polymeric composition of the film, fibers, filaments, and yarn has an elongation at break greater than 400 percent, optionally greater than 450 percent, optionally greater than 500 percent, or greater than 550 percent as determined using Method to Determine the Modulus, Tenacity, and Elongation (yarn) at 25 degrees Celsius. In another aspect, when thermoformed, the first polymeric composition of the film, fibers, filaments, and yarn has two or more of the second properties, or optionally three or more, or all four second properties.

In one aspect, the textiles described herein or articles comprising the textiles described herein can be subjected to Akron Abrasion testing as described in the Property Analysis and Characterization Procedures. In one aspect, after 300 cycles of Akron Abrasion testing, the textiles or articles have a mass loss of from 0 to 0.05 weight percent, optionally from 0 to 0.04 weight percent, or from 0 to 0.03 weight percent, or from 0 to 0.02 weight percent after 300 cycles. In another aspect, after 3000 cycles of Akron Abrasion testing, the textiles or articles have a mass loss of from 0 to 0.2 weight percent, or of from 0 to 0.15 weight percent, or of from 0 to 0.1 weight percent, or of from 0 to 0.05 weight percent. In still another aspect, the textiles described herein or articles comprising the textiles described herein can be subjected to Stoll Abrasion testing as described in the Property Analysis and Characterization Procedures. In one aspect, the articles or textiles do not show significant Stoll Abrasion loss or degradation after at least 1600 cycles, or after at least 2000 cycles, or after at least 2500 cycles.

In one aspect, the textiles disclosed herein can be subjected to Bally Flex testing as described in the Property Analysis and Characterization Procedures. In one aspect, the textiles to not exhibit cracking after at least 100 cycles in a dry Bally flex test. In another aspect, the textiles do not exhibit cracking after at least 15,000 cycles in a wet Bally flex test.

In another aspect, when the textiles disclosed herein are included as components of an upper for an article of footwear, a textile-ball impact test or a boot-ball impact test can be performed as described in the Property Analysis and Characterization Procedures. In one aspect, the textile or an upper comprising the textile produces a ball spin rate of from about 220 revolutions per minute to about 240 revolutions per minute, or of about 220 revolutions per minute to about 230 revolutions per minute. In a further aspect, the revolutions per minute can be right-handed (positive, or clockwise) or left-handed (negative, or counterclockwise). In one aspect, a higher number of revolutions per minute is desirable for generating a ball path with suitable curvature for avoiding opposing players on, for example, a soccer (football) field.

In one aspect, following thermoforming, the first polymeric composition has one or more first properties selected from:
a) an Akron abrasion of from 0.00 to 0.50 cubic centimeters, optionally 0.00 to 0.40 cubic centimeters, 0.00 to 0.30 cubic centimeters, 0.00 to 0.20 cubic centimeters, or 0.00 to 0.10 cubic centimeters as determined using the Akron Abrasion Test;
b) a DIN abrasion of from 0.00 to 0.30 cubic centimeters, from 0.00 to 0.20 cubic centimeters, 0.00 to 0.10 cubic centimeters, or 0.00 to 0.05 cubic centimeters, as determined using the DIN Abrasion Test;
c) a dry dynamic coefficient of friction (COF) of from 0.5 to 1.0, optionally of 0.7 to 1.0, 0.8 to 1.0, 0.9 to 1.0, or greater than 1.0, as determined using the Coefficient of Friction Test;

d) a wet dynamic COF of from 0.25 to 0.50, optionally of 0.30 to 0.50, of 0.35 to 0.50, 0.40 to 0.50, or greater than 0.50, as determined using the Coefficient of Friction Test;
e) a dry dynamic COF of 0.15 to 0.3, optionally of 0.2 to 0.3, 0.25 to 0.3, or greater than 0.3, using the Coefficient of Friction Test;
f) a wet dynamic COF of 0.15 to 0.3, optionally of 0.2 to 0.3, 0.25 to 0.3, or greater than 0.3, using the Coefficient of Friction Test;
g) a melting temperature from about 100 degrees C. to about 210 degrees C., optionally from about 110 degrees C. to about 195 degrees C., from about 120 degrees C. to about 180 degrees C., or from about 120 degrees C. to about 170 degrees C.;
h) a melt flow rate of at least 0.2 grams to at least 50 grams per 10 minutes, optionally at least 2 to at least 50, at least 5 to at least 50, at least 10 to at least 50, at least 15 to at least 50, at least 20 to at least 50 to at least 50, at least 25 to at least 50, at least 30 to at least 50, at least 40 to at least 50, or at least 50 grams per 10 minutes, as determined using ASTM D1238-13 at 160 degrees C. using a weight of 2.16 kg;
i) a melt flow rate of at least 0.2 grams to at least 50 grams per 10 minutes, optionally at least 2 to at least 50, at least 5 to at least 50, at least 10 to at least 50, at least 15 to at least 50, at least 20 to at least 50 to at least 50, at least 25 to at least 50, at least 30 to at least 50, at least 40 to at least 50, or at least 50 grams per 10 minutes, as determined using ASTM D1238-13 at 200 degrees C. using a weight of 10 kg;
j) a durometer from about 50 to about 90 Shore A, optionally from about 55 to about 85 Shore A, from about 60 to about 80 Shore A, or from about 60 to about 70 Shore A;
k) a glass transition temperature of from −10 degrees Celsius to 50 degrees Celsius, optionally from −10 degrees Celsius to 30 degrees Celsius, or from −10 degrees Celsius to 20 degrees Celsius, or from −10 degrees Celsius to 10 degrees Celsius;
l) a specific gravity from about 0.8 to about 1.5, optionally from about 0.85 to about 1.30, or from about 0.88 to about 1.20;
m) a mass loss of less than 0.05 weight percent after 300 cycles, optionally from about 0.01 weight percent to about 0.05 weight percent after 300 cycles;
n) a mass loss of less than 0.20 weight percent after 3,000 cycles, optionally from about 0.01 weight percent to about 0.20 weight percent, about 0.1 weight percent to about 0.20 weight percent, or about 0.5 weight percent to about 0.20 weight percent after 3,000 cycles;
o) a Stoll abrasion resistance of at least 1,600 cycles, or about 1,600 cycle to about 2,500 cycles;
p) a Bally Flex of at least 100 cycles, or from about 100 cycles to about 1,000 cycles; and
q) a wet Bally Flex of at least 5,000 cycles, or from about 5,000 cycles to about 20,000 cycles.

In one aspect, following thermoforming, knitted or woven textiles comprising the first polymer composition possesses desirable performance properties. In a further aspect, the disclosed thermoformed knitted or woven textiles outperform traditional materials included in uppers for articles of footwear such as Kangaroo leather and Duragon skin (a trade name referring to a preformed, polyurethane laminated skin on a polyester textile). For example, the thermoformed knit textiles showed similar dry and wet coefficients of friction (e.g., boot-to-ball interaction) as the laminated Duragon skin; however, the knitted textile as described herein can be produced in a streamlined, more integrated, lower waste manner of construction. In other aspects, the thermoformed textiles and/or footwear uppers containing the coated yarns disclosed herein exhibit higher wet and dry COF values overall, and a lower degree of difference between dry COF and wet COF than DURAGON skin. In other aspects, following thermoforming, the first polymeric composition has one or more properties selected from:
a) a stress at break of at least 7 megapascals to 8 megapascals, optionally greater than 8 megapascals, as determined using Method to Determine the Modulus (plaque) at 25 degrees Celsius;
b) a tensile stress at 300 percent modulus of at least 2 megapascals to 3 megapascals, optionally 2.5 megapascals to 3 megapascals, or greater than 3 megapascals as determined using Method to Determine the Modulus (plaque) at 25 degrees Celsius;
c) an elongation at break of at least 450 percent to 550 percent, optionally from 500 percent to 550 percent, or greater than 550 percent as determined using Method to Determine the Modulus (plaque) at 25 degrees C.;
d) a difference between the dry dynamic coefficient of friction and the dry static coefficient of friction of from 0 to 20 percent as determined by the Method for Determining Coefficient of Friction described in the Property Analysis and Characterization Procedures;
e) a difference between the wet dynamic coefficient of friction and the wet static coefficient of friction of from 0 to 20 percent as determined by the Method for Determining Coefficient of Friction described in the Property Analysis and Characterization Procedures; and
f) a difference between the wet static coefficient of friction and the dry static coefficient of friction of from 0 to 20 percent as determined by the Method for Determining Coefficient of Friction described in the Property Analysis and Characterization Procedures.

In certain aspects, the films, fibers, and yarns described herein can exhibit a tenacity greater than 1 gram/denier. In one aspect, the films, fibers, and yarns described herein can exhibit a tenacity of from about 1 gram/denier to about 5 grams/denier. In one or more aspects, the films, fibers, and yarns described herein can exhibit a tenacity of from about 1.5 grams/denier to about 4.5 grams/denier. In one aspect, the films, fibers, and yarns described herein can exhibit a tenacity of from about 2 grams/denier to about 4.5 grams/denier. "Tenacity" as used herein refers to a property of a fiber or yarn, and is determined using the respective testing method and sampling procedure described below in the Property Analysis and Characterization Procedures section.

In certain aspects, it can be desired to utilize a yarn that is suitable for use on commercial knitting equipment. A free-standing shrinkage of a yarn at 50 degrees Celsius is one property that can be predictive of a suitable yarn for use on a commercial knitting machine. In certain aspects, a films, fibers, filaments, and yarns described herein can exhibit a free-standing shrinkage when heated from 20 degrees Celsius to 70 degrees Celsius of less than 15 percent. In various aspects, the films, fibers, and yarns described herein can exhibit free-standing shrinkage when heated from 20 degrees Celsius to 70 degrees Celsius of about 0 percent to about 60 percent, about 0 percent to about 30 percent, or about 0 percent to about 15 percent. The term "free-standing shrinkage" as used herein refers to a property of a yarn and a respective testing method described below in the Property Analysis and Characterization Procedures section.

In one or more aspects, the free-standing shrinkage of a yarn at 70 degrees Celsius can be a useful indicator of the ability of a yarn to be exposed to certain environmental conditions without any substantial changes to the physical structure of the yarn. In certain aspects, a yarn comprising the low processing temperature polymeric composition can exhibit a free-standing shrinkage when heated from 20 degrees Celsius to 70 degrees Celsius of from about 0% to about 60%. In one or more aspects, a yarn comprising the low processing temperature polymeric composition can exhibit a free-standing shrinkage when heated from 20 degrees Celsius to 70 degrees Celsius of from about 0% to about 30%. In one aspect, a yarn comprising the low processing temperature polymeric composition can exhibit a free-standing shrinkage when heated from 20 degrees Celsius to 70 degrees Celsius of from about 0% to about 20%.

As discussed above, in certain aspects, the first polymeric composition as described herein and the second polymeric composition have differing properties. In various aspects, these differing properties allow for the coated fibers as described herein, during a thermoforming process, to melt and flow, and subsequently cool and solidify into a different structure than that prior to the thermoforming process (e.g., thermoform from a yarn to a melted yarn component), while the an uncoated fiber cannot deform or melt during such a process and can maintain its structure (e.g., as a yarn), when the thermoforming process is conducted at a temperature below the melting temperature of the uncoated fibers. In such aspects, the melted yarn component formed from the coated fibers as described herein during the thermoforming process can be integrally connected to the non-altered structure (e.g., a yarn or fiber), which can provide three-dimensional structure and/or other properties targeted to specific spots on an article of wear.

Exemplary Thermoplastic Elastomers

In various aspects, the polymeric compositions described herein comprise one or more thermoplastic elastomers. In an aspect, an "elastomer" can be defined as a material having an elongation at break greater than 400 percent as determined using ASTM D-412-98 at 25 degrees Celsius. In another aspect, the elastomer can be formed into a plaque, wherein the plaque has a break strength of from 10 to 35 kilogram-force (kgf), or of from about 10 to about 25 kilogram-force, or of from about 10 to about 20 kilogram-force, or of from about 15 to about 35 kilogram-force, or of from about 20 to about 30 kilogram-force. In another aspect, tensile breaking strength or ultimate strength, if adjusted for cross-sectional area, can be greater than 70 kilogramforce per square centimeter, or greater than 80 kilogramforce per square centimeter. In another aspect, the elastomer plaque can have a strain to break of from 450 percent to 800 percent, or from 500 to 800 percent, or from 500 to 750 percent, or from 600 to 750 percent, or from 450 to 700 percent. In still another aspect, the elastomer plaque can have a load at 100 percent strain of from 3 to 8 kilogramforce per millimeter, or of about 3 to about 7 kilogram-force per millimeter, about 3.5 to about 6.5 kilogram-force per millimeter, or about 4 to about 5 kilogram-force per millimeter. In one aspect, the elastomer plaque can have a toughness of from 850 kilogrammillimeters to 2200 kilogrammillimeters, or of from about 850 kilogrammillimeters to about 2000 kilogrammillimeters, or of from about 900 kilogrammillimeters to about 1750 kilogrammillimeters, or of from about 1000 kilogrammillimeters to about 1500 kilogrammillimeters, or of from about 1500 kilogrammillimeters to about 2000 kilogrammillimeters. In an aspect, the elastomer plaque can have a stiffness of from about 35 to about 155, or of from about 50 to about 150, or of from about 50 to about 100, or of from about 50 to about 75, or of from about 60 to about 155, or of from about 80 to about 150. In still another aspect, the elastomer plaque can have a tear strength of from about 35 to about 80, or of from about 35 to about 75, or of from about 40 to about 60, or of from about 45 to about 50.

In aspects, exemplary thermoplastic elastomers include homo-polymers and co-polymers. The term "polymer" refers to a polymerized molecule having one or more monomer species, and includes homopolymers and copolymers. The term "copolymer" refers to a polymer having two or more monomer species, and includes terpolymers (i.e., copolymers having three monomer species). In certain aspects, the thermoplastic elastomer can be a random co-polymer. In one aspect, the thermoplastic elastomer can be a block co-polymer. For example, the thermoplastic elastomer can be a block co-polymer having repeating blocks of polymeric units of the same chemical structure (segments) which are relatively harder (hard segments), and repeating blocks of polymeric segments which are relatively softer (soft segments). In various aspects, in block co-polymers, including block co-polymers having repeating hard segments and soft segments, physical crosslinks can be present within the blocks or between the blocks or both within and between the blocks. Particular examples of hard segments include isocyanate segments and polyamide segments. Particular examples of soft segments include polyether segments and polyester segments. As used herein, the polymeric segment can be referred to as being a particular type of polymeric segment such as, for example, an isocyanate segment, a polyamide segment, a polyether segment, a polyester segment, and the like. It is understood that the chemical structure of the segment is derived from the described chemical structure. For example, an isocyanate segment is a polymerized unit including an isocyanate functional group. When referring to a block of polymeric segments of a particular chemical structure, the block can contain up to 10 mol percent of segments of other chemical structures. For example, as used herein, a polyether segment is understood to include up to 10 mol percent of non-polyether segments.

In one aspect, the first polymeric composition comprises a polymeric component consisting of all the polymers present in the polymeric composition; optionally wherein and the polymeric component comprises two or more polymers, wherein the two or more polymers differ from each other in chemical structure of individual segments of each of the two or more polymers, or in molecular weight of each of the two or more polymers, or in both.

In various aspects, the thermoplastic elastomer can include one or more of a thermoplastic copolyester elastomer, a thermoplastic polyether block amide elastomer, a thermoplastic polyurethane elastomer, a polyolefin based-copolymer elastomer, a thermoplastic styrenic copolymer elastomer, a thermoplastic ionomer elastomer, or any combination thereof. In one aspect, the first polymeric composition comprises a thermoplastic elastomeric styrenic copolymer. In a further aspect, the thermoplastic elastomeric styrenic copolymer can be a styrene butadiene styrene (SBS) block copolymer, a styrene ethylene/butylene styrene (SEBS) resin, a styrene acrylonitrile (SAN) resin, or any combination thereof. In one aspect, the first polymeric composition comprises a thermoplastic elastomeric polyester polyurethane, a thermoplastic polyether polyurethane, or any combination thereof. In some aspects, the thermoplastic elastomeric polyester polyurethane can be an aromatic polyester, an aliphatic composition, or a combination thereof. It should be understood that other thermoplastic polymeric materials not specifically described below are also contemplated for use in the coated fiber as described herein and/or the an uncoated fiber. In one aspect, the first polymeric composition comprising the thermoplastic elastomer has a melting temperature greater than about 110 degrees Celsius and less than about 170 degrees Celsius. In another aspect, the first polymeric composition comprising the thermoplastic elastomer has a melting temperature of about 110 degrees Celsius to about 170 degrees Celsius, about 115 degrees Celsius to about 160 degrees Celsius, about 120 degrees Celsius to about 150 degrees Celsius, about 125 degrees Celsius to about 140 degrees Celsius, about 110 degrees Celsius to about 150 degrees Celsius, or about 110 degrees Celsius to about 125 degrees Celsius.

In various aspects, the thermoplastic elastomer has a glass transition temperature (TO less than 50 degrees Celsius when determined in accordance with ASTM D3418-97 as described herein below. In some aspects, the thermoplastic elastomer has a glass transition temperature ($T_g$) of about −60 degrees Celsius to about 50 degrees Celsius, about −25 degrees Celsius to about 40 degrees Celsius, about −20 degrees Celsius to about 30 degrees Celsius, about −20 degrees Celsius to about 20 degrees Celsius, or of about −10 degrees Celsius to about 10 degrees Celsius, when determined in accordance with ASTM D3418-97 as described herein below. In one aspect, the glass transition temperature of the thermoplastic elastomer is selected such that articles incorporating the coated yarns disclosed herein, wherein the coated yarns comprise a coating material comprising the thermoplastic elastomer, the thermoplastic material is above its glass transition temperature during normal wear when incorporated into an article of footwear (i.e., is more rubbery and less brittle).

In one aspect, the thermoplastic elastomer comprises: (a) a plurality of first segments; (b) a plurality of second segments; and, optionally, (c) a plurality of third segments. In various aspects, the thermoplastic elastomer is a block copolymer. In some aspects, the thermoplastic elastomer is a segmented copolymer. In further aspects, the thermoplastic elastomer is a random copolymer. In still further aspects, the thermoplastic elastomer is a condensation copolymer.

In a further aspect, the thermoplastic elastomer can have a weight average molecular weight of about 50,000 Daltons to about 1,000,000 Daltons; about 50,000 Daltons to about 500,000 Daltons; about 75,000 Daltons to about 300,000 Daltons; about 100,000 Daltons to about 200,000 Daltons.

In a further aspect, the thermoplastic elastomer can have a ratio of first segments to second segments from about 1:1 to about 1:2 based on the weight of each of the first segments and the second segments; or of about 1:1 to about 1:1.5 based on the weight of each of the first segments and the second segments.

In a further aspect, the thermoplastic elastomer can have a ratio of first segments to third segments from about 1:1 to about 1:5 based on the weight of each of the first segments and the third segments; about 1:1 to about 1:3 based on the weight of each of the first segments and the third segments; about 1:1 to about 1:2 based on the weight of each of the first segments and the third segments; about 1:1 to about 1:3 based on the weight of each of the first segments and the third segments.

In a further aspect, the thermoplastic elastomer can have first segments derived from a first component having a number-average molecular weight of about 250 Daltons to about 6000 Daltons; about 400 Daltons to about 6,000 Daltons; about 350 Daltons to about 5,000 Daltons; or about 500 Daltons to about 3,000 Daltons.

In some aspects, the thermoplastic elastomer can comprise phase separated domains. For example, a plurality of first segments can phase-separate into domains comprising primarily the first segments. Moreover, a plurality of second segments derived from segments having a different chemical structure can phase-separate into domains comprising primarily the second segments. In some aspects, the first segments can comprise hard segments, and the second segments can comprise soft segments. In other aspects, the thermoplastic elastomer can comprise phase-separated domains comprising a plurality of first copolyester units.

In one aspect, prior to thermoforming, the first polymeric composition has a glass transition temperature glass transition temperature of from about 20 degrees Celsius to about −60 degrees Celsius. In one aspect, prior to thermoforming, the first polymeric composition has a Taber Abrasion Resistance of from about 10 milligrams to about 40 milligrams as determined by ASTM D3389. In one aspect, prior to thermoforming, the first polymeric composition has a Durometer Hardness (Shore A) of from about 60 to about 90 as determined by ASTM D2240. In one aspect, prior to thermoforming, the first polymeric composition has a specific gravity of from about 0.80 g/cm3 to about 1.30 g/cm$^3$ as determined by ASTM D792. In one aspect, prior to thermoforming, the first polymeric composition has a melt flow index of about 2 grams/10 minutes to about 50 grams/10 minutes at 160 degrees Celsius using a test weight of 2.16 kilograms. In one aspect, prior to thermoforming, the first polymeric composition has a melt flow rate greater than about 2 grams/10 minutes at 190 degrees Celsius or 200 degrees Celsius when using a test weight of 10 kilograms. In one aspect, prior to thermoforming, the first polymeric composition has a modulus of about 1 megapascal to about 500 megapascals.

Thermoplastic Polyurethane Elastomers

In certain aspects, the thermoplastic elastomer is a thermoplastic polyurethane elastomer. The thermoplastic polyurethane elastomer can be a thermoplastic block polyurethane co-polymer. The thermoplastic polyurethane co-polymer can be a copolymer comprising hard segments and soft segments, including blocks of hard segments and blocks of soft segments. The hard segments can comprise or consist of isocyanate segments. In the same or alternative aspects, the soft segments can comprise or consist of polyether segments, or polyester segments, or a combination of polyether segments and polyester segments. In one aspect, the thermoplastic material, or the polymeric component of the thermoplastic material, can comprise or consist essentially of an elastomeric thermoplastic polyurethane hard segments and soft segments, such as an elastomeric thermoplastic polyurethane having repeating blocks of hard segments and repeating blocks of soft segments.

In aspects, one or more of the thermoplastic polyurethane elastomer can be produced by polymerizing one or more isocyanates with one or more polyols to produce copolymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units).

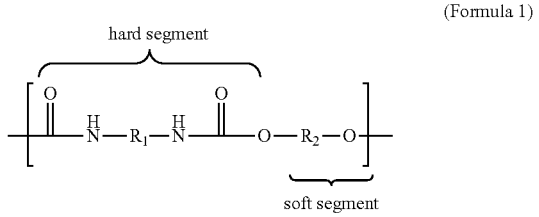

(Formula 1)

In these embodiments, each $R_1$ and $R_2$ independently is an aliphatic or aromatic segment. Optionally, each $R_2$ can be a hydrophilic segment.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent). Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

Additionally, the isocyanates can also be chain extended with one or more chain extenders to bridge two or more isocyanates. This can produce polyurethane copolymer chains as illustrated below in Formula 2, wherein $R_3$ includes the chain extender. As with each $R_1$ and $R_3$, each $R_3$ independently is an aliphatic or aromatic segment.

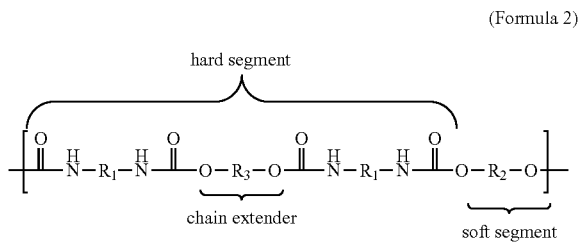

(Formula 2)

Each segment $R_1$, or the first segment, in Formulas 1 and 2 can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

Each segment $R_1$ can be present in an amount of 5 percent to 85 percent by weight, from 5 percent to 70 percent by weight, or from 10 percent to 50 percent by weight, based on the total weight of the reactant monomers.

In aliphatic embodiments (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkylene segment (e.g., C4-15 alkylene or C6-10 alkylene), one or more $C_{3-8}$ cycloalkylene segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane copolymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CH DI), 4,4'-dicyclohexylmethane diisocyanate (H12MDI), diisocyanatododecane, lysine diisocyanate, and combinations thereof.

In aromatic embodiments (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane copolymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

In particular aspects, the polyurethane copolymer chains are produced from diisocyanates including HMDI, TDI, MDI, $H_{12}$ aliphatics, and combinations thereof. For example, the coated fiber as described herein of the present disclosure can comprise one or more polyurethane copolymer chains are produced from diisocynates including HMDI, TDI, MDI, $H_{12}$ aliphatics and combinations thereof.

In certain aspects, polyurethane chains which are crosslinked (e.g., partially crosslinked polyurethane copolymers which retain thermoplastic properties) or which can be crosslinked, can be used in accordance with the present disclosure. It is possible to produce crosslinked or crosslinkable polyurethane copolymer chains using multi-functional isocyanates. Examples of suitable triisocyanates for producing the polyurethane copolymer chains include TDI, HDI, and IPDI adducts with trimethyloylpropane (TMP), uretdiones (i.e., dimerized isocyanates), polymeric MDI, and combinations thereof.

Segment $R_3$ in Formula 2 can include a linear or branched $C_2$-$C_{10}$ segment, based on the particular chain extender polyol used, and can be, for example, aliphatic, aromatic, or polyether. Examples of suitable chain extender polyols for producing the polyurethane copolymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis(2-hydroxyethyl) ethers of hydroquinone and resorcinol, xylene-α,α-diols, bis(2-hydroxyethyl) ethers of xylene-α,α-diols, and combinations thereof.

Segment $R_2$ in Formula 1 and 2 can include a polyether group, a polyester group, a polycarbonate group, an aliphatic group, or an aromatic group. Each segment $R_2$ can be present in an amount of 5 percent to 85 percent by weight, from 5 percent to 70 percent by weight, or from 10 percent to 50 percent by weight, based on the total weight of the reactant monomers.

Optionally, in some examples, the thermoplastic polyurethane elastomer can be a thermoplastic polyurethane having relatively high degree of hydrophilicity. For example, the thermoplastic polyurethane can be a thermoplastic polyether polyurethane in which segment $R_2$ in Formulas 1 and 2 includes a polyether group, a polyester group, a polycarbonate group, an aliphatic group, or an aromatic group, wherein the aliphatic group or aromatic group is substituted with one or more pendant group having relatively greater degree of hydrophilicity (i.e., relatively "hydrophilic" groups). The relatively "hydrophilic" groups can be selected from the group consisting of hydroxyl, polyether, polyester, polylactone (e.g., polyvinylpyrrolidone (PVP)), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. In such examples, this relatively hydrophilic group or segment of $R_2$ can form portions of the polyurethane backbone, or can be grafted to the polyurethane backbone as a pendant group. In some examples, the pendant hydrophilic group or segment can be bonded to the aliphatic group or aromatic group through a linker. Each segment $R_2$ can be present in an amount of 5 percent to 85 percent by weight, from 5 percent to 70 percent by weight, or from 10 percent to 50 percent by weight, based on the total weight of the reactant monomers.

In some examples, at least one $R_2$ segment of the thermoplastic polyurethane elastomer includes a polyether segment (i.e., a segment having one or more ether groups). Suitable polyethers include, but are not limited to polyethylene oxide (PEO), polypropylene oxide (PPO), polytetrahydrofuran (PTHF), polytetramethylene oxide (P$T_m$O), and combinations thereof. The term "alkyl" as used herein refers to straight chained and branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the thermoplastic polyurethane elastomer, the at least one $R_2$ segment includes a polyester segment. The polyester segment can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester also can be derived from polycarbonate prepolymers, such as poly(hexamethylene carbonate) glycol, poly(propylene carbonate) glycol, poly(tetramethylene carbonate)glycol, and poly(nonanemethylene carbonate) glycol. Suitable polyesters can include, for example, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly(nonanemethylene carbonate), and combinations thereof.

In various of the thermoplastic polyurethane elastomer, at least one $R_2$ segment includes a polycarbonate segment. The polycarbonate segment can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

In various examples of the thermoplastic polyurethane elastomer, at least one $R_2$ segment can include an aliphatic group substituted with one or more groups having a relatively greater degree of hydrophilicity, i.e., a relatively "hydrophilic" group. The one or more relatively hydrophilic group can be selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. In some examples, the aliphatic group is linear and can include, for example, a $C_{1-20}$ alkylene chain or a $C_{1-20}$ alkenylene chain (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkylene" refers to a bivalent hydrocarbon. The term $C_n$ means the alkylene group has "n" carbon atoms. For example, $C_{1-6}$ alkylene refers to an alkylene group having, e.g., 1, 2, 3, 4, 5, or 6 carbon atoms. The term "alkenylene" refers to a bivalent hydrocarbon having at least one double bond.

In some cases, at least one $R_2$ segment includes an aromatic group substituted with one or more relatively hydrophilic group. The one or more hydrophilic group can be selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterionic (e.g., a betaine, such as poly(carboxybetaine (pCB) and ammonium phosphonate groups such as phosphatidylcholine), and combinations thereof. Suitable aromatic groups include, but are not limited to, phenyl, naphthyl, tetrahydronaphthyl, phenanthrenyl, biphenylenyl, indanyl, indenyl, anthracenyl, fluorenylpyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl groups, and combinations thereof.

In various aspects, the aliphatic and aromatic groups can be substituted with one or more pendant relatively hydrophilic and/or charged groups. In some aspects, the pendant hydrophilic group includes one or more (e.g., 2, 3, 4, 5, 6, 7, 8, 9, 10 or more) hydroxyl groups. In various aspects, the pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly (carboxybetaine (pCB) and ammonium phosphonate groups such as a phosphatidylcholine group).

In some aspects, the $R_2$ segment can include charged groups that are capable of binding to a counterion to ionically crosslink the thermoplastic elastomer and form ionomers. In these aspects, for example, $R_2$ is an aliphatic or aromatic group having pendant amino, carboxylate, sulfonate, phosphate, ammonium, or zwitterionic groups, or combinations thereof.

In various cases when a pendant hydrophilic group is present, the pendant "hydrophilic" group is at least one polyether group, such as two polyether groups. In other cases, the pendant hydrophilic group is at least one polyester. In various cases, the pendant hydrophilic group is polylactone group (e.g., polyvinylpyrrolidone). Each carbon atom of the pendant hydrophilic group can optionally be substituted with, e.g., a $C_{1-6}$ alkyl group. In some of these aspects, the aliphatic and aromatic groups can be graft polymeric groups, wherein the pendant groups are homopolymeric groups (e.g., polyether groups, polyester groups, polyvinylpyrrolidone groups).

In some aspects, the pendant hydrophilic group is a polyether group (e.g., a polyethylene oxide group, a polyethylene glycol group), a polyvinylpyrrolidone group, a polyacrylic acid group, or combinations thereof.

As described herein, the thermoplastic polyurethane elastomer can be physically crosslinked through e.g., nonpolar or polar interactions between the urethane or carbamate groups on the polymers (the hard segments. In these aspects, component $R_1$ in Formula 1, and components $R_1$ and $R_3$ in Formula 2, forms the portion of the polymer often referred to as the "hard segment", and component $R_2$ forms the portion of the polymer often referred to as the "soft segment". In these aspects, the soft segment can be covalently bonded to the hard segment. In some examples, the thermoplastic polyurethane elastomer having physically crosslinked hard and soft segments can be a hydrophilic thermoplastic polyurethane elastomer (i.e., a thermoplastic polyurethane elastomer including hydrophilic groups as disclosed herein).

In one aspect, prior to thermoforming, the thermoplastic polyurethane elastomer is an aromatic polyester thermoplastic elastomeric polyurethane or an aliphatic polyester thermoplastic elastomeric polyurethane having the following properties: (1) a glass transition temperature glass transition temperature of from about 20 degrees Celsius to about −60 degrees Celsius; (2) a Taber Abrasion Resistance of from about 10 milligrams to about 40 milligrams as determined by ASTM D3389; (3) a Durometer Hardness (Shore A) of from about 60 to about 90 as determined by ASTM D2240; (4) a specific gravity of from about 0.80 g/cm$^3$ to about 1.30 g/cm$^3$ as determined by ASTM D792; (5) a melt flow index of about 2 grams/10 minutes to about 50 grams/10 minutes at 160 degrees Celsius using a test weight of 2.16 kilograms; (6) a melt flow rate greater than about 2 grams/10 minutes at 190 degrees Celsius or 200 degrees Celsius when using a test weight of 10 kilograms; and (7) a modulus of about 1 megapascal to about 500 megapascals.

Commercially available thermoplastic polyurethane elastomers having greater hydrophilicity suitable for the present use include, but are not limited to those under the tradename "TECOPHILIC", such as TG-500, TG-2000, SP-80A-150, SP-93A-100, SP-60D-60 (Lubrizol, Countryside, IL), "ESTANE" (e.g., 58238, T470A; Lubrizol, Countryside, IL), and "ELASTOLLAN" (e.g., 9339, B70A; BASF).

In various aspects, the thermoplastic polyurethane elastomer can be partially covalently crosslinked, as previously described herein.

Thermoplastic Styrenic Copolymer Elastomers

In certain aspects, the thermoplastic elastomer is a thermoplastic elastomeric styrenic copolymer. Examples of these copolymers include, but are not limited to, styrene butadiene styrene (SBS) block copolymer, a styrene ethylene/butylene styrene (SEBS) resin, a polyacetal resin (POM) a styrene acrylonitrile resin (SAN), or a blend, alloy, or compound thereof. Exemplary commercially available thermoplastic elastomeric styrenic copolymers include MONOPRENE IN5074, SP066070, and SP16975 (Teknor Apex, Pawtucket, RI, USA), which are styrene ethylene/butylene styrene (SEBS) resins. In some aspects, blends, alloys, and compounds should be melt compatible or can be compatibilized with additives, oils, or grafted chemical moieties in order to achieve miscibility.

In one aspect, the thermoplastic elastomeric styrenic copolymer includes at least one block as illustrated below in Formula 3:

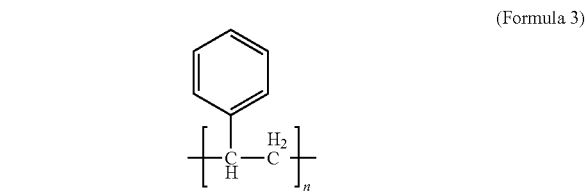

(Formula 3)

In another aspect, the thermoplastic elastomeric styrenic copolymer can be a SBS block copolymer comprising a first polystyrene block (block m of Formula 4), a polybutadiene block (block o of Formula 4), and a second polystyrene block (block p of Formula 4), wherein the SBS block copolymer has the general structure shown in Formula 4 below:

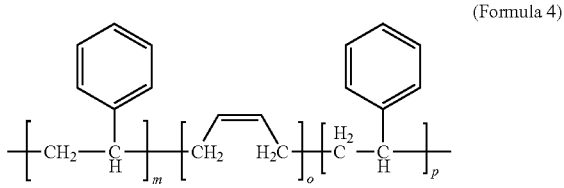

(Formula 4)

In another aspect, the thermoplastic elastomeric styrenic copolymer can be an SEBS block copolymer comprising a first polystyrene block (block x of Formula 5), a polyolefin block (block y of Formula 5), wherein the polyolefin block comprises alternating polyethylene blocks (block v of Formula 5) and polybutylene blocks (block w of Formula 4), and a second polystyrene block (block z of Formula 5) as seen in Formula 5 below.

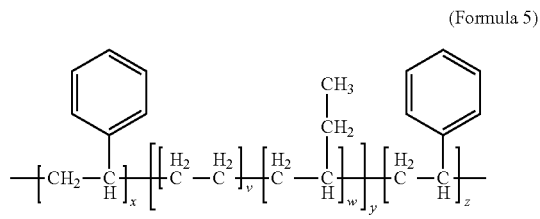

(Formula 5)

In one aspect, SEBS polymers have a density from about 0.88 grams per cubic centimeter to about 0.92 grams per cubic centimeter. In a further aspect, SEBS polymers can be as much as 15 to 25 percent less dense than cross-linked rubbers, cross-linked polyurethanes, and thermoplastic polyurethane materials. In a further aspect, a less dense coating composition offers weight savings and per part cost savings for the same material of volume employed while achieving similar performance.

Additives

In some aspects, the films, fibers, and yarns described herein can further comprise an additive. The additive can be incorporated directly into the films, fibers, and yarns, or alternatively, applied thereto. Additives that can be used include, but are not limited to, dyes, pigments, colorants, ultraviolet light absorbers, hindered amine light stabilizers, antioxidants, processing aids or agents, plasticizers, lubricants, emulsifiers, pigments, dyes, optical brighteners, rheology additives, catalysts, heat stabilizers, flow-control agents, slip agents, lubricating agents, crosslinking agents, crosslinking boosters, halogen scavengers, smoke inhibitors, flameproofing agents, antistatic agents, fillers, or mixtures of two or more of the foregoing. When used, an additive can be present in an amount of from about 0.01 weight percent to about 10 weight percent, about 0.025 weight percent to about 5 weight percent, or about 0.1 weight percent to 3 weight percent, where the weight percent is based upon the sum of the material components in the film, fiber, filament or yarn.

Individual components can be mixed together with the other components of the thermoplastic elastomer(s) in a continuous mixer or a batch mixer, e.g., in an intermeshing rotor mixer, such as an Intermix mixer, a twin screw extruder, in a tangential rotor mixer such as a Banbury mixer, using a two-roll mill, or some combinations of these to make a composition comprising a thermoplastic polymer and an additive. The mixer can blend the components together via a single step or multiple steps, and can mix the components via dispersive mixing or distributive mixing to form the resulting thermoplastic composition. This step is often referred to as "compounding."

All technical and scientific terms used herein, unless defined otherwise, have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The terms "comprises," "comprising," "including," and "having," are inclusive and therefore specify the presence of features, steps, operations, elements, and/or components, but do not preclude the presence or addition of one or more other features, steps, operations, elements, components, and/or groups thereof.

As used in the specification and the appended claims, the singular forms "a," "an" and "the" include plural referents unless the context clearly dictates otherwise. Thus, for example, reference to "a coated fiber," "an uncoated fiber," or "a knit upper," including, but not limited to, two or more such coated fibers.

As used herein, the term "and/or" includes any and all combinations of one or more of the associated listed items.

The terms first, second, third, etc. can be used herein to describe various elements, components, regions, layers and/or sections. These elements, components, regions, layers and/or sections should not be limited by these terms. These terms can be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

As used herein, the modifiers "upper," "lower," "top," "bottom," "upward," "downward," "vertical," "horizontal," "longitudinal," "transverse," "front," "back" etc., unless otherwise defined or made clear from the disclosure, are relative terms meant to place the various structures or orientations of the structures of the article of footwear in the context of an article of footwear worn by a user standing on a flat, horizontal surface.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1 percent to 5 percent" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10 percent variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Reference to "a" chemical compound" refers to one or more molecules of the chemical compound, rather than being limited to a single molecule of the chemical compound. Furthermore, the one or more molecules can or cannot be identical, so long as they fall under the category of the chemical compound. Thus, for example, "a polyamide" is interpreted to include one or more polymer molecules of the polyamide, where the polymer molecules can or cannot be identical (e.g., different molecular weights and/or isomers).

The terms "at least one" and "one or more of" an element are used interchangeably, and have the same meaning that includes a single element and a plurality of the elements, and can also be represented by the suffix "(s)" at the end of the element. For example, "at least one polyamide", "one or more polyamides", and "polyamide(s)" can be used interchangeably and have the same meaning.

As used herein, the terms "optional" or "optionally" means that the subsequently described component, event or circumstance can or cannot occur, and that the description includes instances where said component, event or circumstance occurs and instances where it does not.

The term "receiving", such as for "receiving an upper for an article of footwear", when recited in the claims, is not intended to require any particular delivery or receipt of the received item. Rather, the term "receiving" is merely used to recite items that will be referred to in subsequent elements of the claim(s), for purposes of clarity and ease of readability.

As used herein the terms "weight percent" and "wt percent," which can be used interchangeably, indicate the percent by weight of a given component based on the total weight of the composition, unless otherwise specified. That is, unless otherwise specified, all wt percent values are based on the total weight of the composition. It should be understood that the sum of wt percent values for all components in a disclosed composition or formulation are equal to 100.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

Unless otherwise specified, temperatures referred to herein are determined at standard atmospheric pressure (i.e., 1 ATM).

Property Analysis and Characterization Procedures

Evaluation of various properties and characteristics described herein are by various testing procedures as described herein below.

Sample Coefficient of Friction. The static or dynamic coefficient of friction (COF) of a textile or plaque sample is determined using test method ASTM D1894. In this method, a sample is cut to size and mounted on the sled, and a 100 gram weight plate is placed on the sled. During the test, the weighted sled is pulled across a test surface of the material being tested. For example, static and dynamic wet and dry COF can be determined by pulling the sled across a concrete surface to determine the COF of the sample and concrete. The coefficient of friction of the sample against that surface is captured by recording the normal force (100 grams plus sled weight) and measuring the applied force required to drag the sled across the test surface. The coefficient of friction (COF) is then calculated from the ratio of the two forces. Dry COF is determined by testing a dry sample against a dry testing surface, and wet COF is determined by testing a sample wetted with water by soaking it in room temperature water for 10 minutes against a test surface wetted with room temperature water.

Textile-Ball Coefficient of Friction Test. The static and dynamic coefficient of friction (COF) of a sample prepared using the Component Sampling Procedure or the Textile Sampling Procedure described below against a sample from a panel of a "MERLIN" soccer ball (Nike Inc., Beaverton, OR, USA) is determined using a modified version of test method ASTM D1894. In this method, the sample is cut to size and mounted on an acrylic substrate, and the ball material is cut to size and mounted on the sled. Once the ball material has been mounted on the sled, the sled has a contact footprint of 3.9 inches by 1 inch, and a weight of approximately 1.7 kilograms. During the test, the sample and ball material are positioned with the outer surface of the ball material contacting the surface of the sample which is intended form the outer surface of an article of footwear, and the sled is pulled across the sample. Dry samples and dry ball material are used to determine the static or dynamic dry COF. To determine the static or dynamic wet COF, the sample and the ball material are both soaked in room temperature water for 10 minutes immediately prior to testing. Each measurement is repeated at least 3 times, and the results of the runs are averaged.

Whole Footwear Coefficient of Friction Test. Testing on whole articles of footwear to determine the outsole's COF is performed using the SATRA TM144 test method, which forms the basis for the EN ISO 13287 and ASTM F2913-11 test methods. Testing is conducted on whole articles of footwear, i.e., an upper attached to a sole structure including the outsole to be tested. The whole article of footwear can either be a new, unworn article of footwear, or can be an article of footwear which has been mechanically abraded in accordance with the Whole Footwear Abrasion Test. Each article of footwear to be tested is aged 24 hours in the test lab prior to performing testing. This test is run using heel and forefoot substrate contact modes to generate coefficient of friction data. Each article of footwear can be tested on one of two surfaces in wet and dry conditions: (1) quarry tile, and (2) smooth concrete. Footwear tested using the Whole Footwear Coefficient of Friction Test when new can subsequently be subjected to abrasion using the Whole Footwear Abrasion Test and then re-tested using the Whole Footwear Coefficient of Friction Test to simulate the traction and slip resistance of the footwear on surfaces after the equivalent of many days or miles worth of simulated wear. Coefficient of friction is calculated from the applied force to laterally translate the outsole of the shoe across the substrate divided by the applied normal force loaded on the sample as specified in the test method.

Whole Footwear Abrasion Test. Biomechanical abrasion testing is performed on outsoles of whole articles of footwear using the SATRA TM362 testing method. In this test, a walking action over a real wear surface is simulated. Sample footwear is mounted on a mechanical leg and a flooring mechanism rotates to simulate turns during walking with the forepart of the sole in contact with the walking surface. The force applied by the footwear on the sample flooring surface follows a distinct profile that can be adjusted by adding or subtracting weights. A standard load of 180 pounds is used, and the speed can be adjusted to replicate normal walking, running, and/or sprinting. The walking surface is a textured concrete slab. Samples are conditioned for 24 hours in a climate controlled lab and inserted into the machine. Each sample is tested for 48 hours of simulated foot strikes, or about 96,000 steps, which approximates 100 miles of walking. Mass loss is recorded at 24 hours and at 48 hours of testing.

Melting and Glass Transition Temperature Test. The melting temperature and/or glass transition temperature are determined for a sample prepared according to Material Sampling Procedure described below, using a commercially available Differential Scanning calorimeter ("DSC") in accordance with ASTM D3418-97. Briefly, a 10-60 milligram sample is placed into an aluminum DSC pan and then the lid is sealed with a crimper press. The DSC is configured to scan from −100 degrees Celsius to 225 degrees Celsius with a 20 degree Celsius/minute heating rate, hold at 225 degrees Celsius for 2 minutes, and then cool down to 25 degrees Celsius at a rate of −20 degrees Celsius/minute. The DSC curve created from this scan is then analyzed using standard techniques to determine the glass transition temperature and the melting temperature. Melting enthalpy is calculated by integrating the melting endotherm and normalizing by the mass of the sample. Crystallization enthalpy upon cooling is calculated by integrating the cooling endotherm and normalizing by the mass of the sample.

Deformation Temperature Test. The Vicat softening temperature is determined for a sample prepared according to Material Sampling Procedure or the Component Sampling Procedure described below, according to the test method detailed in ASTM™ D1525-09 Standard Test Method for Vicat Softening Temperature of Plastics, preferably using Load A and Rate A. Briefly, the Vicat softening temperature is the temperature at which a flat-ended needle penetrates the specimen to the depth of 1 millimeter under a specific load. The temperature reflects the point of softening expected when a material is used in an elevated temperature application. It is taken as the temperature at which the specimen is penetrated to a depth of 1 millimeter by a flat-ended needle with a 1 square millimeter2 circular or square cross-section. For the Vicat A test, a load of 10 Newtons (N) is used, whereas for the Vicat B test, the load is 50 Newtons. The test involves placing a test specimen in the testing apparatus so that the penetrating needle rests on its surface at least 1 millimeter from the edge. A load is applied to the specimen per the requirements of the Vicat A or Vicat B test. The specimen is then lowered into an oil bath at 23° C. degrees Celsius. The bath is raised at a rate of 50 degrees Celsius or 120 degrees Celsius per hour until the needle penetrates 1 millimeter. The test specimen must be between 3 and 6.5 millimeter thick and at least 10 millimeter in width and length. No more than three layers can be stacked to achieve minimum thickness.

Melt Flow Index Test. The melt flow index is determined for a sample prepared according to the Material Sampling Procedure described below according to the test method detailed in ASTM D1238-13 Standard Test Method for Melt Flow Rates of Thermoplastics by Extrusion Plastometer, using Procedure A described therein. Briefly, the melt flow index measures the rate of extrusion of thermoplastics through an orifice at a prescribed temperature and load. In the test method, approximately 7 grams of the material is loaded into the barrel of the melt flow apparatus, which has been heated to a temperature specified for the material. A weight specified for the material is applied to a plunger and the molten material is forced through the die. A timed extrudate is collected and weighed. Melt flow index values are calculated in g/10 min for a given applied load and applied temperature. As described in ASTM D1238-13, melt flow index can be determined at 160 degrees Celsius using a weight of 2.16 kg, or at 200 degrees Celsius using a weight of 10 kg.

Molten Polymer Viscosity Test. The test is conducted using 2 millimeter plaques or films prepared according to the Plaque or Film Sampling Procedure described below. A circular die is used to cut 50 millimeter specimen discs of from the plaque or film. Test specimens are mounted on a 50 millimeter diameter aluminum parallel plate on an ARES-G2 (displacement controlled) rheometer. The top plate is lowered so that the test specimens are in contact with both disc surfaces under a defined normal force load and the stage is heated to 210 degrees Celsius. Samples are equilibrated until molten, for a defined dwell time of minutes, and oscillatory shear frequency sweeps are applied at low strain amplitudes to gather rate-dependent data. The ratio of the applied shear stress required to generate the oscillatory motion at a given shear frequency rate yields the measured viscosity value. Shear rate-dependent viscosity data can be gathered from 0.1 reciprocal seconds to 1000 reciprocal seconds.

Plaque Modulus Test. The modulus for sample prepared according to the Plaque or Film Sampling Procedure described below is determined according to the test method detailed in ASTM D412-98 Standard Test Methods for Vulcanized Rubber and Thermoplastic Rubbers and Thermoplastic Elastomers-Tension, with the following modifications. The sample dimension is the ASTM D412-98 Die C, and the sample thickness used is 2.0 millimeters plus or minus 0.5 millimeters. The grip type used is a pneumatic grip with a metal serrated grip face. The grip distance used is 75 millimeters. The loading rate used is 500 millimeters/minute. The modulus (initial) is calculated by taking the slope of the stress (MPa) versus the strain in the initial linear region. This test can also be used to determine other tensile properties such as break strength, strain to break, load at 100 percent strain, toughness, stiffness, tear strength, and the like.

Yarn Denier and Thickness Test. To determine denier, a sample of yarn is prepared according to the Yarn Sampling Procedure described below. A known length of the yarn sample and its corresponding weight are measured. This is converted to grams per 9000 meters of yarn. To determine the thickness of a coated yarn, the yarn is first cut with a razor and observed under a microscope, where coating thickness relative to core yarn diameter is determined to scale.

Yarn Modulus, Tenacity, and Elongation Test. The modulus for a yarn is determined for a sample prepared according to the Yarn Sampling Procedure described above, and tested according to the test method detailed in EN ISO 2062 (Textiles-Yarns from Packages)—Determination of Single-End Breaking Force and Elongation at Break Using Constant Rate of Extension (CRE) Tester. The following modifications to the test method are used. 5 test specimens are prepared with a sample length of 600 millimeters. The equipment used is an Instron Universal Testing System. Instron Pneumatic cord and Thread Grips or similar pneumatic grips are installed, with a grip distance of 250 millimeters. Grip distance is set to 145+1 millimeter and gauge length is set at 250+2 millimeters when using Instron Pneumatic Cord and Thread Grips. The pre-loading is set to 5 grams and the loading rate used is 250 millimeters/minute. The modulus (initial) is calculated by taking the slope of the stress (MPa) versus the strain in the initial linear region. Maximum tensile force value is recorded. Tenacity and elongation of the yarn sample are determined according to the test method detailed in EN ISO 2062 with the pre-load set to 5 grams. Elongation is recorded at the maximum tensile force value applied prior to breaking. Tenacity can be calculated as the ratio of load required to break the specimen to the linear density of the specimen.

Durometer Hardness Test. The hardness of a material is determined for a sample prepared according to the Material Sampling Procedure, the Component Sampling Procedure, the Plaque or Film Sampling Procedure, or the Textile Sampling Procedure described below, according to the test method detailed in ASTM D-2240 Durometer Hardness, using a Shore A scale.

Specific Gravity Test. The specific gravity for a sample prepared according to the Material Sampling Procedure, the Component Sampling Procedure, the Plaque or Film Sampling Procedure, the Yarn Sampling Procedure, or the Textile Sampling Procedure described below is determined according to the test method detailed in ASTM D792 using volume displacement.

Yarn Shrinkage Test. The free-standing shrinkage of yarns can be determined by the following method. A yarn sample is prepared according to the Yarn Sampling Procedure described below, and is cut to a length of approximately 30 millimeters with minimal tension at approximately room temperature (e.g., 20 degrees Celsius). The cut sample is placed in a 50 degrees Celsius or 70 degrees Celsius oven for 90 seconds. The sample is removed from the oven and measured. The percentage of shrink is calculated using the pre- and post-oven measurements of the sample, by dividing the post-oven measurement by the pre-oven measurement, and multiplying by 100.

Cold Ross Flex Test. The cold Ross flex test is determined using a sample prepared according to the Plaque or Film Sampling Procedure described below according the following test method. The purpose of this test is to evaluate the resistance to cracking of a sample under repeated flexing to 60 degrees in a cold environment. The plaque sample is sized to fit inside the flex tester machine. Each material is tested as five separate samples. The flex tester machine is capable of flexing samples to 60 degrees at a rate of 100±5 cycles per minute. The mandrel diameter of the machine is 10 millimeters. Suitable machines for this test include the Emerson AR-6, the Satra S $T_m$ 141F, the Gotech GT-7006, and the Shin II Scientific SI-LTCO (DaeSung Scientific). The sample(s) are inserted into the machine according to the specific parameters of the flex machine used. The machine is placed in a freezer set to −6 degrees Celsius for the test. The motor is turned on to begin flexing with the flexing cycles counted until the sample cracks. Cracking of the sample means that the surface of the material is physically split. Visible creases of lines that do not actually penetrate the surface are not cracks. The sample is measured to a point where it has cracked but not yet broken in two.

Bally Flex Test. The Bally flex test, which is based on standard methods including ISO 5402, ISO 32100, SATRA TM55, DIN 53351, and BS-3144, is conducted as follows, using samples prepared according to the Component Sampling Procedure, the Plaque or Film Sampling Procedure, or the Textile Sampling Procedure described below. A minimum of 6 samples are required for this test method. Samples are 60 millimeters x 75 millimeters and can be hand cut or die cut. Each sample is folded and inserted into the testing equipment such that it protrudes from the bottom clamp a distance equal to the sample thickness. The folded front edge of the sample is perpendicular to the base of the testing machine. The samples are then repeatedly flexed. Samples are visually inspected during the test period. If a sample has cracked, the approximate number of cycles when cracking occurred is noted. If this sample is the only sample being tested on the machine, the test is stopped since the material has failed. If other samples are being tested, the testing continues until either all samples have failed or until 100,000 cycles have been completed, whichever occurs first.

Wet Bally Flex Test. The wet Bally flex test is designed to assess the ability of a sample textile, film, or other specimen to resist water penetration from repeated flexing and is conducted as follows using samples prepared according to the Component Sampling Procedure, the Plaque or Film Sampling Procedure, or the Textile Sampling Procedure described below. At a minimum, 4 samples are required. Specimens are 60 millimeters x 75 millimeters and can be hand cut or die cut. 1 gram of sodium chloride is dissolved in 1 liter of distilled water and stirred to create a sodium chloride solution. The sodium chloride solution is poured into a water tank and placed into the testing machine. A Gotech GT-7071-DWN instrument (Gotech Testing Machines, Taichung City, Taiwan) or similar instrument can be used for analysis. Specimens are folded into a U shape and clamped into the instrument such that the side of the specimens to be tested for water penetration faces outward. The samples are then repeatedly flexed. If a specimen remains intact through at least 5000 cycles of flexing, it can be considered "water resistant." If a sample remains intact for at least 15,000 cycles of flexing, it can be considered "waterproof." If a specimen leaks, triggering a sensor, before all cycles have been conducted, the specimen is said to fail.

Stoll Abrasion Test. Abrasion resistance, including abrasion resistance simulating footwear upper scuffing, can be measured using the Stoll abrasion test, using samples prepared according to the Component Sampling Procedure, the Plaque or Film Sampling Procedure, or the Textile Sampling Procedure described below. The minimum number of samples for Stoll abrasion testing is 3. Samples used herein were hand cut or die cut into circles having a 112 millimeter diameter. The Stoll abrasion test is described more fully in ASTM D3886 and can be performed on the Atlas Universal Wear Tester. In the Stoll abrasion test, an abrading medium is moved over the stationary, mounted test sample and the visual appearance of the sample is monitored. The Stoll abrasion test is performed under pressure to simulate wear under normal usage.

Akron Abrasion Test. Abrasion resistance, including abrasion resistance simulating footwear sole structure scuffing of ground-contacting areas can be measured using the Akron abrasion test, using samples prepared according to the Component Sampling Procedure, the Plaque or Film Sampling Procedure, or the Textile Sampling Procedure described below. A sample strip is cut from a sample, wherein the strip is approximately 2-3 millimeters thick, 0.5 inches (127 millimeters) wide, and 8 inches (2032 millimeters) long. The strip is mounted to the perimeter of a rubber wheel, and the wheel is mounted so the strip is pushed against an abrasive grit surface at a slight angle (approximately 15 degrees) and under a known force (approximately 6 pounds or 2.72 kilograms). The strip is run for a number of cycles to prepare the surface, cleaned with a brush and vacuum, and weighed. The strip is then mounted against the abrasive wheel and run for about 3000 additional cycles, then cleaned and weighed again. Mass loss can be adjusted based on the density of the material. The measured mass and volume losses represent the abrasion level of resistance.

DIN Abrasion Test. Samples are prepared according to the Component Sampling Procedure, the Plaque or Film Sampling Procedure, or the Textile Sampling Procedure described below Abrasion loss is tested on cylindrical samples with a diameter of 16±0.2 millimeters and a minimum thickness of 6 millimeters cut using a ASTM standard hole drill. The abrasion loss is measured using Method B of ASTM D 5963-97a on a Gotech GT-7012-D abrasion test machine. The tests are performed as 22 degrees Celsius with an abrasion path of 40 meters. The Standard Rubber #1 used in the tests has a density of 1.336 grams per cubic centimeter ($g/cm^3$). The smaller the abrasion loss volume, the better the abrasion resistance.

Water Penetration Test. Water penetration for a sample is determined as follows, using for a sample prepared according to the Component Sampling Procedure, the Plaque or Film Sampling Procedure, or the Textile Sampling Procedure described below. The specimen to be tested is mounted on a support base with a surface at a 45 degree angle to the horizontal. The support base includes a 152 millimeter diameter specimen holder inner ring. A specimen is allowed to equilibrate in the laboratory environment for at least 2 hours prior to testing. Test specimens are cut into 220 millimeter diameter circles. Thicker or harder materials such as leather or stiff synthetic leather will have 3 notches cut into the outer edge of the sample. Specimens may be hand cut or die cut. Test specimens for softer materials are cut to the same size, with length direction marked on the test specimens. Backing paper is prepared from white or off-white paper towels, coffee filters, or similar thin, absorbent papers. Backing paper is also cut into 220 millimeter diameter circles. One backing paper is prepared per test specimen and backing paper is not reused. The backing paper and a specimen are placed in a sample fixture, which is in turn placed in a spray testing device. The sample length direction should be parallel with the water flow direction. A funnel is adjusted to a height of 6 inches (152.4 millimeters) between a spray nozzle and the test specimen. The spray nozzle must be over the center of the test specimen. 250±2 milliliters of distilled water are added to the funnel, which causes water to spray onto the test specimen. Within 10 seconds of spraying ending, the top surface is evaluated for water repellency. After the top surface is evaluated, the sample fixture is removed from the support base and the backing paper is evaluated to determine if water penetrated through the sample. Water penetration is reported after visual assessment and samples are rated as "pass" or "fail" according to the degree of wetting. If no sticking or wetting of the top surface is observed, if slight random sticking or wetting of the top surface is observed, or if wetting of the top surface is observed at spray points, the sample is considered to pass. Further wetting beyond the spray points and/or including the back surface indicates the sample has failed the water penetration test.

Textile-Ball Impact Test. Test samples of textiles are prepared according to the Component Sampling Procedure or the Textile Sampling Procedure described below. A 10 inch by 8 inch test sample of the textile is mounted on the outer surface on a metal cylinder having a 10 inch circumference. The test sample and cylinder are mounted on the swinging arm of a robot, the swinging arm is swung at a rate of 50 miles per hour, and impacts the equator of a stationary ball. The ball used is a regulation size Nike "MERLIN" soccer ball inflated to 0.80 bar. A high speed video camera is used to record the ball position immediately following the impact. Using the position in space and rotation of the ball across multiple frames of the images recorded by the high-speed video camera, software is then used to calculate the velocity and spin rate of the ball immediately after impact. Each measurement is repeated at least 3 times, and the results of the runs are averaged.

Upper-Ball Impact Test. A whole men's size 10.5 football boot, or the upper of a men's size 10.5 football boot, is mounted on the swinging arm of a robot, and positioned so the ball impacts the boot on the medial side of the vamp, on or near the laces (when the boot includes a lacing structure), and the upper impacts the equator of the ball when the singing arm of the robot is swung at a rate of 50 miles per hour. The ball used is a regulation size Nike "MERLIN" soccer ball inflated to 0.80 bar. A high speed video camera is used to record the ball position immediately following the impact. Using the position in space and rotation of the ball across multiple frames of the images recorded by the high-speed video camera, software is then used to calculate the velocity and spin rate of the ball immediately after impact. Each measurement is repeated at least 3 times, and the results of the runs are averaged.

Specific Gravity Test

The specific gravity (SG) is measured for samples taken using the Plaque Sampling Procedure, or the Component Sampling Procedure, using a digital balance or a Densicom Tester (Qualitest, Plantation, Florida, USA). Each sample is weighed (g) and then is submerged in a distilled water bath (at 22 degrees C. plus or minus 2 degrees C.). To avoid errors, air bubbles on the surface of the samples are removed, e.g., by wiping isopropyl alcohol on the sample before immersing the sample in water, or using a brush after the sample is immersed. The weight of the sample in the distilled water is recorded. The specific gravity is calculated with the following formula:

$$S.G. = \frac{\text{Weight of the sample in air (g)}}{\text{Weight of sample in air (g)} - \text{Weight of sample in water (g)}}$$

Sampling Procedures

Using the Tests described above, various properties of the materials disclosed herein and articles formed therefrom can be characterized using samples prepared with the following sampling procedures:

Material Sampling Procedure. The Material Sampling Procedure can be used to obtain a neat sample of a polymeric composition or of a polymer, or, in some instances, a sample of a material used to form a polymeric composition or a polymer. The material is provided in media form, such as flakes, granules, powders, pellets, and the like. If a source of the polymeric material or polymer is not available in a neat form, the sample can be cut from a component or element containing the polymeric material or polymer, such as a composite element or a sole structure, thereby isolating a sample of the material.

Plaque or Film Sampling Procedure. A sample of a polymeric composition or a polymer is prepared. A portion of the polymer or polymeric composition is then be molded into a film or plaque sized to fit the testing apparatus. For example, when using a Ross flexing tester, the plaque or film sample is sized to fit inside the Ross flexing tester used, the sample having dimensions of about 15 centimeters (cm) by 2.5 centimeters (cm) and a thickness of about 1 millimeter (mm) to about 4 millimeters (mm) by thermoforming the polymeric composition or polymer in a mold. For a plaque sample of a polymer, the sample can be prepared by melting the polymer, charging the molten polymer into a mold, re-solidifying the polymer in the shape of the mold, and removing the solidified molded sample from the mold. Alternatively, the sample of the polymer can be melted and then extruded into a film which is cut to size. For a sample of a polymeric composition, the sample can be prepared by blending together the ingredients of the polymeric composition, melting the thermoplastic ingredients of the polymeric composition, charging the molten polymeric composition into a mold, re-solidifying the polymeric composition in the shape of the mold, and removing the solidified molded sample from the mold. Alternatively, the sample of the polymer material can be prepared by mixing and melting the ingredients of the polymeric composition, and then the molten polymeric composition can be extruded into a film which is cut to size. For a film sample of a polymer or polymeric composition, the film is extruded as a web or sheet having a substantially constant film thickness for the film (within ±10 percent of the average film thickness) and cooled to solidify the resulting web or sheet. A sample having a surface area of 4 square centimeters is then cut from the resulting web or sheet. Alternatively, if a source of the film material is not available in a neat form, the film can be cut from a substrate of a footwear component, or from a backing substrate of a co-extruded sheet or web, thereby isolating the film. In either case, a sample having a surface area of 4 square centimeters is then cut from the resulting isolated film.

Component Sampling Procedure. This procedure can be used to obtain a sample of a material from a component of an article of footwear, an article of footwear, a component of an article of apparel, an article of apparel, a component of an article of sporting equipment, or an article of sporting equipment, including a sample of a polymeric composition or of a textile, or a portion of a textile, such as thermoformed network. A sample including the material in a non-wet state (e.g., at 25 degrees Celsius and 20 percent relative humidity) is cut from the article or component using a blade. If the material is bonded to one or more additional materials, the procedure can include separating the additional materials from the material to be tested. For example, to test a material on a ground-facing surface of sole structure, the opposite surface can be skinned, abraded, scraped, or otherwise cleaned to remove any adhesives, yarns, fibers, foams, and the like which are affixed to the material to be tested. The resulting sample includes the material and may include any additional materials bonded to the material.

The sample is taken at a location along the article or component that provides a substantially constant material thickness for the material as present on the article or component (within plus or minus 10 percent of the average material thickness), such as, for an article of footwear, in a forefoot region, midfoot region, or a heel region of a ground-facing surface. For many of the test protocols described above, a sample having a surface area of 4 square centimeters ($cm^2$) is used. The sample is cut into a size and shape (e.g., a dogbone-shaped sample) to fit into the testing apparatus. In cases where the material is not present on the article or component in any segment having a 4 square centimeter surface area and/or where the material thickness is not substantially constant for a segment having a 4 square centimeter surface area, sample sizes with smaller cross-sectional surface areas can be taken and the area-specific measurements are adjusted accordingly.

Yarn Sampling Procedure. Yarn to be tested is stored at room temperature (20 degrees Celsius to 24 degrees Celsius) for 24 hours prior to testing. The first 3 meters of material are discarded. A sample yarn is cut to a length of approximately 30 millimeters with minimal tension at approximately room temperature (e.g., 20 degrees Celsius).

Textile Sampling Procedure. A textile to be tested is stored at room temperature (20 degrees Celsius to 24 degrees Celsius) for 24 hours prior to testing. The textile sample is cut to size as dictated by the test method to be used, with minimal tension at approximately room temperature (e.g., 20 degrees Celsius).

Before proceeding to the Examples, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

ASPECTS

The following listing of exemplary aspects supports and is supported by the disclosure provided herein.

Aspect 1. A textile, comprising:
a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition.

Aspect 2. The textile of Aspect 1, wherein the textile is a knit or crochet textile, and the first network of yarns includes connected loops of the first coated yarn.

Aspect 3. The textile of Aspect 1, wherein the textile is a woven textile, and the first network of yarns includes interlaced sets of yarns comprising the first coated yarn in a warp direction, or in a weft direction, or in both the warp and weft directions.

Aspect 4. The textile of Aspect 1, wherein the textile is a non-woven textile, and the first network of yarns includes entangled or bonded yarns comprising the first coated yarn.

Aspect 5. The textile of Aspect 4, wherein the entangled or bonded yarns comprise mechanically entangled yarns, thermally bonded yarns, yarns bonded by a solvent treatment, chemically bonded yarns, or any combination thereof.

Aspect 6. The textile of any of Aspects 1-5, wherein the first core yarn comprises a second polymeric composition, and wherein the first polymeric composition of the first coating has a first melting temperature.

Aspect 7. The textile of Aspect 6, wherein the second polymeric composition is a second thermoplastic composition having a second deformation temperature, and the second deformation temperature is at least 20 degrees Celsius (C) greater, or optionally at least 50 degrees C. greater, or optionally at least 100 degrees C. greater than the first melting temperature of the first thermoplastic composition.

Aspect 8. The textile of Aspect 6 or 7, wherein the second polymeric composition is a second thermoset composition.

Aspect 9. The textile of any of Aspects 1-8, wherein the first core yarn comprises a first core yarn composition comprising a polyester or a polyamide.

Aspect 10. The textile of any of Aspects 1-9, wherein the first core yarn has a linear density from about 100 denier to about 300 denier, or has a diameter of from about 60 to 200 microns.

Aspect 11. The textile of any of Aspects 1-10, wherein the first coating is axially centered surrounding the core yarn, and the first coating thickness leads to a nominal average outer diameter of the coated yarn of up to about 1.0 millimeter.

Aspect 12. The textile of any of Aspects 1-11, wherein the first coating is axially centered surrounding the first core yarn, and the first coating thickness leads to a nominal average outer diameter of the coated yarn of about 0.1 millimeters to about 0.6 millimeters.

Aspect 13. The textile of any of Aspects 1-12, wherein the first coating has an average radial coating thickness of about 50 micrometers to about 200 micrometers.

Aspect 14. The textile of any of Aspects 1-13, wherein the first polymeric composition has a melting temperature greater than about 110 degrees C. and less than about 190 degrees C.

Aspect 15. The textile of any of Aspects 1-13, wherein the first polymeric composition has a melting temperature greater than about 120 degrees C. and less than about 170 degrees C., and optionally greater than about 130 degrees C., and less than about 160 degrees C.

Aspect 16. The textile of any of Aspects 1-15, wherein the first polymeric composition has a glass transition temperature glass transition temperature of less than 20 degrees C.

Aspect 17. The textile of any of Aspects 1-16, wherein the first polymeric composition has a glass transition temperature glass transition temperature of from about 20 degrees C. to about −60 degrees C.

Aspect 18. The textile of any of Aspects 1-17, wherein the first polymeric composition has a Taber Abrasion Resistance of from about 10 milligrams to about 40 milligrams as determined by ASTM D3389.

Aspect 19. The textile of any of Aspects 1-18, wherein the first polymeric composition has a Durometer Hardness (Shore A) of from about 60 to about 90, from about 60 to about 90, or from about 65 to about 85, or from about 70 to about 80 as determined by ASTM D2240.

Aspect 20. The textile of any of Aspects 1-19, wherein the first polymeric composition has a specific gravity of from about 0.80 grams per cubic centimeter to about 1.30 grams per cubic centimeter, or from about 1.0 grams per cubic centimeter to about 1.2 grams per cubic centimeter as determined by ASTM D792.

Aspect 21. The textile of any of Aspects 1-20, wherein the first polymeric composition has a melt flow index of about 2 grams/10 minutes to about 50 grams/10 minutes at 160 degrees C. using a test weight of 2.16 kilograms as determined using ASTM D1238-13.

Aspect 22. The textile of any of Aspects 1-21, wherein the first polymeric composition has a melt flow index greater than about 2 grams/10 minutes at 190 degrees C. or 200 degrees C. when using a test weight of 10 kilograms as determined using ASTM D1238-13.

Aspect 23. The textile of any of Aspects 1-22, wherein the first polymeric composition has a modulus of about 1 megapascal to about 500 megapascals as determined using the Plaque Modulus Test.

Aspect 24. The textile of any of Aspects 1-23, wherein the first polymeric composition comprises a polymeric component consisting of all the polymers present in the polymeric composition; optionally wherein and the polymeric component comprises two or more polymers, wherein the two or more polymers differ from each other in chemical structure of individual segments of each of the two or more polymers, or in molecular weight of each of the two or more polymers, or in both.

Aspect 25. The textile of any of Aspects 1-24, wherein the first polymeric composition comprises a thermoplastic elastomeric styrenic copolymer, a thermoplastic elastomeric polyurethane, or a combination thereof; optionally wherein the polymeric component of the first polymeric composition consists of the thermoplastic elastomeric styrenic copolymer, the thermoplastic elastomeric polyurethane, or the combination thereof.

Aspect 26. The textile of Aspect 25, wherein the thermoplastic elastomeric styrenic copolymer comprises a styrene butadiene styrene (SBS) block copolymer, a styrene ethylene/butylene styrene (SEBS) copolymer, a styrene acrylonitrile copolymer (SAN), or any combination thereof.

Aspect 27. The textile of Aspect 25, wherein the thermoplastic elastomeric polyurethane comprises a thermoplastic elastomeric polyester polyurethane, a thermoplastic polyether polyurethane, or any combination thereof.

Aspect 28. The textile of Aspect 27, wherein the thermoplastic elastomeric polyurethane comprises an aromatic polyester thermoplastic elastomeric polyurethane.

Aspect 29. The textile of any of Aspects 25-28, wherein the thermoplastic elastomeric polyurethane comprises an aliphatic polyester thermoplastic elastomeric polyurethane.

Aspect 30. The textile of any of Aspects 1-29, wherein the textile further comprises a lubricating composition.

Aspect 31. The textile of Aspect 30, wherein the lubricating composition is from about 0.1 weight percent to about 3 weight percent of the textile.

Aspect 32. The textile of Aspect 30 or 31, wherein the lubricating composition comprises mineral oil, silicone oil, or a combination thereof.

Aspect 33. The textile of any of Aspects 1-32, wherein the first coated yarn has a stress at break greater than 7 megapascals, optionally greater than 8 megapascals, or greater than 8 megapascals as determined using ASTM DE-412 at 25 degrees C.

Aspect 34. The textile of any of Aspects 1-33, wherein the first coated yarn has a tensile stress at 300 percent modulus greater than 2 megapascals, optionally greater than 2.5 megapascals, or greater than 3 megapascals as determined using ASTM DE-412 at 25 degrees C.

Aspect 35. The textile of any of Aspects 1-34, wherein the first coated yarn has an elongation at break greater than 450 percent, optionally greater than 500 percent, or greater than 550 percent as determined using the Yarn Modulus, Tenacity and Elongation Test.

Aspect 36. The textile of any of Aspects 1-35, wherein the first coated yarn has a tenacity of about 1 gram per denier to about 10 grams per denier as determined using the Yarn Modulus, Tenacity and Elongation Test.

Aspect 37. A textile, comprising:
a thermoformed network of yarns, the thermoformed network comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition.

Aspect 38. The textile of Aspect 37, wherein the thermoformed network of yarns is the thermoformed product of a first textile comprising a first network of yarns including a first coated yarn comprising the first core yarn and a first coating, the first coating including the first polymeric composition, wherein, in the thermoformed network, the first polymeric composition consolidating the thermoformed network of yarns is the re-flowed and re-solidified product of the first polymeric composition of the first coating of the first coated yarn.

Aspect 39. The textile of Aspect 37 or 38, wherein the thermoformed network of yarns is the thermoformed product of a textile according to any one of Aspects 1 to 36.

Aspect 40. The textile of any of Aspects 37 to 39, wherein, when the textile has a mass loss of less than 0.05 weight percent after 300 cycles as determined by the Akron Abrasion Test.

Aspect 41. The textile of any of Aspects 37 to 39, wherein the textile has a mass loss of less than 0.20 weight percent after 3,000 cycles as determined by the Akron Abrasion Test.

Aspect 42. The textile of any of Aspects 37 to 41, wherein the textile passes at least 1,200 cycles, or optionally at least 1,300 cycles, or at least 1,600 cycles of the Stoll Abrasion Test.

Aspect 43. The textile of any of Aspects 37 to 42, wherein the textile passes at least at least 75 cycles, or at least 100 cycles, or at least 125 cycles of the Bally Flex Test.

Aspect 44. The textile of any of Aspects 37 to 43, wherein the textile passes at least 3,000 cycles, or at least 5,000 cycles, or at least 7,000 cycles of the Wet Bally Flex Test.

Aspect 45. The textile of any of Aspects 37 to 44, wherein the textile produces a ball spin rate of at least 220 revolutions per minute, or a ball spin rate of about 220 revolutions per minute to about 240 revolutions per minute, as determined using the Textile-Ball Impact Test.

Aspect 46. The textile of any of Aspects 37 to 45, wherein the first polymeric composition has an abrasion loss of less than 0.50 cubic centimeters, optionally less than 0.40 cubic centimeters, less than 0.30 cubic centimeters, less than 0.20 cubic centimeters, or less than 0.10 cubic centimeters as determined using the Akron Abrasion Test.

Aspect 47. The textile of any of Aspects 37 to 46, wherein the first polymeric composition has an abrasion loss of less than 0.30 cubic centimeters, less than 0.20 cubic centimeters, less than 0.10 cubic centimeters, less than 0.05 cubic centimeters, or less than 0.30 cubic centimeters, as determined using the DIN Abrasion Test.

Aspect 48. The textile of any of Aspects 37 to 47, wherein the first polymeric composition has a dry dynamic coefficient of friction of at least 1.0 as determined against dry smooth concrete using the Sample Coefficient of Friction Test.

Aspect 49. The textile of any of Aspects 37 to 48, wherein the first polymeric composition has a wet dynamic coefficient of friction of at least 0.5 as determined against wet smooth concrete using the Sample Coefficient of Friction Test.

Aspect 50. The textile of any of Aspects 37 to 49, wherein the difference between the dry dynamic coefficient of friction and the wet coefficient of the first polymeric composition as determine against smooth concrete is less than 40 percent, optionally less than 30 percent, or less than 20 percent as determined using the Sample Coefficient of Friction Test.

Aspect 51. The textile of any of Aspects 37 to 50, wherein the thermoformed network of the textile has a dry dynamic coefficient of friction of at least 0.8 as determined against dry smooth concrete using the Sample Coefficient of Friction Test.

Aspect 52. The textile of any of Aspects 37 to 51, wherein the first thermoformed network of the textile has a wet dynamic coefficient of friction of at least 0.5 as determined against wet smooth concrete using the Sample Coefficient of Friction Test.

Aspect 53. The textile of any of Aspects 37 to 52, wherein the difference between the dry dynamic coefficient of friction and the wet coefficient of the thermoformed network of the textile as determine against smooth concrete is less than 50 percent, optionally less than 40 percent, or less than 30 percent as determined using the Sample Coefficient of Friction Test.

Aspect 54. The textile of any of Aspects 37 to 53, wherein the difference between the static coefficient of friction of the dry surface and the wet surface of the textile is less than 40 percent, optionally less than 30 percent, or less than 20 percent as determined using the Sample Coefficient of Friction Test.

Aspect 55. The textile of any of Aspects 37 to 54, wherein the thermoformed network of the textile has a dry dynamic coefficient of friction of at least 1.0 as determined using the Textile-Ball Coefficient of Friction Test.

Aspect 56. The textile of any of Aspects 37 to 55, wherein the first thermoformed network of the textile has a wet dynamic coefficient of friction of at least 0.5 as determined using the Textile-Ball Coefficient of Friction Test.

Aspect 57. The textile of any of Aspects 37 to 56, wherein the difference between the dry dynamic coefficient of friction and the wet dynamic coefficient of friction is less than 40 percent, optionally less than 30 percent, or less than 20 percent as determined using the Textile-Ball Coefficient of Friction Test.

Aspect 58. The textile of any of Aspects 37 to 57, wherein the thermoformed network of the textile has a dry static coefficient of friction of at least 1.2 as determined using the Textile-Ball Coefficient of Friction Test.

Aspect 59. The textile of any of Aspects 37 to 58, wherein the thermoformed network of the textile has a wet static coefficient of friction of at least 0.9 as determined using the Textile-Ball Coefficient of Friction Test.

Aspect 60. The textile of any of Aspects 37 to 59, wherein the difference between the dry static coefficient of friction and the wet static coefficient of friction of the thermoformed network of the textile is less than 40 percent, optionally less than 30 percent, or less than 20 percent as determined using the Textile-Ball Coefficient of Friction Test.

Aspect 61. An article comprising the textile according to any one of Aspects 1 to 60.

Aspect 62. The article of Aspect 61, wherein the article is a component of an article of apparel, footwear, or sporting equipment, or is an article of apparel, footwear, or sporting equipment.

Aspect 63. An upper for an article of footwear, comprising:
a textile, wherein the textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition.

Aspect 64. The upper of Aspect 63, wherein the textile defines at least a portion of a surface of the upper configured to be externally-facing when the upper is part of a finished article of footwear.

Aspect 65. The upper of Aspect 63, wherein the textile defines at least a portion of the surface of the upper configured to be externally-facing when the upper is part of a finished article of footwear, or defines at least a portion of a surface of the upper configured to be internally-facing when the upper is part of a finished article of footwear, or forms at least a portion of an interior layer of the upper when the upper is part of a finished article of footwear, or any combination thereof.

Aspect 66. The upper of any of Aspects 63 to 65, wherein the textile is a textile according to any one of Aspects 1 to 36.

Aspect 67. An upper for an article of footwear, comprising:
a first textile comprising a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition.

Aspect 68. The upper of Aspect 67, wherein the textile defines at least a portion of a surface of the upper configured to be externally-facing when the upper is part of a finished article of footwear.

Aspect 69. The upper of Aspect 67, wherein the textile defines at least a portion of the surface of the upper configured to be externally-facing when the upper is part of a finished article of footwear, or defines at least a portion of a surface of the upper configured to be internally-facing when the upper is part of a finished article of footwear, or forms at least a portion of an interior layer of the upper when the upper is part of a finished article of footwear, or any combination thereof.

Aspect 71. The upper of any of Aspects 67 to 70, wherein the textile comprises the textile of any of Aspects 1 to 60.

Aspect 72. The upper of any of Aspects 67-71, wherein the textile defines at least a portion of a surface of the upper configured to be externally-facing when the upper is part of a finished article of footwear, Aspect 73. The upper of any of Aspects 67-71, wherein the textile defines from about 15 percent to about 100 percent, or from about 15 percent to about 35 percent, or from about 40 percent to about 70 percent, or from about 75 percent to about 100 percent of the total surface area of the upper configured to be externally-facing when the upper is part of a finished article of footwear.

Aspect 74. The upper of any of Aspects 67-73, wherein the thermoformed network of the thermoformed textile defines at least a portion of a surface of the upper configured to be externally-facing when the upper is part of a finished article of footwear, Aspect 75. The upper of any of Aspects 67-74, wherein the thermoformed network includes an externally-facing side, the externally-facing side of the thermoformed network defines at least a portion of the surface of the upper configured to be externally-facing when the upper is part of a finished article of footwear, and about 15 percent to 100 percent, or about 15 percent to 35 percent, or about 40 percent to 70 percent, or about 75 percent to 100 percent of a total surface area of the externally-facing side of the thermoformed network comprises the first polymeric composition.

Aspect 76. The upper of any of Aspects 67-75, wherein the first polymeric composition comprises about 15 percent to 95 percent by weight, or about 15 percent to 35 percent by weight, or about 40 percent to 70 percent by weight, or about 75 percent to 95 percent by weight of the textile, based on a total weight of the textile present in the upper.

Aspect 77. The upper of any of Aspects 67-76, wherein the textile produces a ball spin rate of at least 210 revolutions per minute, or a ball spin rate of about 210 revolutions per minute to about 230 revolutions per minute, as determined using the Upper-Ball Impact Test.

Aspect 78. An outsole for an article of footwear, comprising:
a textile comprising a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition.

Aspect 79. The outsole of Aspect 78, wherein the thermoformed network defines at least a portion of an externally-facing surface of the outsole, optionally wherein the externally-facing surface is configured to be ground-facing or ground-contacting when the outsole is part of a finished article of footwear.

Aspect 80. The outsole of Aspect 78 or 79, wherein the thermoformed textile defines at least a portion of a heel region, a toe region, or a midfoot region, or any combination thereof, of the outsole.

Aspect 81. The outsole of any of Aspects 78 to 80, wherein the thermoformed network of the textile, when new, has a dry dynamic coefficient of friction of greater than 1.0 as determined against smooth concrete using the Whole Footwear Coefficient of Friction Test.

Aspect 82. The outsole of any of Aspects 78 to 81, wherein the thermoformed network of the textile, when new, has a wet dynamic coefficient of friction of greater than 0.5 as determined against smooth concrete using the Whole Footwear Coefficient of Friction Test.

Aspect 83. The outsole of any of Aspects 78 to 82, wherein the difference between the dry dynamic coefficient of friction and the wet dynamic coefficient of friction of the thermoformed network of the textile, when new, is less than 40 percent, optionally less than 30 percent, or less than 20 percent as determined against smooth concrete using the Whole Footwear Coefficient of Friction Test.

Aspect 84. The outsole of any of Aspects 78 to 83, wherein the thermoformed network of the textile, after being abraded according to the Whole Footwear Abrasion Test, has a dry dynamic coefficient of friction of greater than 0.9 as determined against smooth concrete using the Whole Footwear Coefficient of Friction Test.

Aspect 85. The outsole of any of Aspects 78 to 84, wherein the thermoformed network of the textile, after being abraded according to the Whole Footwear Abrasion Test, has a wet dynamic coefficient of friction of greater than 0.5 as determined against smooth concrete using the Whole Footwear Coefficient of Friction Test.

Aspect 86. The outsole of any of Aspects 78 to 85, wherein the difference between the dry dynamic coefficient of friction and the wet dynamic coefficient of friction of the thermoformed network of the textile, after being abraded according to the Whole Footwear Abrasion Test, is less than 40 percent, optionally less than 30 percent, or less than 20 percent as determined against smooth concrete using the Whole Footwear Coefficient of Friction Test.

Aspect 87. The outsole of any of Aspects 78 to 86, wherein the thermoformed network defines at least a portion of a surface of the outsole configured to be ground-contacting when the outsole is part of a finished article of footwear, and the thermoformed network further comprises a layer of a third polymeric composition, wherein the third polymeric composition is a thermoplastic elastomeric composition comprising a thermoplastic elastomeric styrenic copolymer; wherein a first side of the layer defines the surface of the outsole configured to be ground-contacting when the outsole is part of a finished article of footwear, and a second side of the yarn opposite the first side is thermally bonded to a first side of the textile via the first polymeric composition of the textile.

Aspect 88. The outsole of Aspect 87, wherein the layer of the third polymeric composition is an extruded layer or an injection molded layer or a film layer.

Aspect 89. The outsole of Aspect 87 or 88, wherein the thermoplastic elastomeric styrenic copolymer of the first polymeric composition and the thermoplastic elastomeric styrenic copolymer of the third polymeric component each have the same chemical structure, or the first polymeric composition and the third polymeric composition each have melting temperatures within about 10 degrees C. of each other, or both.

Aspect 90. The outsole of any of Aspects 87-89, wherein the layer of the third polymeric composition has a thickness of from about 0.1 millimeter to about 5 millimeters.

Aspect 91. The outsole of any of Aspects 78-90, wherein the textile comprises the textile of any of Aspects 1 to 60.

Aspect 92. A method of making a textile, the method comprising:

forming a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition.

Aspect 93. The method of Aspect 92, wherein the textile is a textile according to any one of Aspects 1-36.

Aspect 94. A method of making a textile, the method comprising:

thermoforming a first textile comprising a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition; thereby forming a thermoformed network of yarns comprising the first core yarn and the first polymeric composition, wherein the first polymeric composition consolidates the thermoformed network of yarns by surrounding at least a portion of the first core yarn and occupying at least a portion of spaces between yarns in the thermoformed network of yarns.

Aspect 95. The method of Aspect 94, wherein the first textile is a textile according to any one of Aspects 1 to 60.

Aspect 96. A textile made according to any one of Aspects 92 to 95.

Aspect 97. A method of making an upper for an article of footwear, the method comprising:

affixing a first textile to a second component, wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition.

Aspect 98. A method of making an upper for an article of footwear, the method comprising:

thermoforming an upper comprising a first textile, wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition; and wherein the thermoforming comprises melting, reflowing, and re-solidifying the first polymeric composition within the first textile, forming a thermoformed textile comprising a thermoformed network of yarns comprising the first core yarn and the first polymeric composition, wherein the first polymeric composition consolidates the thermoformed network of yarns by surrounding at least a portion of the first core yarn and occupying at least a portion of spaces between yarns in the thermoformed network of yarns.

Aspect 99. A method of making an upper for an article of footwear, the method comprising:

affixing a first textile to a second component, wherein the first textile comprises a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition.

Aspect 100. The method of any of Aspects 97 to 99, wherein the first textile is a textile according to any one of Aspects 1 to 60.

Aspect 101. An upper made according to the method of any one of Aspects 97 to 100.

Aspect 102. A method for making an outsole for an article of footwear, the method comprising thermoforming a first textile; wherein the thermoforming comprises thermoforming the textile on a sole component, or on a molding surface, optionally wherein the molding surface is a molding surface having the dimensions of the outsole; wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition; and wherein the thermoforming comprises melting, reflowing, and re-solidifying the first polymeric composition within the first textile, forming a thermoformed textile comprising a thermoformed network of yarns comprising the first core yarn and the first polymeric composition, wherein the first polymeric composition consolidates the thermoformed network of yarns by surrounding at least a portion of the first core yarn and occupying at least a portion of spaces between yarns in the thermoformed network of yarns.

Aspect 103. The method of Aspect 102, wherein the first textile has a first side and a second side, wherein the method further comprises thermally bonding a layer comprising a third polymeric composition to the first side or the second side of the first textile, wherein the third polymeric composition of the layer defines a surface of the outsole configured to be externally-facing or ground-facing or ground-contacting when the outsole is in a finished article of footwear.

Aspect 104. The method of Aspect 103, wherein the method comprises thermally bonding a sheet comprising the third polymeric composition to the first textile before, during or after the step of thermoforming the first textile.

Aspect 105. The method of Aspect 103, wherein the method comprises extruding or injection molding the third polymeric composition on the first side or the second side of the first textile before, during or after thermoforming the first textile.

Aspect 106. The method of any one of Aspects 102-105, wherein the first textile is a textile according to any one of Aspects 1 to 60.

Aspect 107. An outsole made according to the method of any one of Aspects 102 to 106.

Aspect 108. A method of making an article, comprising:
affixing a first textile to a second component, wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition.

Aspect 109. A method of making an article, the method comprising:
thermoforming a first textile, wherein the first textile comprises a first network of yarns including a first coated yarn, the first coated yarn comprising a first core yarn and a first coating including a first polymeric composition disposed on at least a portion of an outer surface of the first core yarn, wherein the first polymeric composition is a thermoplastic elastomeric composition; and wherein the thermoforming comprises melting, reflowing, and re-solidifying the first polymeric composition within the first textile, forming a thermoformed textile comprising a thermoformed network of yarns comprising the first core yarn and the first polymeric composition, wherein the first polymeric composition consolidates the thermoformed network of yarns by surrounding at least a portion of the first core yarn and occupying at least a portion of spaces between yarns in the thermoformed network of yarns, Aspect 110. A method of making an article, the method comprising:
affixing a first textile to a second component, wherein the first textile comprises a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition is a thermoplastic elastomeric composition; optionally wherein the article is a component of an article of footwear, apparel or sporting equipment, or is an article of footwear, apparel or sporting equipment.

Aspect 111. The method of any one of Aspects 108 to 110, wherein the first textile is a textile according to any one of Aspects 1 to 60.

Aspect 112. An article made by the method of any one of Aspects 108 to 111.

From the foregoing, it will be seen that aspects herein are well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings is to be interpreted as illustrative and not in a limiting sense.

While specific elements and steps are discussed in connection to one another, it is understood that any element and/or steps provided herein is contemplated as being combinable with any other elements and/or steps regardless of explicit provision of the same while still being within the scope provided herein. Since many possible aspects may be made of the disclosure without departing from the scope thereof, it is to be understood that all matter herein set forth or shown in the accompanying drawings is to be interpreted as illustrative and not in a limiting sense.

EXAMPLES

The present disclosure is more particularly described in the following examples that are intended as illustrations only, since numerous modifications and variations within the scope of the present disclosure will be apparent to those skilled in the art.

Polymer Screening

Thermoplastic polyurethane elastomers and thermoplastic styrenic copolymer elastomers were evaluated as candidates for the preparation of coated yarns, textiles and other articles as described herein. Several properties were determined for each polymer, and the results are summarized in Tables 1 and 2. The hardness of the polymers was determined using the Durometer Hardness Test, the specific gravity was determined using the Specific Gravity Test, the DIN abrasion loss was determined using the DIN Abrasion Test, and the coefficients of friction were determined using the Sample Coefficient of Friction Test as disclosed herein.

TABLE 1

| Material Grade | Polymer type | Supplier | Durometer (Shore A) | Specific Gravity | DIN abrasion mass loss (milligrams) |
|---|---|---|---|---|---|
| Monprene 66070 | SEBS TPE | Teknor Apex | 76 A | 0.897 | 374 |
| Ellastolan SP9339 | TPU | BASF |  | 0.7944 |  |
| Estane 58238 | TPU | Lubrizol | 75 A | 1.17 | 65 |
| Estane T470A-3 | TPU | Lubrizol | 77 A | 1.14 | 74 |

TABLE 2

| Material Grade | Smooth Dry Concrete (Dynamic COF) | Smooth Wet concrete (Dynamic COF) | Rough Dry Concrete (Dynamic COF) | Rough Wet Concrete (Dynamic COF) | Percent Difference (Dry-Wet)/ Dry Smooth | Percent Difference (Dry-Wet)/ Dry Rough |
|---|---|---|---|---|---|---|
| Monprene 66070 | 1.211 | 0.873 | 0.830 | 0.717 | 72 | 28 |
| Ellastolan SP9339 | 1.434 | 0.629 | 1.091 | 0.652 | 44 | 56 |
| Estane 58238 | 1.039 | 0.483 | 0.835 | 0.450 | 46 | 54 |
| Estane T470A-3 | 1.055 | 0.463 | 0.873 | 0.537 | 44 | 56 |

Properties of Coated Yarns

Coated yarns coated with polymeric compositions including polymers under investigation were made and their properties were investigated. A comparison of hardness values, glass transition temperature, melting temperature, tensile strength, and elongation at break is provided in Table 3, where the hardness of the polymer was determined using the Durometer Hardness Test, the glass transition temperatures and the melting temperatures of the polymers were determined using the Melting and Glass Transition Temperature Test, and the yarn tensile strength and elongation were determined using the Yarn Modulus, Tenacity, and Elongation Test disclosed herein:

TABLE 3

Properties of Control and Test Coated Yarns

| Yarn Sample | Polymer Supplier | Polymer Grade | Durometer (Shore A) | Glass Transition Temp. (degrees Celsius) | Melting Temp. (degrees Celsius) | Tensile Strength (Megapascals) | Elongation at Break (percent) |
|---|---|---|---|---|---|---|---|
| WC1 | Lubrizol | Estane 58238 | 75 ± 3 | −68 | 150 | 48.3 | 680 |
| WC2 | Lubrizol | Estane T470A-3 | 77 ± 3 | −50 | 150 | 28 | 840 |
| Hard TPU | Lubrizol | Esdex 219UN | 92 ± 3 | −39 | 150 | 62 | 480 |

Differential scanning calorimetry studies to evaluate melting and recrystallization behavior of polymers under investigation for use as coatings for yarn were conducted according to the Melting and Glass Transition Temperature Test described herein. Results are presented in Table 4:

TABLE 4

Polymer Melting and Cooling Data

| DSC Data | Polymer Type | Polyol Type | Melting Tem. (degrees Celsius) | Melting Behavior | | | Recrystallization Behavior (Cooling after Melting) | | |
|---|---|---|---|---|---|---|---|---|---|
| | | | | Onset of Melting (degrees Celsius) | Peak Melting Temp. (degrees Celsius) | Enthalpy (Joules per gram) | Onset of Crystalization (degrees Celsius) | Peak Crystalization (degrees Celsius) | Enthalpy (Joules per gram) |
| Estane 58238 | TPU | Aromatic Polyester | −44 | 134.79 | 149.31 | 7.4591 | 69.6 | 48.2 | 4.1687 |
| Estane T470A-3 | TPU | Polyester | −49 | 134.5 | 155.05 | 9.9512 | 100.47 | 85.6 | 7.3121 |
| Monprene SP66070 | SEBS | N/A | <−35 | 150.39 | 164.25 | 22.057 | 113.5 | 104.21 | 20.677 |
| Monprene SP16074H | SEBS | N/A | <−35 | 144.87 | 159.65 | 23.482 | 110.97 | 107.1 | 24.995 |
| Monprene IN15074 | SEBS | N/A | <−35 | 145.13 | 160.33 | 21.563 | 110.54 | 103.78 | 23.006 |

Rheology data for molten polymers was collected according to the Molten Polymer Viscosity Test described herein. Results are presented in Table 5:

TABLE 5

Molten Polymer Rheology Data

| Material | Viscosity at 1 Reciprocal Second (Pascal · seconds) | Viscosity at 10 Reciprocal Seconds (Pascal · seconds) | Viscosity at 100 Reciprocal Seconds (Pascal · seconds) |
|---|---|---|---|
| Estane 58238 | 690 | 640 | 465 |
| Estane T470A-3 | 545 | 525 | 400 |
| Monprene SP 66070 | 170 | 170 | 145 |
| Monprene SP 16074H | 20500 | 3000 | 550 |
| Monprene SP 15074 | 22900 | 5300 | 1150 |

These results indicate that Estane 58238, Estane T470A-3, and Monprene SP66070 are particularly well-suited for high flow rate extrusion on fast moving fibers (e.g. core yarn).

Solid state tensile properties for the polymers useful as yarn coating compositions are presented in Table 6, as determined using the Plaque Modulus Test described herein:

TABLE 6

Solid State Tensile Properties

| Material Grade | Polymer Type | Break Strength (kg · f) | Strain to Break (Percent) | Load at 100 Percent Strain (kg · f/mm) | Toughness (kg · x mm) | Stiffness | Tear Strength |
|---|---|---|---|---|---|---|---|
| Rubber A | Rubber | 14.0 | 709 | 3.2 | 927 | 37.9 | 35 |
| Estane 58238 | TPU | 34.2 | 792 | 3.8 | 2176 | 63.8 | 78.8 |
| Estane T470A-3 | TPU | 30.5 | 690 | 4.7 | 1737 | 84.3 | 76.6 |
| Monprene SP 66070 | SEBS | 13.3 | 717 | 5.0 | 1495 | 102.9 | 60.9 |
| Monprene IN 15074 | SEBS | 10.1 | 450 | 7.7 | 865 | 154.1 | 49.9 |

Traction and Abrasion Losses of Plaques 2 millimeter thick plaques of material were used to test for traction and abrasion properties. Plaques were tested according to the Sample Coefficient of Friction Test described herein.

Cross-linked rubber materials are known to exhibit reduced material or mass loss during abrasion testing, while thermoplastic materials have typically not been able to match the balance of traction and abrasion loss provided by cross-linked rubbers. However, the polymers tested showed good traction performance relative to known rubber outsole formulations. Results obtained in accordance with the Durometer Hardness Test, the Specific Gravity Test, the DIN Abrasion Test, and the Sample Coefficient of Friction Test described herein can be seen in Tables 7. Table 8 presents the results of whole shoe tests using outsoles comprising thermoformed textiles as described herein, obtained in accordance with the Whole Footwear Coefficient of Friction Test and the Whole Footwear Abrasion Test disclosed herein. Table 9 shows hardness and Akron abrasion loss results for thermoformed textiles described herein when used as outsoles, as obtained using the Durometer Hardness Test and the Akron Abrasion Test as disclosed herein.

TABLE 7

Dry and Wet Coefficient of Friction for 2 Millimeter Flat Plaques

| Polymer and Rubber Comparisons | | | | | | | 2 mm Flat Plaque Geometry | | DIN Abrasion | Smooth Dry Concrete 3× | | Smooth Wet Concrete 3× | |
|---|---|---|---|---|---|---|---|---|---|---|---|---|---|
| Material Grade | Polymer Type | Form | Supplier | Durometer (Shore A) | Specific Gravity | Mass Loss (mg) | | | Dynamic COF | Standard Deviation | Dynamic COF | Standard Deviation |
| Rubber A | Rubber | Solid | N/A | 67-70 | 1.16 | 70 | | | 1.305 | 0.050 | 0.470 | 0.030 |
| Rubber B | Rubber | Solid | N/A | 66-68 | 1.07 | 57 | | | 1.592 | 0.037 | 0.341 | 0.020 |
| Estane T470A-3 | TPU | Solid | Lubrizol | 77 | 1.14 | 74 | | | 1.055 | 0.017 | 0.463 | 0.010 |
| Estane 58238 | TPU | Solid | Lubrizol | 75 | 1.17 | 65 | | | 1.039 | 0.012 | 0.483 | 0.044 |
| Monprene SP66070 | SEBS TPE | Solid | Teknor Apex | 76 | 0.89 | 374 | | | 1.211 | 0.024 | 0.873 | 0.022 |
| Monprene IN15074 | SEBS TPE | Solid | Teknor Apex | 75 | 0.89 | 66 | | | 1.235 | 0.030 | 0.470 | 0.020 |

Whole Footwear Outsole Abrasion and Coefficient of Friction Testing

| Polymer and Rubber Comparisons | Whole | Footwear Traction (Before Abrasion) | | Footwear Traction (After Abrasion) | |
|---|---|---|---|---|---|
| Type | Abrasion Mass Loss (Grams at 96 Hours, 180 Pound Load, 1 Strike/Second) | Footwear Abrasion Dry Concrete COF | Wet Concrete COF | Dry Concrete COF | Wet Concrete COF |
| TPU | 1.6 | 1.03 | 0.65 | 0.92 | 0.58 |
| TPU | 1.4 | 1.08 | 0.53 | 0.91 | 0.56 |
| SEBS | 2.2 | 1.05 | 0.63 | 1.12 | 0.64 |

TPU, WC2=coated with or plaque formed from Estane T470A-3 TPU, WC3=coated with or plaque formed from Monprene SP66070 TPE.

Solid polymers and corresponding coated yarns were tested for abrasion mass loss and traction using the Akron Abrasion Test and the Sample Coefficient of Friction Test as described herein. Traction properties of the thermoformed knit textiles were comparable to polymer test plaques and to rubber outsole materials, indicating that the thermoformed knit textiles were successfully thermoformed to form thermoformed networks (Table 9). Additionally, Akron abrasion material losses measured for the thermoformed knit textiles were comparable to the rubber control references. Mass loss measured for Akron abrasion test strips 0.5 inches wide and 8 inches long were comparable to much larger outsole areas

TABLE 9

Hardness and Abrasion Loss for Thermoformed Outsoles

| Sample Name | Polymer Type | Usage | Durometer (Shore A) | Density (grams per cubic centimeter) | Polymer COF Dry Concrete Smooth | Polymer COF Wet Concrete Smooth | Polymer DIN Abrasion | Polymer Akron Abrasion (cubic centimeters) | Polymer Akron Abrasion (grams) |
|---|---|---|---|---|---|---|---|---|---|
| Rubber A | Butadiene synthetic rubber blend | Outsole rubber | 66 | 1.15 | 1.305 | 0.470 | 70 | 0.248 | 0.29 |
| Rubber B | Peroxide cured rubber blend | Outsole rubber | 66 | 1.08 | 1.592 | 0/341 | 57 | 0.2 | 0.22 |
| WC2-Plaque | TPU Estane T470A-3 | Polymer test plaque | 72 | 1.13 | 1.055 | 0.463 | 74 | | |
| WC1-Plaque | TPU Estane 58238 | Polymer test plaque | 70 | 1.17 | 1.039 | 0.483 | 65 | | |
| WC3-Plaque | TPE-Monprene SP066070 | Polymer test plaque | 70 | 0.9 | 1.211 | 0.873 | 374 | | |
| WC2-Fused Knit | TPU Estane T470A-3 | 0.4 millimeter yarn in knit | 72 | | 1.52 | 0.51 | | | 0.13 |
| WC1-Fused Knit | TPU Estane 58238 | 0.4 millimeter yarn in knit | 70 | | 0.85 | 0.52 | | | 0.06 |
| WC3-Fused Knit | TPE-Monprene SP066070 | 0.4 millimeter yarn in knit | 70 | | 1.06 | 0.52 | | | 0.32 |

Yarn candidate coatings are abbreviated herein and in Tables 8 and 9 as follows with respect to coated yarns: WC1=coated with or plaque formed from Estane 58238 of whole shoe mass as described in Table 8. Thus, test strips and whole shoe performance are consistent and thermoformed knit textiles were shown to be acceptable as outsole materials as they did not lose material out of scale with representative rubbers and further, the thermoformed knit textiles exhibited sufficient traction properties to perform as outsoles.

Evaluation of Coated Yarns

Two sample types of coated yarns were prepared into flat knit textile swatches. The first swatch used UNIFI polyethylene terephthalate (polyester) yarn (158 denier, tenacity of 7.131 grams per denier, 23.42 percent elongation) as the core yarn, and was coated with a polymeric composition consisting essentially of Estane 58238 at a thickness of about 0.4 millimeters. The second swatch used the same UNIFI polyethylene terephthalate yarn core yarn, but was coated with a polymeric composition consisting essentially of Monprene TPE SP66070 at a thickness of about 0.4 millimeters. The flat knit textile swatches were thermoformed either without texture or with a herringbone texture prior to testing.

There are two versions knit for each type of coated yarn: single yarn end edge-2 knit structures (1×1) and two yarn end edge-2 knit structures (1×2) that have one end of yarn on the surface of the thermoformed network of the thermoformed textile, or two ends of yarn (for a greater concentration of the polymeric coating) at the surface of the thermoformed network, respectively. The knit structure of the swatches also included an end of the uncoated UNIFI PET yarn. The description of the knit structures, i.e., (1×1) and (1×2), identifies the number of ends of yarn used, where the first number corresponds to the number of uncoated polyester yarns present and the second number corresponds to the number of coated yarns present. The edge-2 knit structure is a double-bed knit structure with tuck knit stitches connecting the two faces of the knit textile. One face of the textile is exclusively uncoated polyester yarn and the other is exclusively the coated yarn under evaluation, with the tuck stitches connecting the two exterior facing knit surfaces. Tuck stitches are constructed from the same coated yarns as the outer face yarn.

All samples were tested for Akron abrasion in accordance with the Akron Abrasion Test, and wet/dry traction COF testing according to the Sample Coefficient of Friction test on court and concrete. The results are provided in Tables 10 and 11.

Overall, the thermoformed textiles knitted from the coated yarn with a coating consisting essentially of the SEBS-based Monprene demonstrated a high dynamic coefficient of friction on concrete and court (Table 10). The thermoformed textiles including the Monprene coated yarn demonstrated higher coefficients of friction when thermoformed flat on smooth concrete and court. The thermoformed textiles including the Monprene coated yarn demonstrated good coefficients of friction when tested dry and when wet.

The thermoformed textiles knitted from the coated yarn with a coating consisting essentially of the Estane demonstrated higher coefficients of friction when thermoformed flat and tested on smooth concrete and court; the herringbone texture demonstrated a greater coefficient of friction when tested on rough concrete. (Table 10). The thermoformed textiles including the Estane coated yarn demonstrated a good coefficient of friction when tested dry and wet (with some exceptions).

Overall, the thermoformed 1×2 knit textiles exhibited less volumetric loss on abrasion testing than the thermoformed 1×1 knit textiles. The thermoformed textiles including the Estane coated yarn exhibited less volumetric loss than the thermoformed textiles including the Monprene coated yarn.

TABLE 10

Traction Results

| Sample | Outsole Texture | Dry Smooth Concrete | Wet Smooth Concrete | Dry Court | Wet Court | Dry Rough Concrete | Wet Rough Concrete |
|---|---|---|---|---|---|---|---|
| Monprene Coated Yarn, 1 × 1 knit | Not Textured | 1.06 ± 0.32 | 0.52 ± 0.21 | 0.96 ± 0.12 | 0.49 ± 0.78 | 0.88 ± 0.15 | 0.51 ± 0.07 |
| | Herringbone Texture | 0.96 ± 0.25 | 0.50 ± 0.31 | 0.63 ± 0.02 | 0.35 ± 0.40 | 0.78 ± 0.21 | 0.57 ± 0.04 |
| Monprene Coated Yarn, 1 × 2 knit | Not Textured | 1.06 ± 0.32 | 0.50 ± 0.04 | 1.04 ± 0.13 | 0.42 ± 0.54 | 0.82 ± 0.23 | 0.51 ± 0.02 |
| | Herringbone Texture | 0.98 ± 0.38 | 0.53 ± 0.29 | 0.46 ± 0.08 | 0.36 ± 0.26 | 0.89 ± 0.12 | 0.54 ± 0.08 |
| Estane Coated Yarn, 1 × 1 knit | Not Textured | 0.85 ± 0.15 | 0.53 ± 0.12 | 1.01 ± 0.15 | 0.39 ± 0.36 | 0.51 ± 0.25 | 0.35 ± 0.02 |
| | Herringbone Texture | 1.02 ± 0.12 | 0.46 ± 0.28 | 0.38 ± 0.21 | 0.23 ± 0.21 | 0.78 ± 0.11 | 0.32 ± 0.04 |
| Estane Coated Yarn, 1 × 2 knit | Not Textured | 0.72 ± 0.36 | 0.43 ± 0.07 | 0.95 ± 0.04 | 0.91 ± 0.04 | 0.44 ± 0.11 | 0.34 ± 0.02 |
| | Herringbone Texture | 0.76 ± 0.04 | 0.47 ± 0.31 | 0.55 ± 0.32 | 0.57 ± 0.32 | 0.67 ± 0.14 | 0.34 ± 0.02 |
| Typical Nike rubber outsole formulation | Not Textured | 1.35 ± 0.05 | 0.47 ± 0.03 | 1.25 ± 0.17 | 0.44 ± 0.1 | 0.945 ± 0.02 | 0.455 ± 0.03 |

TABLE 11

Abrasion Resistance Results

| Sample | Thermoformed Texture | Average Specific Gravity | Mass before testing (grams) | Mass after 300 cycle break-in (grams) | Mass after 3000 (+300) cycles (grams) | Abrasion Resistance (cubic centimeter loss) |
|---|---|---|---|---|---|---|
| Monprene Coated Yarn, 1 × 1 knit | Flat | 0.815 | 40.5613 | 40.5172 | 40.1456 | 0.456 |

TABLE 11-continued

Abrasion Resistance Results

| Sample | Thermoformed Texture | Average Specific Gravity | Mass before testing (grams) | Mass after 300 cycle break-in (grams) | Mass after 3000 (+300) cycles (grams) | Abrasion Resistance (cubic centimeter loss) |
|---|---|---|---|---|---|---|
| Monprene Coated Yarn, 1 × 2 knit | Flat | 0.800 | 41.0536 | 41.015 | 40.695 | 0.400 |
| Estane Coated Yarn, 1 × 1 knit | Flat | 0.939 | 42.9179 | 42.9107 | 42.8502 | 0.064 |
| Estane Coated Yarn, 1 × 2 knit | Flat | 0.895 | 43.7073 | 43.6934 | 43.658 | 0.040 |
| Estane Coated Yarn, 1 × 2 knit | Flat | 0.895 | 43.7073 | 43.6934 | 43.658 | 0.040 |

Textile and Article Thermoforming Processes

Coated and uncoated yarns were knit into edge-2 1×2 or 1×1 swatches and lightly pressed in a t-shirt press at 20 pounds per square inch and 150 degrees Celsius for 20 seconds to avoid fraying. The swatches were cut into outsole shapes and placed into a rubber-phylon mold having the cavity size of a standard rubber mold but coated for heating and cooling cycles similar to a phylon mold. The empty mold was preheated to the melting temperature of the polymer plus 15 degrees Celsius as measured by a thermocouple. The cut outsole shapes were placed into the mold with uncoated polyester yarn side up and pressed for 45 seconds, then cooled for at least 60 seconds, or 90 seconds if time allowed. In some cases, the edge-2 1×1 swatches were not large enough material to fill the mold. When the swatches were not large enough to fill the mold, silicone, rubber, or other material was added to fill the mold. Tested temperatures, polymers present in the yarn coating, and times are provided in Table 12:

TABLE 12

Thermoforming Processing Conditions

| Material Grade | Melting Temperature (degrees Celsius) | Processing Temperature (degrees Celsius) |
|---|---|---|
| Monprene 66070 | 160 | 175 |
| Estane 58238 | 130 | 145 |
| Estane T470A-3 | 150 | 165 |

When a regular thermoforming process was used, this was conducted on a DMT Press with a total heating time of 35 to 45 seconds and a pressure of 30 bar. The process was stopped when the thermocouple reached 130 degrees Celsius or 150 degrees Celsius depending on the end point.

When a flat molding process was used, this was conducted on a Kukdong heat press with a total heating time of from 30 seconds to 60 seconds or until the textile reached 150 degrees Celsius as measured by thermocouple. Temperature was held for 0 to 10 seconds as needed. The heating pressure was 0.1 megapascals and the heat press set point was 190 degrees Celsius. Heating was stopped when the thermocouple reached 150 degrees Celsius, with some samples receiving an additional dwell time of 10 seconds as indicated. Cold pressing at 20 degrees Celsius was then carried out at 0.1 megapascals for 30 seconds.

When infrared (IR) heating and/or thermoforming was used, coated yarns were knitted into an exemplary upper and the upper was placed in a Flash Activator with the surface of the upper to be heated facing the heating elements. In some experiments, the surface of a knit upper configured to be externally-facing was placed facing the heating elements, while in other experiments, the surface of the knit upper configured to be internally-facing was placed facing the heating elements. However, the knit textile can be laid flat, heated, and then formed, or heated on a last in three dimensions and formed. The knit textile was exposed to IR flash heat for about 23 seconds, which was sufficient for the local temperature of the irradiated surface to reach 160 degrees Celsius or more. The upper and last were then removed from the Flash Activator and temperature was measured with a heat gun while moving the upper to a vacuum machine in order to verify the temperature was greater than the melting point of the polymeric composition of the yarn coating. The knit upper was then positioned on a vacuum stage so that the newly thermoformed surface of the textile of the upper contacted the desired template master pattern for forming. A textured embossing pad (rubber, plastic, or silicone) was placed face down on the thermoformed surface of the upper such that the thermoformed surface is in contact with the silicone pad molding pattern. The embossing pad can be at room temperature or heated to 120 to 200 degrees Celsius depending on the length of time needed to maintain a higher temperature on the molten polymeric composition of the coating. The embossing pad and knit textile of the upper were pressed in a vacuum machine for 60 seconds. The vacuum was released and discharged to reveal the surface of the thermoformed network of the thermoformed knit textile.

Abrasion Resistance of Textiles

Shown in Table 13 are abrasion mass losses for unthermoformed knit textiles and thermoformed knit textiles which were thermoformed in a flat configuration as determined after 300 and 3000 cycles of abrasion testing using the Akron Abrasion Test.. The knit textiles were knit using the UNIFI polyester core yarn described above coated with a polymeric composition comprising a thermoplastic styrene copolymer elastomer (Monprene 66070) or a thermoplastic polyurethane elastomer (Estane 58238). The knit structure of the knit textile included either 1 end (1×1) or 2 ends (1×2) of the coated yarn and 1 end of the uncoated UNIFI polyester yarn knit on the surface of the knit textile which was tested. The knit structures are those described above.

TABLE 13

Akron Abrasion Loss at 300 Cycles and 3000 Cycles for Thermoformed and Unthermoformed Knit Textiles

| Sample Test Material | Form and Structure | Initial Mass (grams) | Mass at 300 Cycles (grams) | Mass Loss at 300 Cycles (milligrams) | Mass Loss at 3000 Cycles (grams) | Mass Loss at 3000 Cycles (milligrams) |
|---|---|---|---|---|---|---|
| Rubber A | Flat Sheet Rubber | 48.400 | 48.3461 | 53.7 | 48.0663 | 334 |
| Monprene 66070 1 × 1 Knit Structure | Knit Unthermoformed Flat Thermoformed Knit | 40.741 40.561 | 40.7395 40.5172 | 1.9 44.1 | 40.5382 40.1456 | 203 416 |
| Monprene 66070 1 × 2 Knit Structure | Knit, Unthermoformed Flat Thermoformed Knit | 41.537 41.054 | 41.5271 41.015 | 9.4 38.6 | 41.3315 40.695 | 205 359 |
| Estane 58238 1 × 1 Knit Structure | Knit, Unthermoformed Flat Thermoformed Knit | 42.177 42.918 | 42.1746 42.9107 | 2.8 7.2 | 41.6774 42.8502 | 500 68 |
| Estane 58238 1 × 2 Knit Structure | Knit, Unthermoformed Flat Thermoformed Knit | 44.510 43.707 | 44.5051 43.6934 | 4.9 13.9 | 44.3383 43.658 | 172 49 |

The thermoformed knit textiles showed performance equal to or superior to conventional rubber, and showed similar performance regardless of whether 1 or 2 ends were used at the top knit surface.

Durability and Weatherization

Durability and weatherization were assessed as a function of knit structure and processing conditions using the Stoll Abrasion Test, Bally Flex Test, Wet Bally Flex Test, and Water Resistance Test as described herein. A knit textile was produced using yarns coated with a polymeric composition comprising a thermoplastic elastomer (Estane T470A-3) (WC2 yarns), and thermoformed by heating in a press manufactured by Kukdong Machinery (Busan, Korea) under flat molding conditions to 150 degrees Celsius. For some samples, the textile was held in the press for an additional 10 seconds of dwell time after reaching the temperature of 150 degrees Celsius. "Knit A" samples were knit samples having a knit structure in which, when thermoformed, 75-100 percent of the total surface area of the thermoformed network was defined by the re-flowed and re-solidified polymeric composition. "Knit B" samples were knit samples having a knit structure in which, when thermoformed, 40-70 percent of the total surface area of the thermoformed network was defined by the re-flowed and re-solidified polymeric composition. "Knit C" samples were knit samples having a knit structure in which, when thermoformed, 15-35 percent of the total surface area of the thermoformed network was defined by the re-flowed and re-solidified polymeric composition. Performance of the Wet Bally Flex Test and Water Resistance Test were performed on textile samples having at least 90 percent of their surface area covered by thermoformed network in order to minimize water transmission through the sample.

TABLE 14

Durability and Weatherization as a Function of Knit Structure and Processing

| Thermoformed Knit Samples | Stoll Abrasion | Bally Flex | Wet Bally Flex | Water Resistance |
|---|---|---|---|---|
| Knit A | 2500 | 100 | | |
| Knit A with 10 Second Dwell | 2500 | 100 | 15000 | 80 |
| Knit B | 1200 | 100 | | |
| Knit B with 10 Second Dwell | 2200 | 100 | | |
| Knit C | 600 | 100 | | |

Textile-to-Ball and Upper-to-Ball Interactions

Thermoformed textiles and uppers for articles of footwear including the thermoformed textiles were manufactured, where the region of the textile or upper tested included a thermoformed network comprising a polymeric as disclosed herein. "Knit A", "Knit B", and "Knit C" are as described above.

from the knit textiles were knit using coated yarns, wherein the coating included a polymeric composition comprising a thermoplastic polyurethane elastomer (Estane T470A-3). The coated yarn included a 0.4 millimeter coating of the polymeric composition on a 150-600 denier multifilament polyester yarn. Dry and wet coefficients of friction are presented in Table 15:

TABLE 15

Dry and Wet Static and Dynamic Coefficients of Friction (COF) for Thermoformed Knit Textiles

| Sample Textile Type | Dry Average Static COF | Standard Deviation | Average Dynamic COF | Wet Average Static COF | Standard Deviation | Average Dynamic COF | Drop in COF When Wet |
|---|---|---|---|---|---|---|---|
| Duragon (Polyurethane Laminated Skin on Polyester Textile) | 1.35 | 0.04 | 1.15 | 0.86 | 0.04 | 0.57 | −36% |
| Thermoformed Knit A (Knit from Estane T470A-3 coated yarn) | 1.55 | 0.07 | 1.46 | 1.15 | 0.04 | 0.76 | −26% |
| Thermoformed Knit B (Knit from Estane T470A-3 coated yarn | 1.42 | 0.11 | 1.22 | 0.94 | 0.06 | 0.51 | −34% |
| Thermoformed Knit C (Knit from Estane T470A-3 coated yarn) | 1.21 | 0.07 | 0.97 | 0.91 | 0.04 | 0.54 | −25% |

Thermoformed knit samples showed similar dry and wet coefficients of friction (e.g., boot-to-ball interaction) as the laminated Duragon skin. but in a streamlined, more integrated, lower waste manner of construction.

Kangaroo leather displays little change between wet COF and dry COF, but both wet and dry COF are low for this material overall. DURAGON skin displays higher wet COF and dry COF but also a large difference between these two values. Thermoformed textiles and/or footwear uppers containing the coated yarns disclosed herein exhibit higher wet and dry COF values overall, and a lower degree of difference between dry COF and wet COF than DURAGON skin.

Samples of knit textiles "Knit A", "Knit B", and "Knit C" thermoformed at 150 degrees C. as described above were tested using the Ball Speed and Spin After Textile-Ball Impact Test described above. Control samples of Duragon polyurethane film laminated on a PET knit and kangaroo leather were subjected to the same test.

TABLE 16

Material Effect on Soccer Ball Spin Rate

| Sample | Ball Spin Rate (revolutions per minute) | Standard Deviation |
|---|---|---|
| Duragon Film | 226.5 | 10.0 |
| Thermoformed Knit C (Knit with Estane T470A-3 coated yarn) | 229.0 | 7.0 |
| Thermoformed Knit B (Knit with Estane T470A-3 coated yarn) | 229.0 | 4.0 |
| Thermoformed Knit A (Knit with Estane T470A-3 coated yarn) | 236.0 | 8.0 |
| Kangaroo Leather | 223.0 | 7.0 |

Uppers for full soccer boots were constructed from the yarns coated with a polymeric composition comprising a thermoplastic polyurethane elastomer (either Estane 58238 or Estane T470A-3), thermoformed under different processing conditions, and tested using the Ball Speed and Spin After Upper-Ball Impact Test described above. Results are presented in Table 17:

TABLE 17

Full Lasted Boot Kick Test on Ball

| Textile Description | Thermoforming Conditions | Type of Boot | Average Ball Spin Rate (revolutions per minute) | Standard Deviation |
|---|---|---|---|---|
| Textile + Duragon Polyurethane Laminate Skin | N/A | Commercially available | 204 | 7 |
| Upper A (Knit with Estane 58238 Coated Yarn) | 130 degrees Celsius | Test | 218 | 7 |
| Upper B (Knit with Estane 58238 Coated Yarn) | 150 degrees Celsius | Test | 217 | 6 |
| Upper C (Knit with Estane 58238 Coated Yarn) | 170 degrees Celsius | Test | 212 | 9 |
| Upper D (Knit with Estane T470A-3 Coated Yarn) | 130 degrees Celsius | Test | 219 | 6 |
| Upper E (Knit with Estane T470A-3 Coated Yarn) | 150 degrees Celsius | Test | 212 | 9 |
| Upper F (Knit with Estane T470A-3 Coated Yarn) | 170 degrees Celsius | Test | 212 | 8 |
| Upper G (Knit with 90 Shore A TPU Coated Yarn) | 170 degrees Celsius | Comparative test | 205 | 7 |

These results indicate the 90 Shore A TPU made into coated yarn to form a knit and thermoformed upper showed lower spin rates, which is less desirable. Harder materials (as indicated by Shore A Durometer values) are more abrasion resistant.

Each of the thermoformed uppers knit with yarns coated with a thermoplastic composition comprising a thermoplastic polyurethane elastomer having a durometer of about 65 to 85 Shore A created higher levels of ball spin. as compared to thermoformed knit uppers knit using a yarn coated with a thermoplastic composition comprising a thermoplastic polyurethane elastomer having a durometer of about 90 Shore A, and commercially available uppers formed of DURAGON skin.

What is claimed is:

1. An outsole for an article of footwear, comprising:
a textile comprising a thermoformed network of yarns comprising a first core yarn and a first polymeric composition, wherein the first polymeric composition consolidates the thermoformed network of yarns by surrounding at least a portion of the first core yarn and occupying at least a portion of spaces between yarns in the thermoformed network of yarns, and wherein the first polymeric composition comprises a thermoplastic elastomeric polyurethane, wherein the thermoplastic elastomeric polyurethane is a thermoplastic elastomeric polyester polyurethane, a thermoplastic elastomeric polyether polyurethane, or any combination thereof, wherein the first polymeric composition has a Durometer Hardness of from about 70 to about 80 Shore A, as determined using the Durometer Hardness Test;
wherein the thermoformed network of yarns is a thermoformed product of a first textile comprising a first network of yarns including a first coated yarn comprising the first core yarn and a first coating, the first coating comprising the first polymeric composition, the first core yarn comprising a second polymeric composition, wherein the first coating is axially centered surrounding the core yarn, the first coating has a nominal average outer diameter of the coated yarn is up to about 1.0 millimeter, the first coating has an average radial coating thickness of about 50 micrometers to about 200 micrometers, and wherein, in the thermoformed network of yarns, the first polymeric composition consolidating the thermoformed network of yarns is a re-flowed and re-solidified product of the first polymeric composition of the first coating of the first coated yarn;
wherein, in the first coated yarn, the first polymeric composition has a first melting temperature greater than about 110 degrees Celsius and less than about 190 degrees Celsius, the second polymeric composition of the first core yarn has a second deformation temperature, and the second deformation temperature is at least 50 degrees Celsius greater than the first melting temperature of the first polymeric composition;
wherein a first side of the thermoformed network defines at least a portion of a surface of the outsole configured to be externally-facing or ground-facing or ground-contacting when the outsole is part of a finished article of footwear, and
the first polymeric composition when thermoformed has a cold Ross flex of about 120,000 to about 180,000.

2. The outsole of claim 1, wherein the thermoformed network of yarns defines at least a portion of the surface of the outsole configured to be ground-contacting when the outsole is part of the finished article of footwear, and the thermoformed network further comprises a layer of a third polymeric composition, wherein the third polymeric composition is a thermoplastic elastomeric composition comprising thermoplastic elastomeric polyurethane; wherein a first side of the layer defines the surface of the outsole configured to be ground-contacting when the outsole is part of a finished article of footwear, and a second side of the layer opposite the first side is thermally bonded to a first side of the textile via the first polymeric composition of the textile.

3. The outsole of claim 2, wherein the layer of the third polymeric composition is an extruded layer or an injection molded layer or a film layer.

4. The outsole of claim 2, wherein the thermoplastic elastomeric polyurethane of the first polymeric composition and the thermoplastic elastomeric polyurethane of the third polymeric composition each have the same chemical structure, or wherein the first polymeric composition and the third polymeric composition each have melting temperatures within about 10 degrees Celsius of each other, or both.

5. The outsole of claim 2, wherein the layer of the third polymeric composition has a thickness of from about 0.1 millimeter to about 5 millimeters.

6. The outsole of claim 1, wherein the textile is bonded to a foam sole component.

7. The upper of claim 1, wherein the thermoplastic elastomeric polyurethane is a thermoplastic elastomeric polyester polyurethane, a thermoplastic polyether polyurethane, or any combination thereof.

8. The upper of claim 1, wherein the thermoplastic elastomeric polyurethane comprises an aromatic polyester thermoplastic elastomeric polyurethane, an aliphatic polyester thermoplastic elastomeric polyurethane, or a combination thereof.

9. The outsole of claim 1, wherein the first polymeric composition has a melt flow index of about 2 grams/10 minutes to about 50 grams/10 minutes at 160 degrees Celsius using a test weight of 2.16 kilograms as determined using ASTM D1238-13, or a melt flow index greater than about 2 grams/10 minutes at 190 degrees centigrade or 200 degrees Celsius when using a test weight of 10 kilograms as determined using the Melt Flow Index Test.

10. The outsole of claim 1, wherein the first core yarn comprises a polyester or a polyamide having a linear density from about 100 denier to about 300 denier.

11. The outsole of claim 2, wherein the first polymeric composition or the third polymeric composition has a dry dynamic coefficient of friction (COF) of greater than 1.0 as determined against dry smooth concrete using the Coefficient of Friction Test.

12. The outsole of claim 2, wherein the first polymeric composition or the third polymeric composition has a wet dynamic coefficient of friction (COF) of greater than 0.3 as determined against wet smooth concrete using the Coefficient of Friction Test.

13. The outsole of claim 2, wherein, for the first polymeric composition or the third polymeric composition, a difference between a wet dynamic coefficient of friction and a dry dynamic coefficient of friction is less than 40 percent as determined using the Coefficient of Friction Test.

14. The outsole of claim 1, wherein, for the thermoformed network of yarns, a difference between a dry dynamic coefficient of friction and a wet coefficient of friction is less than 55 percent as determined using the Coefficient of Friction Test.

15. The outsole of claim 1, wherein a difference between a static coefficient of friction of a dry surface and a wet surface of the textile is less than 40 percent as determined using the Coefficient of Friction Test.

16. The outsole of claim 1, wherein the textile has a dry shoe traction of greater than 6 and a wet shoe traction of greater than 5 as determined using the Method to Determine Whole Shoe Traction after Biomechanical Abrasion.

17. The outsole of claim 1, wherein the textile has an abrasion loss of less than 0.50 cubic centimeters lost after 3,000 cycles as determined using the Akron Abrasion Test.

18. The outsole of claim 1, wherein the textile has an abrasion loss of less than 0.30 cubic centimeters lost as determined using the DIN Abrasion Test.

\* \* \* \* \*

UNITED STATES PATENT AND TRADEMARK OFFICE
CERTIFICATE OF CORRECTION

PATENT NO. : 11,998,080 B2
APPLICATION NO. : 16/945441
DATED : June 4, 2024
INVENTOR(S) : Devon Frazier et al.

It is certified that error appears in the above-identified patent and that said Letters Patent is hereby corrected as shown below:

In the Specification

- Column 3, Line 46, "1 kilogramforce at" should read -- 1 kilogram·force at --.
- Column 5, Line 9, "in come cases" should read -- in some cases --.
- Column 13, Line 2, "1 kilogramforce at" should read -- 1 kilogram·force at --.
- Column 14, Line 7, "second zone. percent" should read -- second zone. --.
- Column 17, Line 18, "element can a thermoformed" should read -- element can be a thermoformed --.
- Column 18, Line 37, "element can a thermoformed" should read -- element can be a thermoformed --.
- Column 19, Line 58, "structure that that" should read -- structure that --.
- Column 26, Line 46, "present in in a" should read -- present in a --.
- Column 31, Line 24, "a strobe (not shown)" should read -- a strobel (not shown) --.
- Column 31, Line 26, "material. in other" should read -- material. In other --.
- Column 31, Line 37, "outsole The upper" should read -- outsole. The upper --.
- Column 31, Line 44, "structure 1004, Surfaces" should read -- structure 1004. Surfaces --.
- Column 32, Line 39, "gas. Wien the" should read -- gas. When the --.
- Column 33, Line 43, "a wearers ankle" should read -- a wearer's ankle --.
- Column 33, Line 47, "FIG. 13Q(b)," should read -- FIG. 8Q(b), --.
- Column 34, Line 1, "midsole. G. 8Q(e)" should read -- midsole. FIG. 8Q(e) --.
- Column 36, Line 19, "to, be one" should read -- to be one --.
- Column 40, Line 6, "composition with n the" should read -- composition within the --.
- Column 49, Line 8, "millimeters In some" should read -- millimeters. In some --.
- Column 57, Line 28, "while the an uncoated" should read -- while the uncoated --.
- Column 57, Line 51, "70 kilogramforce per" should read -- 70 kilogram·force per --.
- Column 57, Line 52, "80 kilogramforce per" should read -- 80 kilogram·force per --.
- Column 57, Line 63, "850 kilogrammillimeters to" should read -- 850 kilogram·millimeters to --.
- Column 57, Lines 63-64, "2200 kilogrammillimeters, or" should read -- 2200 kilogram·millimeters, or --.
- Column 57, Line 64, "850 kilogrammillimeters to" should read -- 850 kilogram·millimeters to --.

Signed and Sealed this
Eleventh Day of February, 2025

Coke Morgan Stewart
*Acting Director of the United States Patent and Trademark Office*

CERTIFICATE OF CORRECTION (continued)
U.S. Pat. No. 11,998,080 B2

- Column 57, Line 65, "2200 kilogrammillimeters, or" should read -- 2200 kilogram·millimeters, or --.
- Column 57, Line 66, "900 kilogrammillimeters to" should read -- 900 kilogram·millimeters to --.
- Column 57, Line 66, "1750 kilogrammillimeters, or" should read -- 1750 kilogram·millimeters, or --.
- Column 57, Line 67, "1000 kilogrammillimeters to" should read -- 1000 kilogram·millimeters to --.
- Column 58, Line 1, "1500 kilogrammillimeters, or" should read -- 1500 kilogram·millimeters, or --.
- Column 58, Lines 1-2, "1500 kilogrammillimeters to" should read -- 1500 kilogram·millimeters to --.
- Column 58, Line 2, "2000 kilogrammillimeters." should read -- 2000 kilogram·millimeters. --.
- Column 59, Line 8, "and/or the an uncoated" should read -- and/or the uncoated --.
- Column 59, Line 22, "temperature (TO less" should read -- temperature (Tg less --.
- Column 60, Line 29, "about 0.80 g/cm3 to" should read -- about 0.80 $g/cm^3$ to --.
- Column 62, Line 3, "C4-15 alkylene" should read -- $C_{4-15}$ alkylene --.
- Column 62, Line 4, "C6-10 alkylene)," should read -- $C_{6-10}$ alkylene), --.
- Column 62, Line 15, "diisocyanate (CH DI)," should read -- diisocyanate (CHDI), --.
- Column 62, Line 33, "oxazolyl, isooxazolyl, thiadiazolyl," should read -- oxazolyl, isoxazolyl, thiadiazolyl, --.
- Column 62, Line 38, "with trimethyloylpropane (TMP)," should read -- with trimethylolpropane (TMP), --.
- Column 62, Line 53, "from diisocynates including" should read -- from diisocyanates including --.
- Column 62, Line 63, "with trimethyloylpropane (TMP)," should read -- with trimethylolpropane (TMP), --.
- Column 65, Lines 6-7, "with trimethyloylpropane (TMP)," should read -- with trimethylolpropane (TMP), --.
- Column 66, Lines 40-41, "include MONOPRENE IN5074" should read -- include MONPRENE IN5074 --.
- Column 71, Line 43, "calorimeter ("DSC")" should read -- Calorimeter ("DSC") --.
- Column 74, Line 29, "clamp a distance" should read -- clamp at a distance --.
- Column 84, Line 9, "article of footwear," should read -- article of footwear. --.
- Column 84, Line 21, "article of footwear," should read -- article of footwear. --.
- Column 88, Line 13, "network of yarns," should read -- network of yarns. --.
- Column 89, Line 8, TABLE 1, "Ellastolan" should read -- Elastolan --.
- Columns 89-90, Line 6, TABLE 2, "Ellastolan" should read -- Elastolan --.
- Columns 93-94, Line 10, TABLE 9, "0/341" should read -- 0.341 --.
- Column 98, Line 59, "Abrasion Test.. The" should read -- Abrasion Test. The --.
- Columns 99-100, Line 17, TABLE 13, "Thermofomed Knit" should read -- Thermoformed Knit --.

In the Claims

- Column 104, Claim 7, Line 17, "The upper of claim 1" should read -- The outsole of claim 1 --.
- Column 104, Claim 8, Line 21, "The upper of claim 1" should read -- The outsole of claim 1 --.